United States Patent
Taguchi

(10) Patent No.: US 7,220,302 B2
(45) Date of Patent: May 22, 2007

(54) INK AND INK SET FOR INKJET, AND INKJET RECORDING METHOD

(75) Inventor: Toshiki Taguchi, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 206 days.

(21) Appl. No.: 10/811,395

(22) Filed: Mar. 29, 2004

(65) Prior Publication Data

US 2005/0004260 A1   Jan. 6, 2005

(30) Foreign Application Priority Data

| Mar. 27, 2003 | (JP) | ............................ P.2003-088360 |
| Mar. 27, 2003 | (JP) | ............................ P.2003-089145 |
| Mar. 28, 2003 | (JP) | ............................ P.2003-089978 |
| Mar. 26, 2004 | (JP) | ............................ P.2004-091936 |

(51) Int. Cl.
   *C09D 11/02*   (2006.01)

(52) U.S. Cl. ................ 106/31.46; 106/31.48; 106/31.5; 106/31.49; 106/31.52; 523/160; 523/161

(58) Field of Classification Search ............. 106/31.46, 106/31.48, 31.5, 31.49, 31.52; 523/160, 523/161
   See application file for complete search history.

(56) References Cited

U.S. PATENT DOCUMENTS

| 6,485,138 | B1 * | 11/2002 | Kubota et al. ................ 347/96 |
| 6,533,406 | B2 * | 3/2003 | Katsuragi et al. ............. 347/96 |
| 6,800,673 | B2 * | 10/2004 | Yamanouchi et al. ........ 523/160 |
| 6,874,882 | B2 * | 4/2005 | Taguchi et al. ............. 347/100 |
| 2002/0107301 | A1 * | 8/2002 | Yamanouchi et al. ....... 523/160 |
| 2004/0050291 | A1 * | 3/2004 | Taguchi et al. .......... 106/31.27 |
| 2004/0053988 | A1 * | 3/2004 | Taguchi et al. ............. 514/419 |
| 2004/0070654 | A1 * | 4/2004 | Taguchi et al. ............. 347/100 |
| 2004/0194659 | A1 * | 10/2004 | Taguchi .................... 106/31.27 |
| 2005/0117006 | A1 * | 6/2005 | Taguchi ....................... 347/100 |
| 2005/0162492 | A1 * | 7/2005 | Taguchi et al. ............. 347/100 |
| 2005/0178288 | A1 * | 8/2005 | Taguchi .................... 106/31.13 |
| 2006/0004125 | A1 * | 1/2006 | Taguchi et al. ............. 523/160 |
| 2006/0044375 | A1 * | 3/2006 | Taguchi et al. ............. 347/100 |
| 2006/0092248 | A1 * | 5/2006 | Taguchi et al. ............. 347/100 |

* cited by examiner

*Primary Examiner*—Helene Klemanski
(74) *Attorney, Agent, or Firm*—Sughrue Mion, PLLC

(57) ABSTRACT

Provided are an inkjet ink prepared by dissolving or dispersing a specific dye in an aqueous medium and containing one of at least one alkylene diol where one alkylene group has at least 3 carbon atoms or homologue thereof and at least one polymer compound; and an ink set containing an ink including a specific dye and an ink including one compound capable of interacting with the dye; thereby being able to provide an ink and the like having a good jet-out stability, and forming images of good quality with neither beading nor bronzing, and the images formed of the inks have good fastness to heat, light and ozone.

10 Claims, No Drawings

INK AND INK SET FOR INKJET, AND INKJET RECORDING METHOD

FIELD OF THE INVENTION

The present invention relates to an ink for inkjet, an inkset for inkjet, and an inkjet recording method that is capable of providing an image with good quality and good storage stability. Specifically, the present invention relates to an ink for inkjet and and inkset for inkjet that has good jet-out stability and provides an image of good quality and good storage. Additionally, the present invention relates to an ink for inkjet and an inkset for inkjet that have good jet-out stability and provide an image of good quality and good storage stability with no deterioration even in high-humidity storage. Furthermore, the present invention relates to an inkset for inkjet and an inkjet recording method that provides an image of good sorage stability with no deterioration even in high-humidity storage.

BACKGROUND OF THE INVENTION

With the recent popularization of computers, inkjet printers are much used for printing on paper, films, cloths and others, not only in office work but also for home use.

The inkjet recoding method includes a system of applying pressure to ink drops by the use of a piezoelectric device to thereby make the ink drops jet out, a system of thermally bubbling ink to jet the ink drops, a system of using ultrasonic waves, and a system of sucking and jetting ink drops by electrostatic force. For the ink compositions for such inkjet recording, usable are aqueous inks, oily inks and solid (hot-melt) inks. Of those, aqueous inks are most used because of their productivity, handlability, odorlessness and safety.

Colorant to be used in such inkjet recording inks must satisfy the following requirements: Its solubility or dispersibility in solvent is good; it enables high-density recording; its hue is good; it is fast to light, heat, air, water and chemicals; it well fixes in image-receiving material and hardly bleeds out; its storage stability in inks is good; it is not toxic; its purity is high; and it is inexpensive and is readily available. However, it is extremely difficult to seek such colorant that satisfies all these requirements on a high level. Various dyes and pigments have been already proposed for inkjet, and are now in practical use. At present, however, no one knows colorant that satisfies all the requirements. Dyes and pigments heretofore well known in the art such as those listed in Color Index (C.I.) could hardly satisfy both the color hue and the fastness, which inks for inkjet need.

The inventors have studied a high performance ink having both the color hue and the fastness, relating to and ink for inkjet containing a dye. In such study, the inventors found that storage stability of images become lower when aqueous inks are used, and particularly, aqueous inks have week to humidity and deteriorations of image come about when stored in high-humidity, because of dye-movement. Further, inks for inkjet may cause beading or bronzing as they may aggregate and crystallize on image-receiving material, and this is problematic since it lowers the image quality. In addition, inks are desired to have good jet-out stability through nozzles.

SUMMARY OF THE INVENTION

In consideration of the above-mentioned problems, the present invention is to provide inks and ink sets for inkjet with good quality and good storage stability.

The other object of the present invention is to provide inks and inksets for inkjet, which have good jet-out stability and provide good and homogeneous images that are fast to heat, light, ozone and others and have no trouble of beading or bronzing. Additionally, the present invention is to provide inks for inkjet and inksets for inkjet that have good jet-out stability and provide an image of good quality and good storage stability with no deterioration even in high-humidity storage. Furthermore, the present invention is to provide an inkset for inkjet and an inkjet recording method that provides an image of good sorage stability with no deterioration even in high-humidity storage.

The above-mentioned object of the invention may be attained by the following:

In a first aspect, the invention provides an ink for inkjet comprising an aqueous medium, at least one of dyes represented by the following formulae (1) to (4) dissolved or dispersed in the aqueous medium, and at least one of alkylene diols where one alkylene group has at least 3 carbon atoms or their homologues dissolved or dispersed in the aqueous medium:

$$(A_{11}-N=N-B_{11})_n-L \tag{1}$$

wherein $A_{11}$ and $B_{11}$ each independently represent an optionally-substituted heterocyclic group; n is an integer selected from 1 and 2; L represents a substituent bonding to $A_{11}$ or $B_{11}$ at any desired position; when n is 1, L represents a hydrogen atom or a monovalent substituent; and when n is 2, L represents a single bond or a divalent linking group;

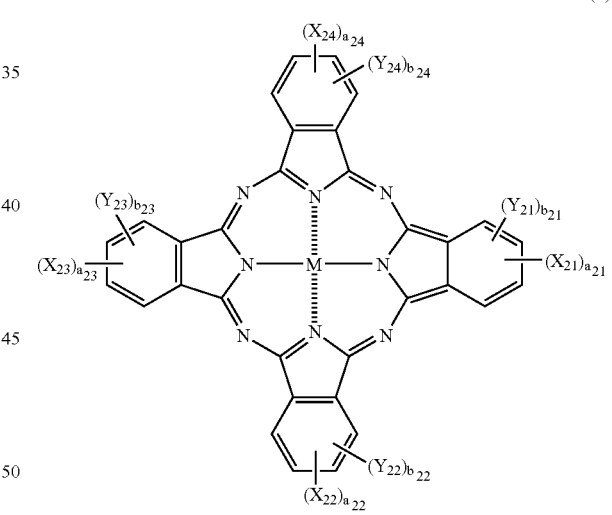

(2)

wherein $X_{21}$, $X_{22}$, $X_{23}$, and $X_{24}$ each independently represent $-SO-Z_2$, $-SO_2-Z_2$, $SO_2NR_{21}R_{22}$, a sulfo group, $-CONR_{21}R_{22}$, or $-CO_2R_{21}$; $Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_{21}$ and $R_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{21}$, $Y_{22}$, $Y_{23}$, and $Y_{24}$ each independently represent a monovalent substituent;

$a_{21}$ to $a_{24}$, and $b_{21}$ to $b_{24}$ indicate the number of the substituents of $X_{21}$ to $X_{24}$ and $Y_{21}$ to $Y_{24}$, respectively; $a_{21}$ to $a_{24}$ each independently represent a number of from 0 to 4, but all of these are not 0 at the same time; $b_{21}$ to $b_{24}$ each independently represent a number of from 0 to 4; and when $a_{21}$ to $a_{24}$, and $b_{21}$ to $b_{24}$ are a number of 2 or more, then plural $X_{21}$'s to $X_{24}$'s and $Y_{21}$'s to $Y_{24}$'s may be the same or different;

M represents a hydrogen atom, a metal atom or its oxide, hydroxide or halide;

(3)

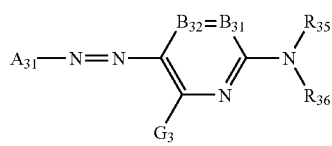

wherein $A_{31}$ represents a 5-membered hetero ring; $B_{31}$ and $B_{32}$ each represent =$CR_{31}$— or —$CR_{32}$=, or either one of them is a nitrogen atom and the other is =$CR_{31}$— or —$CR_{32}$=; $R_{35}$ and $R_{36}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted; $G_3$, $R_{31}$ and $R_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsulfonyl group, a heterocyclic sulfonyl group, an alkyl or arylsulfinyl group, a heterocyclic sulfinyl group, a sulfamoyl group, a sulfo group, or a heterocyclic-thio group, and each group may be substituted; $R_{31}$ and $R_{35}$, or $R_{35}$ and $R_{36}$ may bond to each other to form a 5- or 6-membered ring;

wherein $A_{41}$, $A_{42}$ and $A_{43}$ each independently represent an optionally-substituted aromatic or heterocyclic group; $A_{41}$ and $A_{43}$ are monovalent group, and $A_{42}$ is a divalent group.

The first aspect of the invention includes an ink set for inkjet comprising at least one ink, as described above.

In a second aspect, the invention provides an ink for inkjet comprising an aqueous medium, at least one of dyes represented by the following formulae (1) to (4) dissolved or dispersed in the aqueous medium, and at least one polymer compound dissolved or dispersed in the aqueous medium:

$(A_{11}\text{-N}=\text{N}—B_{11})_n\text{-L}$ (1)

wherein $A_{11}$ and $B_{11}$ each independently represent an optionally-substituted heterocyclic group; n is an integer selected from 1 and 2; L represents a substituent bonding to $A_{11}$ or $B_{11}$ at any desired position; when n is 1, L represents a hydrogen atom or a monovalent substituent; and when n is 2, L represents a single bond or a divalent linking group;

(2)

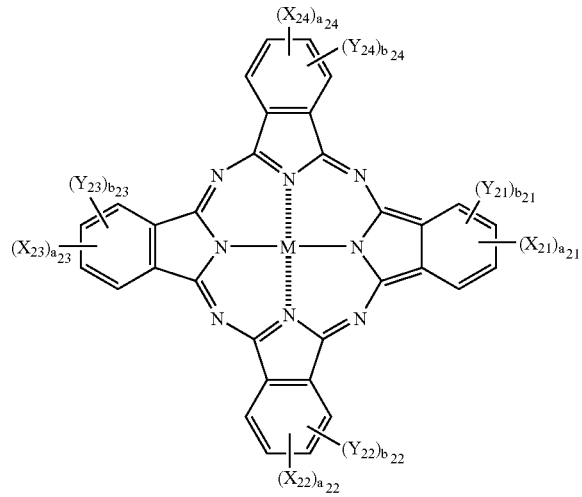

wherein $X_{21}$, $X_{22}$, $X_{23}$, and $X_{24}$ each independently represent —$SO\text{-}Z_2$, —$SO_2\text{-}Z_2$, $SO_2NR_{21}R_{22}$, a sulfo group, —$CONR_{21}R_{22}$, or —$CO_2R_{21}$; $Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_{21}$ and $R_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{21}$, $Y_{22}$, $Y_{23}$, and $Y_{24}$ each independently represent a monovalent substituent;

$a_{21}$ to $a_{24}$, and $b_{21}$ to $b_{24}$ indicate the number of the substituents of $X_{21}$ to $X_{24}$ and $Y_{21}$ to $Y_{24}$, respectively; $a_{21}$ to $a_{24}$ each independently represent a number of from 0 to 4, but all of these are not 0 at the same time; $b_{21}$ to $b_{24}$ each independently represent a number of from 0 to 4; and when $a_{21}$ to $a_{24}$, and $b_{21}$ to $b_{24}$ are a number of 2 or more, then plural $X_{21}$'s to $X_{24}$'s and $Y_{21}$'s to $Y_{24}$'s may be the same or different;

M represents a hydrogen atom, a metal atom or its oxide, hydroxide or halide;

(3)

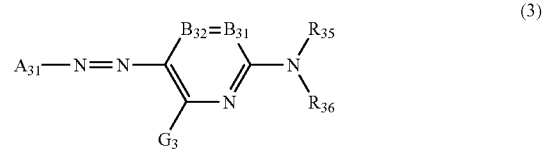

wherein $A_{31}$ represents a 5-membered hetero ring; $B_{31}$ and $B_{32}$ each represent =$CR_{31}$— or —$CR_{32}$=, or either one of them is a nitrogen atom and the other is =CR$_{31}$— or —CR$_{32}$=; R$_{35}$ and R$_{36}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted; G$_3$, R$_{31}$ and R$_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsulfonyl group, a heterocyclic sulfonyl group, an alkyl or arylsulfinyl group, a heterocyclic sulfinyl group, a sulfamoyl group, a sulfo group, or a heterocyclic-thio group, and each group may be substituted;

R$_{31}$ and R$_{35}$, or R$_{35}$ and R$_{36}$ may bond to each other to form a 5- or 6-membered ring;

(4)

wherein A$_{41}$, A$_{42}$ and A$_{43}$ each independently represent an optionally-substituted aromatic or heterocyclic group; A$_{41}$ and A$_{43}$ are monovalent group, and A$_{42}$ is a divalent group.

This second aspect of the invention includes the ink for inkjet as described above, wherein the at least one polymer compound is a latex dispersion.

Further, this second aspect of the invention includes the ink for inkjet as described above, wherein the at least one polymer compound is a water-soluble polymer.

Further, this second aspect of the invention includes the ink for inkjet as described above, wherein the at least one polymer compound has a cationic group.

Still further, the invention includes an ink set for inkjet comprising at least one ink as described in the preceding paragraphs relative to the first and second aspects of the invention.

In a third aspect, the invention provides an ink set for inkjet comprising at least a first ink and a second ink, wherein the first ink contains an aqueous medium and at least one of dyes represented by the following formulae (1) to (4) dissolved or dispersed in the aqueous medium, and the second ink contains at least one compound capable of interacting with the at least one of dyes represented by the following formulae (1) to (4) dissolved or dispersed in the aqueous medium:

(A$_{11}$-N=N—B$_{11}$)$_n$-L    (1)

wherein A$_{11}$ and B$_{11}$ each independently represent an optionally-substituted heterocyclic group; n is an integer selected from 1 and 2; L represents a substituent bonding to A$_{11}$ or B$_{11}$ at any desired position; when n is 1, L represents a hydrogen atom or a monovalent substituent; and when n is 2, L represents a single bond or a divalent linking group;

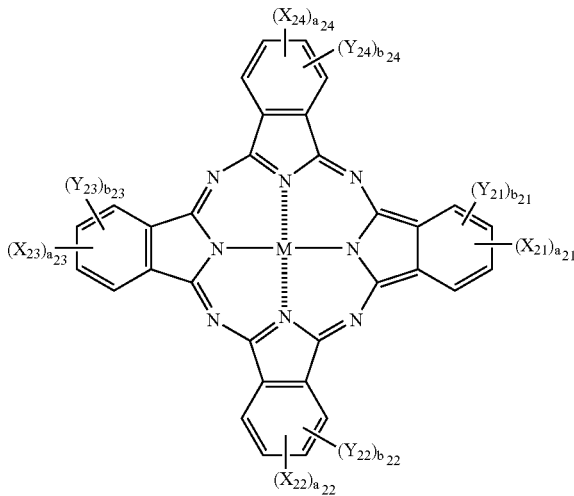

(2)

wherein X$_{21}$, X$_{22}$, X$_{23}$, and X$_{24}$ each independently represent —SO-Z$_2$, —SO$_2$-Z$_2$, SO$_2$NR$_{21}$R$_{22}$, a sulfo group, —CONR$_{21}$R$_{22}$, or —CO$_2$R$_{21}$; Z$_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; R$_{21}$ and R$_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

Y$_{22}$, Y$_{23}$, and Y$_{24}$ each independently represent a monovalent substituent;

a$_{21}$ to a$_{24}$, and b$_{21}$ to b$_{24}$ indicate the number of the substituents of X$_{21}$ to X$_{24}$ and Y$_{21}$ to Y$_{24}$, respectively; a$_{21}$ to a$_{24}$ each independently represent a number of from 0 to 4, but all of these are not 0 at the same time; b$_{21}$ to b$_{24}$ each independently represent a number of from 0 to 4; and when a$_{21}$ to a$_{24}$, and b$_{21}$ to b$_{24}$ are a number of 2 or more, then plural X$_{21}$'s to X$_{24}$'s and Y$_{21}$'s to Y$_{24}$'s may be the same or different;

M represents a hydrogen atom, a metal atom or its oxide, hydroxide or halide;

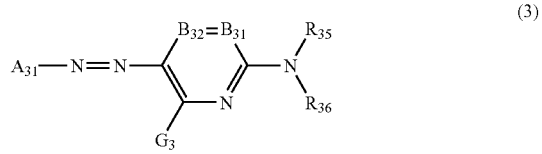

(3)

wherein A$_{31}$ represents a 5-membered hetero ring; B$_{31}$ and B$_{32}$ each represent =CR$_{31}$— or —CR$_{32}$=, or either one of them is a nitrogen atom and the other is =CR$_{31}$— or —CR$_{32}$=; R$_{35}$ and R$_{36}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted; $G_3$, $R_{31}$ and $R_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsulfonyl group, a heterocyclic sulfonyl group, an alkyl or arylsulfinyl group, a heterocyclic sulfinyl group, a sulfamoyl group, a sulfo group, or a heterocyclic-thio group, and each group may be substituted; $R_{31}$ and $R_{35}$, or $R_{35}$ and $R_{36}$ may bond to each other to form a 5- or 6-membered ring;

$$A_{41}\text{—}N\!=\!N\text{-}A_{42}\text{—}N\!=\!N\text{-}A_{43} \tag{4}$$

wherein $A_{41}$, $A_{42}$ and $A_{43}$ each independently represent an optionally-substituted aromatic or heterocyclic group; $A_{41}$ and $A_{43}$ are monovalent group, and $A_{42}$ is a divalent group.

This third aspect of the invention includes an ink set for inkjet as described above, wherein the compound capable of interacting with the dye is a polyvalent metal salt.

Further, this third aspect of the invention includes an ink set for inkjet as described above, wherein the compound capable of interacting with the dye is a polycationic compound.

Still further, the third aspect of the invention includes an inkjet recording method with an ink set as described in the preceding paragraphs comprising a step of forming an image with the first ink and a step of applying the second ink onto the image.

The present invention can provide images with good quality and good storage stability. The first aspect of the present invention is to provide inks for inkjet and and inksets for inkjet that have good jet-out stability and provide an image of good quality and good storage. The second aspect of the present invention is to provide inks for inkjet and inksets for inkjet that have good jet-out stability and provide an image of good quality and good storage stability with no deterioration even in high-humidity storage. The third aspect of the present invention is to provide inksets for inkjet that provides an image of good sorage stability with no deterioration even in high-humidity storage.

DETAILED DESCRIPTION OF THE INVENTION

The invention is described in detail hereinunder.

The first aspect of the invention is an ink that comprises the at least one of dyes represented by the formulae (1) to (4) dissolved or dispersed in an aqueous medium, and this contains an alkylene diol where one alkylene group has at least 3 carbon atoms or its homologue. The ink has good jet-out stability and provides good images of good quality and good storage stability.

Various alkylene diols are known, including, for example, ethylene glycol, propylene glycol, diethylene glycol, triethylene glycol. In the invention, alkylene diols where one alkylene group has at least 3 carbon atoms or their homologues are used. The homologues as referred to herein are meant to indicate partly-modified alkylene diols.

Examples of the modifying group for the homologues are an alkyl group (preferably having from 1 to 20, more preferably from 1 to 12, even more preferably from 1 to 8 carbon atoms, such as methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, such as vinyl, allyl, 2-butenyl, 3-pentenyl), an alkynyl group (preferably having from 2 to 20, more preferably from 2 to 12, even more preferably from 2 to 8 carbon atoms, such as propargyl, 3-pentynyl), an aryl group (preferably having from 6 to 30, more preferably from 6 to 20, even more preferably from 6 to 12 carbon atoms, such as phenyl, p-methylphenyl, naphthyl), an acyl group (preferably having from 1 to 20, more preferably from 1 to 16, even more preferably from 1 to 12 carbon atoms, such as acetyl, benzoyl, formyl, pivaloyl), an alkoxycarbonyl group (preferably having from 2 to 20, more preferably from 2 to 16, even more preferably from 2 to 12 carbon atoms, such as methoxycarbonyl, ethoxycarbonyl), an aryloxycarbonyl group (preferably having from 7 to 20, more preferably from 7 to 16, even more preferably from 7 to 10 carbon atoms, such as phenyloxycarbonyl), a sulfamoyl group (preferably having from 0 to 20, more preferably from 0 to 16, even more preferably from 0 to 12 carbon atoms, such as sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, such as carbamoyl, methylcarbamoyl, diethylcarbamoyl, phenylcarbamoyl), a heterocyclic group (preferably having from 1 to 30, more preferably from 1 to 12 carbon atoms, in which the hetero atom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl).

The modifying groups may be further substituted. Substituents for them are, for example, an alkyl group (preferably having from 1 to 20, more preferably from 1 to 12, even more preferably from 1 to 8 carbon atoms, such as methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, such as vinyl, allyl, 2-butenyl, 3-pentenyl), an alkynyl group (preferably having from 2 to 20, more preferably from 2 to 12, even more preferably from 2 to 8 carbon atoms, such as propargyl, 3-pentynyl), an aryl group (preferably having from 6 to 30, more preferably from 6 to 20, even more preferably from 6 to 12 carbon atoms, such as phenyl, p-methylphenyl, naphthyl), an amino group (preferably having from 0 to 20, more preferably from 0 to 12, even more preferably from 0 to 6 carbon atoms, such as amino, methylamino, dimethylamino, diethylamino, diphenylamino, dibenzylamino), an alkoxy group (preferably having from 1 to 20, more preferably from 1 to 12, even more preferably from 1 to 8 carbon atoms, such as methoxy, ethoxy, butoxy), an aryloxy group (preferably having from 6 to 20, more preferably from 6 to 16, even more preferably from 6 to 12 carbon atoms, such as phenyloxy, 2-naphthyloxy), an acyl group (preferably having from 1 to 20, more preferably from 1 to 16, even more preferably from 1 to 12 carbon atoms, such as acetyl, benzoyl, formyl, pivaloyl), an alkoxycarbonyl group (preferably having from 2 to 20, more preferably from 2 to 16, even more preferably from 2 to 12 carbon atoms, such as methoxycarbonyl, ethoxycarbonyl), an aryloxycarbonyl group (preferably having from 7 to 20, more preferably from 7 to 16, even more preferably from 7 to 10 carbon atoms, such as phenyloxycarbonyl), an acyloxy group (preferably having from 2 to 20, more preferably from 2 to 16, even more preferably from 2 to 10 carbon atoms, such as acetoxy, benzoyloxy), an acylamino group (preferably having from 2 to 20, more preferably from 2 to 16, even more preferably from 2 to 10 carbon atoms, such as acetylamino, benzoylamino), an alkoxycarbonylamino group (preferably having from 2 to 20, more preferably from 2 to 16, even more preferably from 2 to 12 carbon atoms, such as methoxycarbonylamino), an aryloxycarbonylamino group (preferably having from 7 to 20, more preferably from 7 to 16, even more preferably from 7 to 12 carbon atoms, such as phenyloxycarbonylamino), a sulfonylamino group (preferably having from 1 to 20, more preferably from 1 to 16, even more preferably from 1 to 12 carbon atoms, such as methanesulfonylamino, benzenesulfonylamino), a sulfamoyl group (preferably having from 0 to 20, more preferably from 0 to 16, even more preferably from 0 to 12 carbon atoms, such as sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, such as carbamoyl, methylcarbamoyl, diethylcarbamoyl, phenylcarbamoyl), an alkylthio group (preferably having from 1 to 20, more preferably from 1 to 16, even more preferably from 1 to 12 carbon atoms, such as methylthio, ethylthio), an arylthio group (preferably having from 6 to 20, more preferably from 6 to 16, even more preferably from 6 to 12 carbon atoms, such as phenylthio), a sulfonyl group (preferably having from 1 to 20, more preferably from 1 to 16, even more preferably from 1 to 12 carbon atoms, such as mesyl, tosyl), a sulfinyl group (preferably having from 1 to 20, more preferably from 1 to 16, even more preferably from 1 to 12 carbon atoms, such as methanesulfinyl, benzenesulfinyl), an ureido group (preferably having from 1 to 20, more preferably from 1 to 16, even more preferably from 1 to 12 carbon atoms, such as ureido, methylureido, phenylureido), a phosphoric acid group, a phosphoramido group (preferably having from 1 to 20, more preferably from 1 to 16, even more preferably from 1 to 12 carbon atoms, such as diethylphosphoramido, phenylphosphoramido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30, more preferably from 1 to 12 carbon atoms, in which the hetero atom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl), a silyl group (preferably having from 3 to 40, more preferably from 3 to 30, even more preferably from 3 to 24 carbon atoms, such as trimethylsilyl, triphenylsilyl). These substituents may be further substituted. In case where the modifying group has 2 or more substituents, the substituents may be the same or different. If possible, the substituents may bond to each other to form a ring.

Preferably, the alkylene diol homologue compounds bonding any of such modifying groups are miscible with water. Accordingly, it is desirable that the modifying groups have the ability to make the modified homologue compounds soluble in water. To that effect, the modifying groups and their substituents are preferably atomic groups that have many hetero atoms and have a dissociable group, such as a polyoxyethylene group, a hydroxyl group, a mercapto group, a carboxyl group, a sulfo group, a phosphoric acid group, an amino group, a sulfamoyl group, a heterocyclic group, a carbamoyl group.

Preferred examples of the alkylene diol for use in the invention are mentioned below, which, however, are not intended to restrict the scope of the invention.

SOL-1: $HO-(CH_2)_3-OH$

SOL-2: $HO-(CH_2)_4-OH$

SOL-3: $HO-(CH_2)_5-OH$

SOL-4: $HO-(CH_2)_6-OH$

SOL-5: $HO-(CH_2)_7-OH$

SOL-6: $HO-(CH_2)_8-OH$

SOL-7: $HO-(CH_2)_3-O-(CH_2)_2-OH$

SOL-8: $HO-(CH_2)_4-O-(CH_2)_2-OH$

SOL-9: $HO-(CH_2)_3-(OCH_2CH_2)_2-OH$

SOL-10: $HO-(CH_2)_3-(OCH_2CH_2)_3-OH$

SOL-11: $HO-(CH_2)_4-(OCH_2CH_2)_2-OH$

SOL-12: $HO-(CH_2)_4-(OCH_2CH_2)_3-OH$

SOL-13: $HO-(CH_2)_5-(OCH_2CH_2)-OH$

SOL-14: $HO-(CH_2)_5-(OCH_2CH_2)_2-OH$

SOL-15: $HO-(CH_2)_5-(OCH_2CH_2)_3-OH$

SOL-16: $HO-(CH_2)_3-O-CH_2-CH(OH)-CH_3$

SOL-17: $HO-(CH_3)_4-O-CH_2-CH(OH)-CH_3$

SOL-18: $HO-(CH_3)_5-O-CH_2-CH(OH)-CH_3$

SOL-19: $HO-(CH_2)_3-OC(O)CH_3$

SOL-20: $HO-(CH_2)_3-O-C(O)-OCH_3$

SOL-21: $HO-(CH_2)_3-O-C(O)C(O)-OC_2H_5$

SOL-22: $HO-(CH_2)_3-O-(CH_2)_3-OH$

SOL-23: $HO-(CH_2)_3-O-C(O)-CH_2OH$

-continued

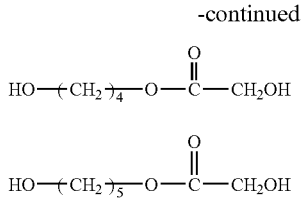

SOL-24

SOL-25

In the ink of the invention, the amount of the alkylene diol or its homologue where one alkylene group has at least 3 carbon atoms may vary in a broad range, but is preferably from 0.001 to 80% by weight, more preferably from 0.01 to 50% by weight.

The second aspect of the invention is an ink that comprises at least one of dyes represented by the formulae (1) to (4) and at least one polymer compound. Containing both the dye and the polymer compound, the ink ensures good jet-out stability and provides images of improved storability even in an oxidizing gas atmosphere and improved stability even under high-humidity condition.

The polymer compound for use in the invention may be either a water-soluble polymer or an oil-soluble water. Since the ink of the invention is an aqueous ink, the water-soluble polymer may be dissolved in the ink. On the other hand, the oil-soluble polymer may be in the ink as a latex dispersion therein. The latex dispersion may be a polymer dispersion that is obtained through emulsion polymerization, or may also be a dispersion that is prepared by once dissolving a polymer compound in a solvent and then emulsifying and dispersing the resulting polymer solution.

The polymer compound for use in the invention may be any of vinyl-polymerization polymers, polycondensation polymers, ring-cleavage polymerization polymers, etc.

Monomer units for the vinyl-polymerization polymers are mentioned below:

Acrylic acid, methyl acrylate, ethyl acrylate, propyl acrylate, butyl acrylate, t-butyl acrylate, hydroxyethyl acrylate, hydroxyethoxyethyl acrylate, octyl acrylate, dodecyl acrylate, acrylamide, N-methylacrylamide, N,N-dimethylacrylamide, N,N-diethylacrylamide, N,N-dibutylacrylamide, N-t-butylacrylamide, N,N-dioctylacrylamide, N-t-octylacrylamide, methacrylic acid, methyl methacrylate, ethyl methacrylate, propyl methacrylate, butyl methacrylate, t-butyl methacrylate, hydroxyethyl methacrylate, hydroxyethoxyethyl methacrylate, octyl methacrylate, dodecyl methacrylate, methacrylamide, N-methylmethacrylamide, N,N-dimethylmethacrylamide, N,N-diethylmethacrylamide, N,N-dibutylmethacrylamide, N-t-butylmethacrylamide, N,N-dioctylmethacrylamide, N-t-octylmethacrylamide, 2-vinylpyridine, 3-vinylpyridine, 4-vinylpyridine, N-vinylpyrazole, N-vinylimidazole, styrene, 4-methylstyrene, styrene-4-sodium sulfonate, styrene-4-sodium sulfinate, 4-vinylbenzoic acid, ethyl 4-vinylbenzoate, N-vinylpyrrolidone, 1-vinylnaphthalane, N-vinylcarbazole, chloromethylstyrene, ethyl vinyl ether, allyl benzoate, vinyl acetate, vinyl benzoate, allyl acetate.

Monomer units for the polycondensation polymers are polycarboxylic acids such as adipic acid and their esters, acid halides, compounds having plural phenolic or alcoholic hydroxyl groups, compounds having plural aryl groups substituted with nucleophilically-substitutable halogen atom, compounds having plural amino groups, and other monomers for condensation of many molecules through ring cleavage such as caprolactams and lactones.

Monomer units for the ring-cleavage polymerization polymers are preferably those having an epoxy group or an oxetane group.

Preferred examples of the polymer for use in the invention are mentioned below, which, however, are not intended to restrict the scope of the invention.

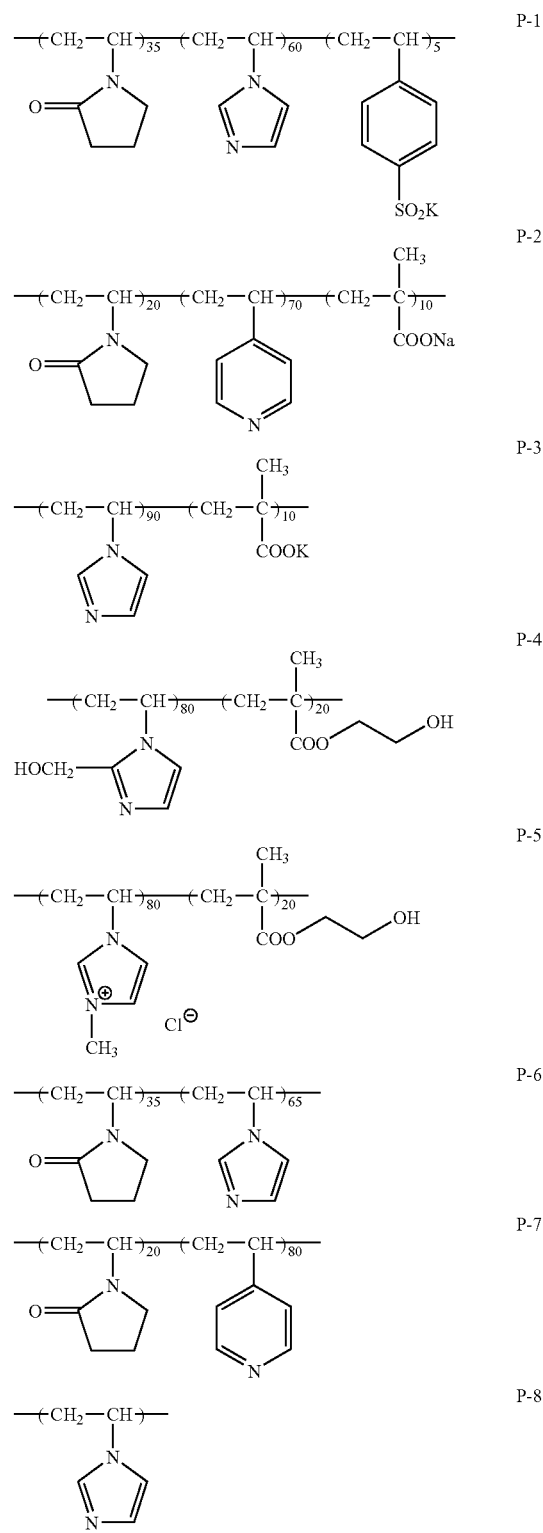

-continued

P-9 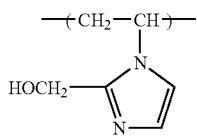

P-10 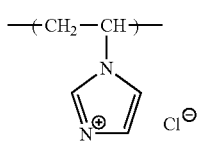

P-11 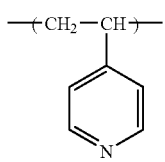

P-12 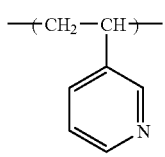

P-13 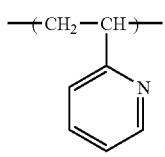

P-14 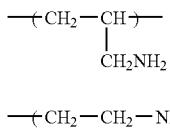

P-15 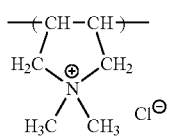

P-16 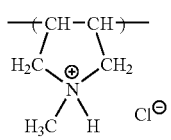

P-17 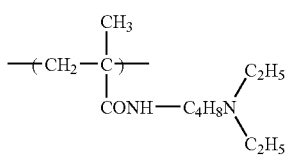

P-18 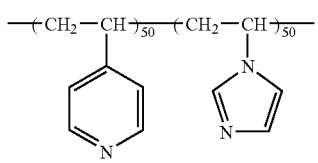

P-19

-continued

P-20 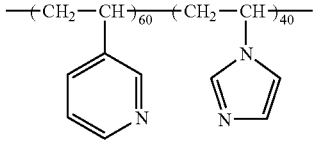

P-21 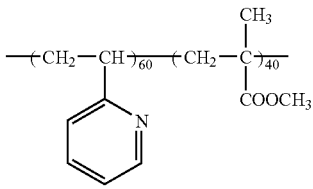

P-22 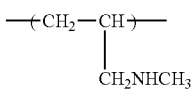

P-23 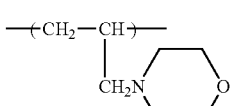

P-24 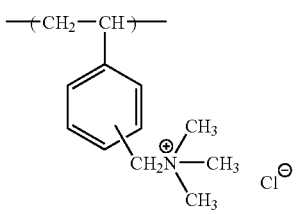

P-25 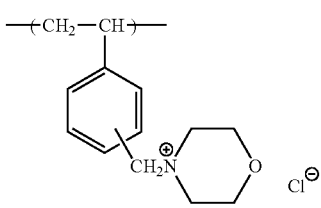

The amount of the polymer compound to be added to the ink of the invention is preferably from 0.001 to 50% by weight, more preferably from 0.01 to 25% by weight of the total amount of the ink.

Preferably, the polymer compound for use in the invention has a cationic group. Having a cationic group, the interactivity of the polymer compound with dyes may be higher and the effect of the invention may be enhanced more. For example, the cationic group may be an onium group such as amino group or ammonium group. The cationic group content of the polymer compound is preferably from 0.01 to 60 mol %, even more preferably from 0.1 to 30 mol % relative to the polymer.

In the third aspect of the invention, an ink that contains at least one compound capable of interacting with at least one of the dyes represented by the formulae (1) to (4) is used. The ink is applied onto an image formed of an ink that contains the dye, whereby the dye is stably fixed and the durability of the image is enhanced.

The interaction with dye may be ionic interaction or hydrogen bonding to make plural molecules react with each other to give a polymerized compound having an increased molecular weight, and the solubility in water of the resulting polymer therefore lowers. Apart from it, the interaction may also be hydrophobic interaction or ionic bonding to charge loss to thereby make the resulting polymer more hydrophobic, and the solubility in water of the polymer therefore lowers. As a result of the interaction of the type, the dye may be stably fixed on an image-receiving material.

The technique of using such a compound capable of interacting with dye is disclosed, for example, in JP-A9-234943, 9-286940, 11-10856, 11-105415, 2000-263921, 2000-281947, 2000-281948, 2001-48934.

In the invention, it is desirable that materials having an especially strong interactivity with the at least one of dyes of formulae (1) to (4) are selectively used.

Concretely, they are divalent or more polyvalent metal salts; polycationic compounds having many cationic groups of, for example, amines, guanidines, amidines or pyridine-type hetero rings; and polymers having a cationic group such as amino, guanidino or amidino group in the backbone chain or side branches thereof.

Preferred examples of the interactive compound are mentioned below, to which, however, the invention should not be limited.

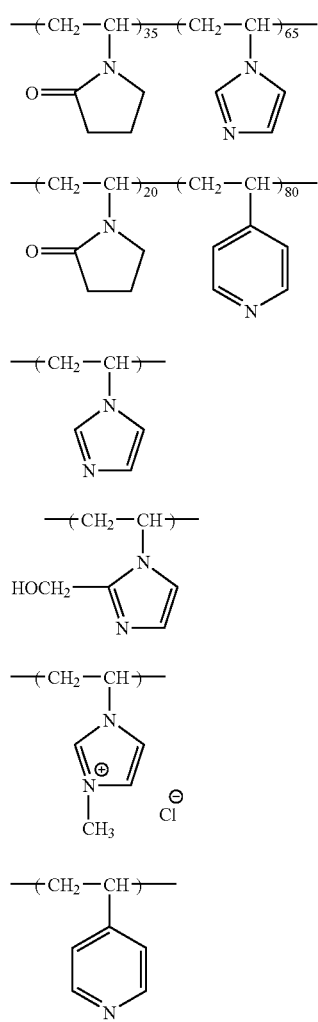

-continued

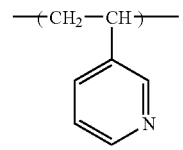
PP-7

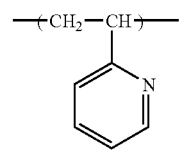
PP-8

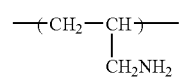
PP-9

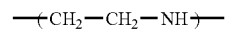
PP-10

PP-11
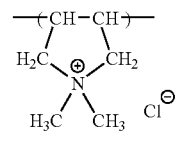

PP-12
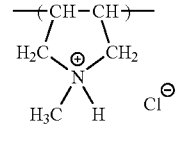

PP-13
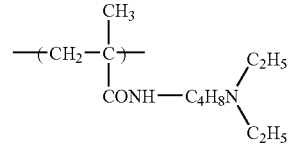

PP-14
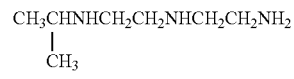

PP-15
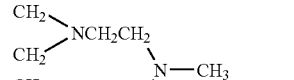

PP-16
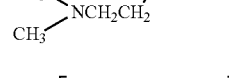

PP-17
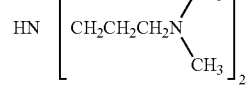

PP-18
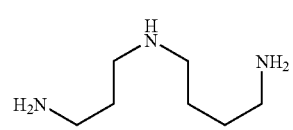

PP-19
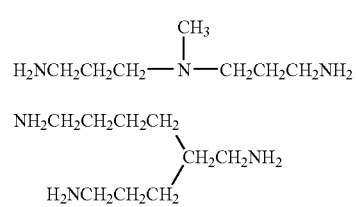

-continued

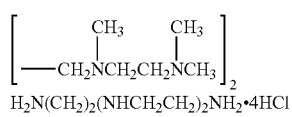
PP-20

$H_2N(CH_2)_2(NHCH_2CH_2)_2NH_2 \cdot 4HCl$
PP-22

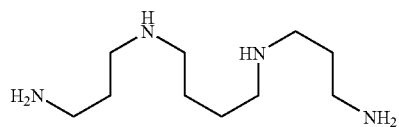

$[H_2NCH_2CH_2CH_2NHCH_2\text{---}]_2$
PP-23

PP-24

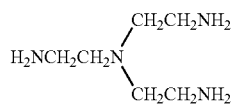

PP-25

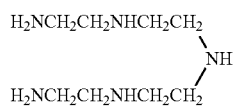

PP-26

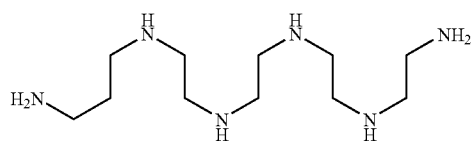

The interactive compound is applied onto the image formed of the dye-containing ink, and it ensures fast fixation of the image on image-receiving material.

In this case, the jet-out nozzle for the compound-containing ink may be the same as or different from that of the dye-containing ink. However, since the interactivity of the compound with the dye is high, it is desirable that the two inks are jetted out through different nozzles.

For image formation, the dye-containing ink is jetted out for printing, and about that time the interactive compound-containing ink is jetted out onto it for image fixation. However, in order that the dye-containing ink could be smoothly absorbed by image-receiving material, it is desirable that the dye-containing ink is first jetted out for printing and then the interactive compound-containing ink is jetted out onto it for image fixation. In this case, the interactive compound-containing ink may be imagewise applied onto the image, but may be applied thereonto to entirely cover all the image.

The amount of the interactive compound to be in the ink may be from 0.0001 to 1000 times, but preferably from 0.001 to 100 times, more preferably from 0.01 to 10 times by weight, relative to the dye in the whole weight of the ink.

For formation of images of higher quality, a compound capable of further enhancing the activity of the interactive compound may be previously added to image-receiving material.

In the present invention, an aqueous medium means water or a mixture of water and a small amount of a water-miscible organic solvent, if necessary, these may contain additives such as a hemectant, a stabilizer, and a antiseptic.

Dyes for use in the invention, including those of formulae (1) to (4), are described below.

In the invention, it is desirable to use positive dyes having an oxidation potential of more positive than 1.0 V (preferably more positive than 1.1 V, more preferably more positive than 1.15 V). Positive dyes having an oxidation potential of more positive than 1.0 V give images of good durability, especially of good ozone resistance.

The oxidation potential (Eox) of dyes may be readily measured by anyone skilled in the art. The method for the measurement is described in, for example, P. Delahay, *New Instrumental Methods in Electrochemistry*, 1954, Interscience Publishers; A. J. Bard et al., *Electrochemical Methods*, 1980, John Wiley & Sons; A. Fujishima et al., *Electrochemical Measurement Methods*, 1984, Gihodo Publishing.

Measurement of oxidation potential is described concretely. A sample to be analyzed is dissolved in a solvent such as dimethylformamide or acetonitrile that contains a supporting electrolyte such as sodium perchlorate or tetrapropylammonium perchlorate to have a concentration of from $1 \times 10^{-6}$ to $1 \times 10^{-2}$ mol/liter, and its value of oxidation potential versus SCE (saturated calomel electrode) is measured through cyclic voltammetry. The value of oxidation potential may deviate by tens millivolts or so, owing to the influence of the liquid junction potential or the sample solution resistance thereon, but it may be calibrated with a standard sample (e.g., hydroquinone). In that manner, the reproducibility of the thus-measured potential value is ensured. In the invention, the oxidation potential of dye is measured in dimethylformamide (in this, the concentration of the dye is 0.001 mold·dm$^{-3}$) that contains 0.1 mol·dm$^{-3}$ of a supporting electrolyte, tetrapropylammonium perchlorate using SCE, in order to indiscriminately define the potential. Some water-soluble dyes would be difficult to directly dissolve in N,N-dimethylformamide. In such a case, the dye is dissolved in a smallest possible amount of water, and then it is diluted with N,N-dimethylformamide to reduce the water content of the resulting dye solution to at most 2%.

The oxidation potential (Eox) indicates the electron mobility from sample to electrode. Positive samples having a larger value of Eox (those having a more positive oxidation potential) mean that electrons move more hardly from them to electrode, or that is, the samples are more hardly oxidized. Relative to the structure of compounds, introduction of an electron-attractive group makes the compounds more positive in point of the oxidation potential while introduction of an electron-donating group makes the compounds baser.

The dyes having the above-mentioned characteristics are, for example, azo dyes (yellow dyes, magenta dyes, black dyes) and phthalocyanine dyes (cyan dyes) that have specific properties and structures. The dyes are described below.

[Yellow Dyes]

The yellow dyes for use in the invention are preferably as follows: An ink that contains the yellow dye is printed on a reflection medium, and its reflection density is measured through a status A filter. One point of the sample having a reflection density ($D_B$) of from 0.90 to 1.10 in the yellow region is defined as the initial density of the ink, and the printed sample is forcedly faded by the use of an ozone fading tester where 5 ppm ozone is generated all the time. The period of time (t) for which the reflection density of the faded sample is reduced to 80% (retentiveness) of the initial density of the original sample is counted, and a forced fading rate constant (k) is derived from it. Preferably, the rate constant of the yellow dyes for use in the invention is at most $5.0 \times 10^{-2}$ [hour$^{-1}$]. The yellow dyes of the type improve the fastness of the ink, especially the fastness to ozone gas of the ink. From this viewpoint, the rate constant is more preferably at most $3.0 \times 10^{-2}$ [hours$^{-1}$], even more preferably at most $1.0 \times 10^{-2}$ [hour$^{-1}$].

The reflection density is measured with a reflection densitometer (X-Rite 31-TR) through a status A filter (blue). The forced fading rate constant (k) is derived from the retentiveness=exp(-kt), or that is, k=(-ln0.8)/t.

In the yellow dyes for use in the invention, it is desirable to use dyes having an oxidation potential of more positive than 1.0 V (vs SCE), preferably more positive than 1.1 V (vs SCE), even preferably more positive than 1.15 V (vs SCE), in terms of the fastness of the ink, especially the fastness to ozone gas of the ink. The kind of azo dye satisfying physical properties as referred to above is more preferable.

In addition to having good fastness, it is further desirable that the yellow dyes for use in the invention give good hue, and more preferably, the long wavelength side of the absorption spectral pattern of the dyes shows a sharply-ending tail profile. Accordingly, it is desirable that the aqueous solution of the yellow dye has a value of λmax within a range of from 390 nm to 470 mm, and the ratio of the absorbance at (λmax+70 nm), I(λmax+70 nm) to the absorbance at λmax I(λmax), I(λmax+70 nm)/I(λmax) is at most 0.2. More preferably, the ratio is at most 0.1. The absorption wavelength and the absorbance defined here mean values in solvent.

The dyes that satisfy the requirements of the oxidation potential and the absorption characteristics as above are, for example, those of the following formula (1):

$(A_{11}-N=N-B_{11})_n-L$       (1)

In the formula, $A_{11}$ and $B_{11}$ each independently represent an optionally-substituted heterocyclic group. The hetero ring is preferably 5-membered or 6-membered, and it may have a monocyclic structure or a polycyclic structure formed through condensation of at least 2 rings, and may be an aromatic hetero ring or a non-aromatic hetero ring. The hetero atom to constitute the hetero ring is preferably any of N, O and S atoms n is an integer selected from 1 and 2, but is preferably 2. L represents a substituent bonding to $A_{11}$ or $B_{11}$ at any desired position. When n is 1, then L represents a hydrogen atom or a monovalent substituent; and when n is 2, then L represents a single bond or a divalent linking group.

In formula (1), the hetero ring for $A_{11}$ is preferably any of 5-pyrazolone, pyrazole, triazole, oxazolone, isoxazolone, barbituric acid, pyridone, pyridine, rhodanine, pyrazolidinedione, pyrazolopyridone, Meldrum's acid, and condensed hetero rings formed through condensation of these hetero rings with any additional hydrocarbon aromatic ring or hetero ring. Above all, 5-pyrazolone, 5-aminopyrazole, pyridone, 2,6-diaminopyridine, and pyrazoloazole are preferred; and 5-aminopyrazole, 2-hydroxy-6-pyridone and pyrazolotriazole are more preferred.

For the hetero ring for $B_{11}$, preferred are pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine, thiazoline. Of those, more preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole; and even more preferred are quinoline, thiophene, pyrazole, thiazole, benzoxazole, benzisoxazole, isothiazole, imidazole, benzothiazole, thiadiazole; and still more preferred are pyrazole, benzothiazole, benzoxazole, imidazole, 1,2,4-thiadiazole, 1,3,4-thiadiazole.

$A_{11}$ and $B_{11}$ may be substituted, and examples of the substituent for them are a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, an alkyl or arylsulfinyl group, an alkyl or arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group and a ionic hydrophilic group mentioned below The monovalent substituent for L includes the above-mentioned substituents for $A_{11}$ and $B_{11}$, and ionic hydrophilic groups mentioned below. The divalent linking group for L includes an alkylene group, an arylene group, a heterocyclic residue, —CO—, —$SO_n$— (where n is 0, 1, 2), —NR— (where R is a hydrogen atom, an alkyl group, an aryl group), —O—, and a divalent group formed by combining these linking groups. These may be further substituted with any of the substituents mentioned hereinabove for $A_{11}$ and $B_{11}$ or the ionic hydrophilic groups mentioned below.

In case where the dyes of formula (1) are used as water-soluble dyes, the dyes preferably have at lease one ionic hydrophilic group in the molecule. The ionic hydrophilic group includes, for example, a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. In specific, most preferred contains at least one carboxyl group. The carboxyl group, phosphono group and sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal salts.

Of the dyes of formula (1), more preferred are those where the moiety of $A_{11}$-N=N—$B_{11}$ corresponds to the structure of formula (1-A), (1-B) or (1-C).

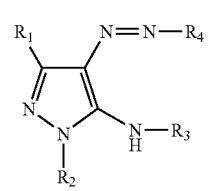

(1-A)

wherein $R_1$ and $R_3$ each represent a hydrogen atom, a cyano group, an alkyl group, a cycloalkyl group, an aralkyl group, an alkoxy group, an alkylthio group, an arylthio group, an aryl group, or an ionic hydrophilic group; $R_2$ represents a hydrogen atom, an alkyl group, a cycloalkyl group, an aralkyl group, a carbamoyl group, an acyl group, an aryl group, or a heterocyclic group; and $R_4$ represents a heterocyclic group.

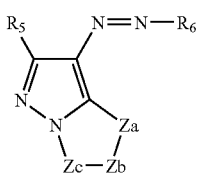

(1-B)

wherein $R_5$ represents a hydrogen atom, a cyano group, an alkyl group, a cycloalkyl group, an aralkyl group, an alkoxy group, an alkylthio group, an arylthio group, an aryl group, or an ionic hydrophilic group; Za represents —N=, —NH—, or —C($R_{11}$)=; Zb and Zc each independently represent —N= or —C($R_{11}$)=; $R_{11}$ represents a hydrogen atom or a non-metallic substituent; $R_6$ represents a heterocyclic group.

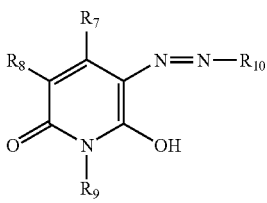

(1-C)

wherein $R_7$ and $R_9$ each independently represent a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; $R_8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, an sulfonyl group, an acyl group, an alkylamino group, an arylamino group, a hydroxyl group, or an ionic hydrophilic group; $R_{10}$ represents a heterocyclic group.

The alkyl group for $R_1$, $R_2$, $R_3$, $R_5$, $R_7$, $R_8$ and $R_9$ in formulae (1-A), (1-B) and (1-C) includes a substituted alkyl group and an unsubstituted alkyl group. Preferably, the alkyl group has from 1 to 20 carbon atoms. Examples of the substituent for the alkyl group are a hydroxyl group, an alkoxy group, a cyano group, a halogen atom, and an ionic hydrophilic group. Examples of the alkyl group are methyl, ethyl, butyl, isopropyl, t-butyl, hydroxyethyl, methoxyethyl, cyanoethyl, trifluoromethyl, 3-sulfopropyl and 4-sulfobutyl groups.

The cycloalkyl group for $R_1$, $R_2$, $R_3$, $R_5$, $R_7$, $R_8$ and $R_9$ includes a substituted cycloalkyl group and an unsubstituted cycloalkyl group. Preferably, the cycloalkyl group has from 5 to 12 carbon atoms. An example of the substituent for the cycloalkyl group is an ionic hydrophilic group. An example of the cycloalkyl group is a cyclohexyl group. The aralkyl group for $R_1$, $R_2$, $R_3$, $R_5$, $R_7$, $R_8$ and $R_9$ includes a substituted aralkyl group and an unsubstituted aralkyl group. Preferably, the cycloalkyl group has from 7 to 20 carbon atoms. An example of the substituent for the aralkyl group is an ionic hydrophilic group. Examples of the aralkyl group are benzyl and 2-phenethyl groups.

The aryl group for $R_1$, $R_2$, $R_3$, $R_5$, $R_7$, and $R_9$ includes a substituted aryl group and an unsubstituted aryl group. Preferably, the aryl group has from 6 to 20 carbon atoms. Examples of the substituent for the aryl group are an alkyl group, an alkoxy group, a halogen atom, an alkylamino group, and an ionic hydrophilic group. Examples of the aryl group are phenyl, p-tolyl, p-methoxyphenyl, o-chlorophenyl, and m-(3-sulfopropylamino)phenyl groups.

The alkylthio group for $R_1$, $R_2$, $R_3$, $R_5$, $R_7$, $R_8$ and $R_9$ includes a substituted alkylthio group and an unsubstituted alkylthio group. Preferably, the alkylthio group has from 1 to 20 carbon atoms. An example of the substituent for the alkylthio group is an ionic hydrophilic group. Examples of the alkylthio group are methylthio and ethylthio groups.

The arylthio group for $R_1$, $R_2$, $R_3$, $R_5$, $R_7$, $R_8$ and $R_9$ includes a substituted arylthio group and an unsubstituted arylthio group. Preferably, the arylthio group has from 6 to 20 carbon atoms. Examples of the substituent for the arylthio group are an alkyl group and an ionic hydrophilic group. Examples of the arylthio group are phenylthio and p-tolylthio groups.

The heterocyclic group for $R_2$ to be mentioned hereinunder is preferably 5-membered or 6-membered, and it may be condensed with any other ring. For the hetero atom to constitute the hetero ring, preferred are N, S and O. The hetero ring for the group may be an aromatic hetero ring or a non-aromatic hetero ring. The hetero ring may be further substituted. For the substituent for the ring, referred to are those to be mentioned hereinunder for the substituent for an aryl group. Preferably, the hetero ring is a 6-membered, nitrogen-containing aromatic hetero ring; its preferred examples are triazine, pyrimidine and phthalazine.

The halogen atom for $R_8$ includes, for example, fluorine atom, chlorine atom and bromine atom. The alkoxy group for $R_1$, $R_3$, $R_5$ and $R_8$ includes a substituted alkoxy group and an unsubstituted alkoxy group. Preferably, the alkoxy group has from 1 to 20 carbon atoms. Examples of the substituent for the alkoxy group are a hydroxyl group and anionic hydrophilic group. Examples of the alkoxy group are methoxy, ethoxy, isopropoxy, methoxyethoxy, hydroxyethoxy and 3-carboxypropoxy groups.

The aryloxy group for $R_8$ includes a substituted alkoxy group and an unsubstituted alkoxy group. Preferably, the aryloxy group has from 6 to 20 carbon atoms. Examples of the substituent for the aryloxy group are an alkoxy group and an ionic hydrophilic group. Examples of the aryloxy group are phenoxy, p-methoxyphenoxy and o-methoxyphenoxy groups.

The acylamino group for $R_8$ includes a substituted acylamino group and an unsubstituted acylamino group. Preferably, the acylamino group has from 2 to 20 carbon atoms. An example of the substituent for the acylamino group is an ionic hydrophilic group. Examples of the acylamino group are acetamido, propionamido, benzamido and 3,5-disulfobenzamido groups.

The sulfonylamino group for $R_8$ includes a substituted sulfonylamino group and an unsubstituted sulfonylamino group. Preferably, the sulfonylamino group has from 1 to 20 carbon atoms. Examples of the sulfonylamino group are methylsulfonylamino and ethylsulfonylamino groups.

The alkoxycarbonylamino group for $R_8$ includes a substituted alkoxycarbonylamino group and an unsubstituted alkoxycarbonylamino group. Preferably, the alkoxycarbonylamino group has from 2 to 20 carbon atoms. An example of the substituent for the alkoxycarbonylamino group is an ionic hydrophilic group. An example of the alkoxycarbonylamino group is an ethoxycarbonylamino group.

The ureido group for $R_8$ includes a substituted ureido group and an unsubstituted ureido group. Preferably, the ureido group has from 1 to 20 carbon atoms. Examples of the substituent for the ureido group are an alkyl group and an aryl group. Examples of the ureido group are 3-methylureido, 3,3-dimethylureido and 3-phenylureido groups.

The alkoxycarbonyl group for $R_7$, $R_8$ and $R_9$ includes a substituted alkoxycarbonyl group and an unsubstituted alkoxycarbonyl group. Preferably, the alkoxycarbonyl group has from 2 to 20 carbon atoms. An example of the substituent for the alkoxycarbonyl group is an ionic hydrophilic group. Examples of the alkoxycarbonyl group are methoxycarbonyl and ethoxycarbonyl groups.

The carbamoyl group for $R_2$, $R_7$, $R_8$ and $R_9$ includes a substituted carbamoyl group and an unsubstituted carbamoyl group. An example of the substituent for the carbamoyl group is an alkyl group. Examples of the carbamoyl group are methylcarbamoyl and dimethylcarbamoyl groups.

The sulfamoyl group for $R_8$ includes a substituted sulfamoyl group and an unsubstituted sulfamoyl group. An example of the substituent for the sulfamoyl group is an alkyl group. Examples of the sulfamoyl group are dimethylsulfamoyl and di-(2-hydroxyethyl)sulfamoyl groups.

The sulfonyl group for $R_8$ includes an alkylsulfonyl group, an arylsulfonyl group and a heterocyclic sulfonyl group, and these groups may be further substituted. One example of the substituent is an ionic hydrophilic group. Examples of the sulfonyl group are methylsulfonyl and phenylsulfonyl groups.

The acyl group for $R_2$ and $R_8$ includes a substituted acyl group and an unsubstituted acyl group. Preferably, the acyl group has from 1 to 20 carbon atoms. An example of the substituent for the acyl group is an ionic hydrophilic group. Examples of the acyl group are acetyl and benzoyl groups.

The amino group for $R_8$ includes a substituted amino group and an unsubstituted amino group. Examples of the substituent for the amino group are an alkyl group, an aryl group, and a heterocyclic group. Examples of the amino group are methylamino, diethylamino, anilino and 2-chloroanilino groups.

The heterocyclic group for $R_4$, $R_6$ and $R_{10}$ may be the same as the optionally-substituted heterocyclic group for $B_{11}$ in formula (1). For its preferred examples, more preferred examples and even more preferred examples, referred to are those mentioned hereinabove for the group for $B_{11}$. Concretely, the substituent for the heterocyclic group includes, for example, an ionic hydrophilic group, an alkyl group having from 1 to 12 carbon atoms, an aryl group, an alkyl or arylthio group, a halogen atom, a cyano group, a sulfamoyl group, a sulfonamino group, a carbamoyl group, and an acylamino group. The alkyl group and the aryl group may be further substituted.

In formula (1-B), Za represents —N=, —NH— or —C($R_{11}$)=; Zb and Zc each independently represent —N= or —C($R_{11}$)=; and $R_{11}$ represents a hydrogen atom or a non-metallic substituent. For the non-metallic substituent for R11, preferred are a cyano group, a cycloalkyl group, an aralkyl group, an aryl group, an alkylthio group, an arylthio group, and an ionic hydrophilic group. These substituents may have the same meanings as those of the substituents for $R_1$, and their preferred examples may also be the same as those for R1. Examples of the skeleton of the hetero ring that comprises two 5-membered rings in formula (1-B) are mentioned below.

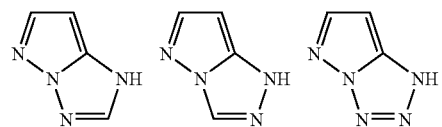

For examples of the substituent for the optionally-substituted groups mentioned above, referred to are those mentioned hereinabove for the optionally-substituted groups for the hetero rings $A_{11}$ and $B_{11}$ in formula (1).

Of the dyes of formulae (1-A), (1-B) and (1-C), preferred are those of formula (1-A), and more preferred are those of the following formula (1-A1):

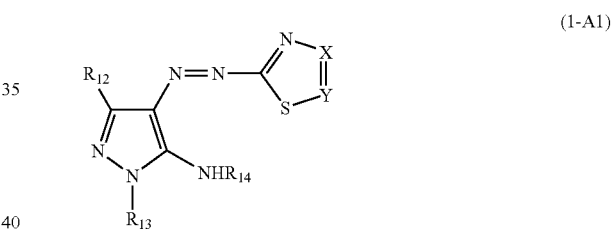

(1-A1)

wherein $R_{12}$ and $R_{14}$ each represent a hydrogen atom, an alkyl group, a cycloalkyl group, an aralkyl group, an alkoxy group or an aryl group; $R_{13}$ represents a hydrogen atom, an aryl group or a heterocyclic group; one of X and Y represents a nitrogen atom and the other represents —C$R_{15}$; $R_{15}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group. Especially preferred are a hydrogen atom, an alkyl group, an alkyl or arylthio group, and an aryl group; and more preferred are a hydrogen atom, an alkylthio group and an aryl group. These groups may be further substituted.

Preferred examples of the dyes for use in the invention are described in Japanese Patent Application No. 2003-286844, JP-A-2003-277662, 2003-277661 2003-128953, and 2003-41160. Especially preferred for use in the invention are mentioned below. However, the dyes usable in the invention should not be limited to these. These compounds may be produced with reference to the above-mentioned patent publications and JP-A-2-24191, 2001-279145

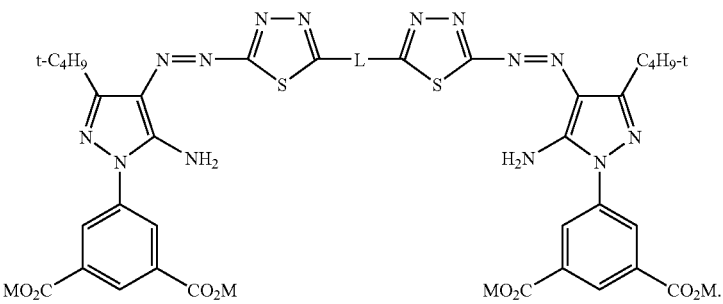
| イエロー染料 | L | M |
|---|---|---|
| Y-1 | —SCH₂CH₂S— | Na |
| Y-2 | —SCH₂CH₂S— | Li |
| Y-3 | —SCH₂CH₂CH₂S— | Na |
| Y-4 | —SCH₂CH₂CH₂S— | K |
| Y-5 | —SCH₂CH₂CH₂S— | Li |
| Y-6 | —SCH₂CH₂CH₂S— | NH₄ |
| Y-7 | —SCH₂CH₂CH₂S— | HN(Et)₃ |
| Y-8 | —SCH₂CH(CH₃)S— | Na |
| Y-9 | —SCH₂CH₂OCH₂CH₂S— | Na |
| Y-10 | —SCH₂CH(OH)CH₂S— | Na |
| Y-11 | —SCH₂CH(CH₂OH)S— | Na |
| Y-12 | —SCH₂CH(CO₂Na)S— | Na |
| Y-13 | (m-phenylene) | Na |
| Y-14 | —C₆H₄—NHCONH—C₆H₄— | Na |
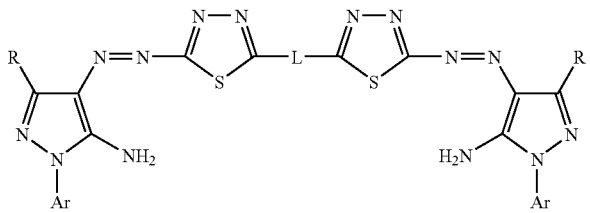
| イエロー染料 | Ar | L | R |
|---|---|---|---|
| Y-15 | (4-methyl-1,2-bis(CO₂Na)phenyl) | —SCH₂CH₂CH₂S— | t-C₄H₉— |

| | | | |
|---|---|---|---|
| Y-16 | 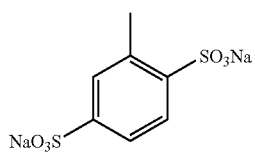 | —SCH₂CH₂CH₂S— | t-C₄H₉— |
| Y-17 | 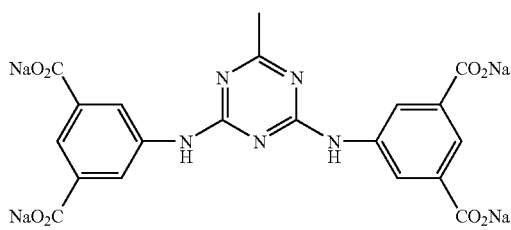 | —SCH₂CH₂CH₂S— | t-C₄H₉— |
| Y-18 | 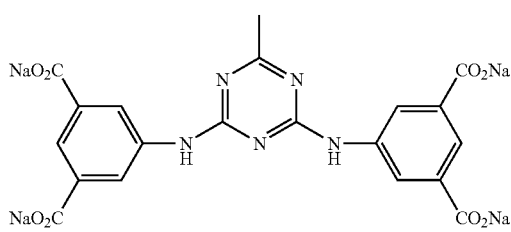 | —SCH₂CH₂S— | t-C₄H₉— |
| Y-19 | 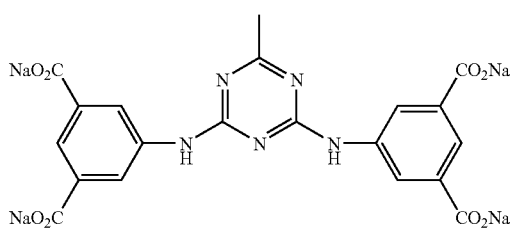 | —CH₂CH₂CH₂CH₂— | t-C₄H₉— |
| Y-20 | 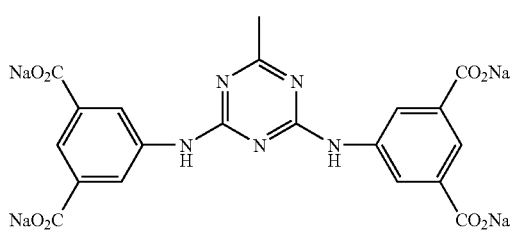 | 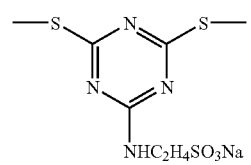 | t-C₄H₉— |
| Y-21 | 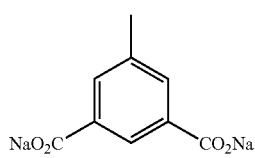 | —SCH₂CH₂CH₂S— | Ph |
| Y-22 | 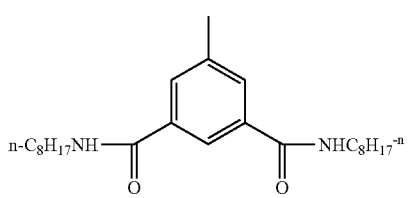 | —SCH₂CH₂CH₂S— | t-C₄H₉— |

-continued
| | | | |
|---|---|---|---|
| Y-23 |  | —SCH₂CH₂S— | t-C₄H₉— |
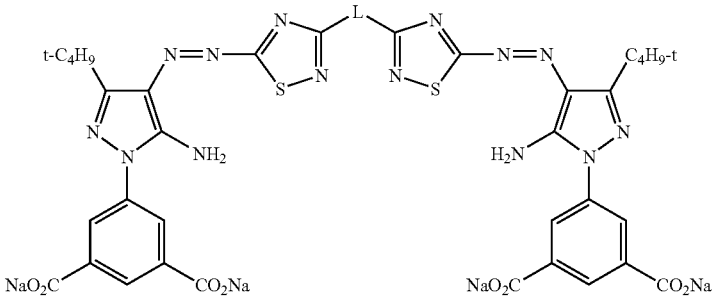
| イエロー染料 | L |
|---|---|
| Y-24 | —SCH₂CH₂CH₂S— |
| Y-25 | 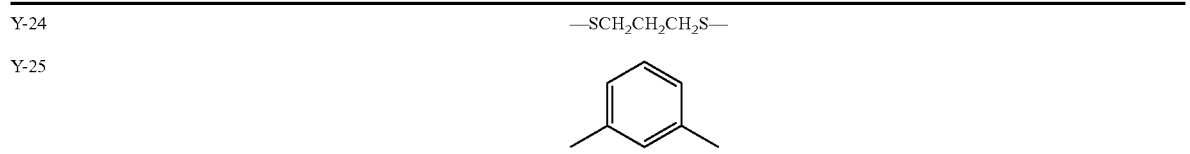 |
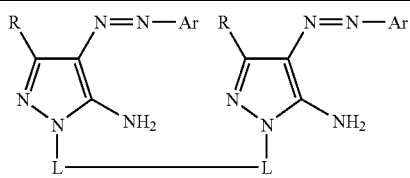
| イエロー染料 | Ar | L | R |
|---|---|---|---|
| Y-26 | 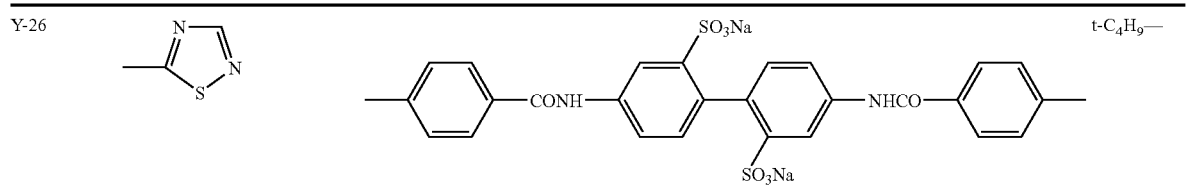 | | t-C₄H₉— |
| Y-27 | 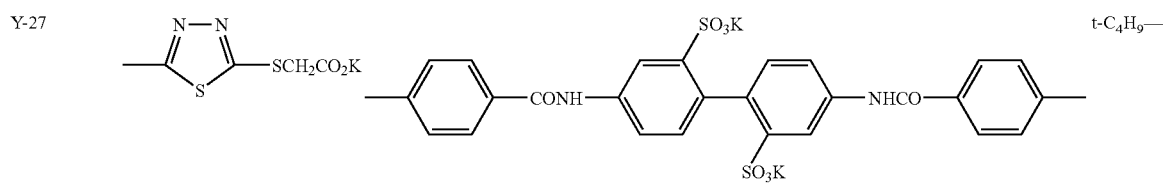 | | t-C₄H₉— |
| Y-28 | 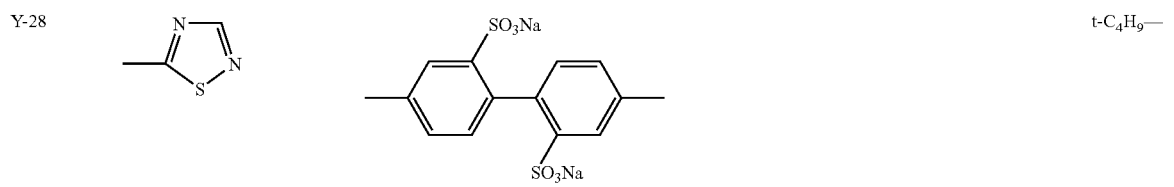 | | t-C₄H₉— |
| Y-29 | 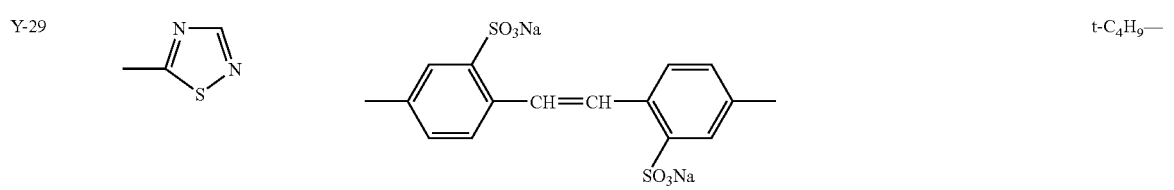 | | t-C₄H₉— |

-continued
| | | | |
|---|---|---|---|
| Y-30 | 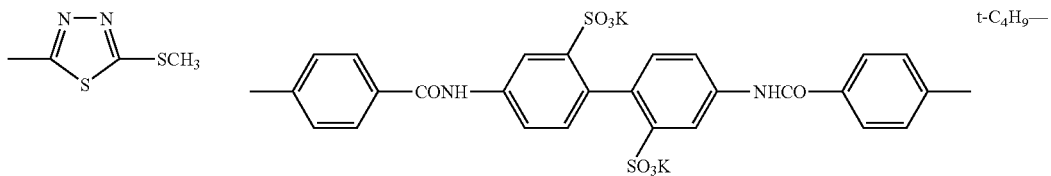 | | t-C$_4$H$_9$— |
| Y-31 | 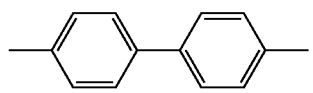 | 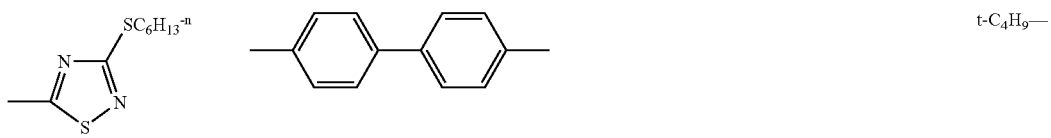 | t-C$_4$H$_9$— |
| Y-32 | 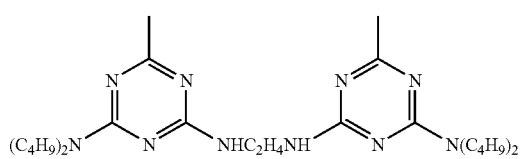 | 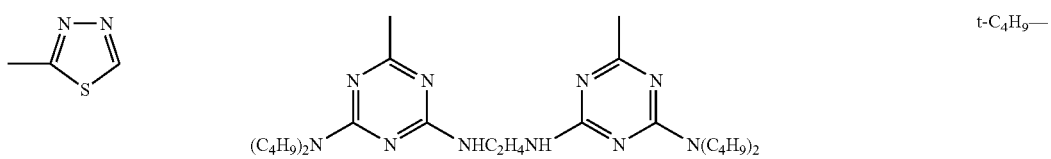 | t-C$_4$H$_9$— |
| Y-33 | 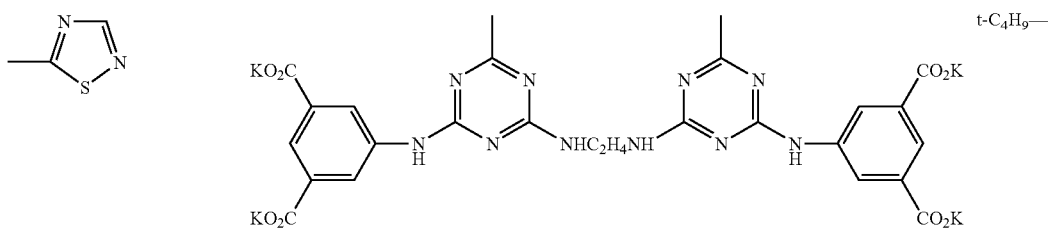 | | t-C$_4$H$_9$— |
| Y-34 | 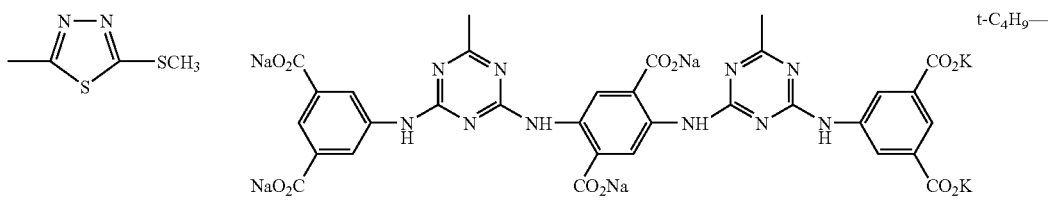 | | t-C$_4$H$_9$— |
| Y-35 | 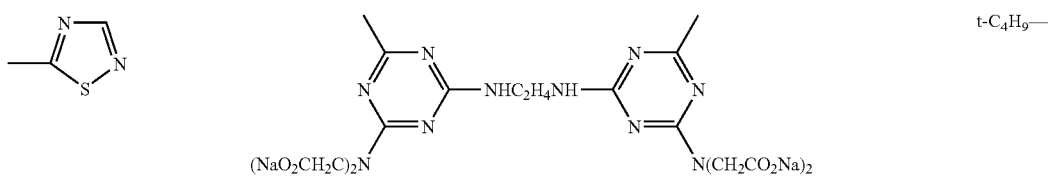 | | t-C$_4$H$_9$— |

-continued

| イエロー染料 | Ar | R1 | R2 |
|---|---|---|---|
| Y-36 | (5-methyl-1,2,4-thiadiazol-3-yl) | t-C$_4$H$_9$— | —NH–(3,5-di-CO$_2$K-phenyl) |
| Y-37 | (5-methyl-1,2,4-thiadiazol-3-yl with SC$_2$H$_4$CO$_2$Na) | t-C$_4$H$_9$— | —NHC$_2$H$_4$SO$_3$Na |
| Y-38 | (5-methyl-1,3,4-thiadiazol-2-yl) | Ph | —NHC$_{12}$H$_{25}$-n |

| イエロー染料 | Ar | R |
|---|---|---|
| Y-39 | (5-methyl-1,2,4-thiadiazol-3-yl) | —NH–(3,5-di-SO$_3$Na-phenyl) |
| Y-40 | (5-methyl-3-Ph-1,2,4-thiadiazolyl) | —NH–(3,5-di-CO$_2$K-phenyl) |

-continued

| | | |
|---|---|---|
| Y-41 | 5-methyl-1,3,4-thiadiazol-2-yl–SCH$_2$CO$_2$Na | —NHC$_2$H$_4$SO$_3$Na |
| Y-42 | 2-methyl-4,5-dicyano-1-(CH$_2$CO$_2$Na)-imidazolyl | —NHC$_2$H$_4$SO$_3$Na |
| Y-43 | 5-methyl-1,3,4-thiadiazol-2-yl–SCH$_2$CO$_2$Na | —NH–C$_6$H$_3$(CO$_2$Na)$_2$ (3,5-) |
| Y-44 | 5-methyl-1,3,4-thiadiazol-2-yl–SCH(CO$_2$Na)CH$_2$CO$_2$Na | —NH–C$_6$H$_3$(CO$_2$Na)$_2$ (3,5-) |
| Y-45 | 3-phenyl-5-methyl-1,2,4-thiadiazolyl | —N(CH$_2$CHC$_4$H$_9^{-n}$)$_2$ with C$_2$H$_5$ |

Structure: 
t-C$_4$H$_9$–pyrazole with N=N—Ar at 4-position, NH$_2$ at 5-position, and 1-position bearing a 1,3,5-triazine ring substituted with two R groups at 4,6-positions.

| イエロー染料 | Ar | R |
|---|---|---|
| Y-46 | 5-methyl-1,2,4-thiadiazol-3-yl | —NHC$_2$H$_4$SO$_3$Na |
| Y-47 | 5-methyl-1,2,4-thiadiazol-3-yl | —NH–C$_6$H$_3$(CO$_2$K)$_2$ (3,5-) |
| Y-48 | 5-methyl-1,2,4-thiadiazol-3-yl | —NH–C$_6$H$_3$(SO$_3$K)$_2$ (2,5-) |

-continued
| | | |
|---|---|---|
| Y-49 | 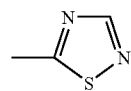 | —N(CH$_2$CO$_2$Na)$_2$ |
| Y-50 | 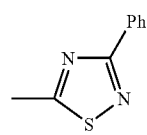 | 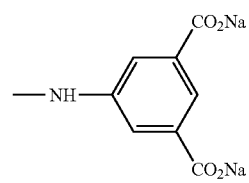 |
| Y-51 | 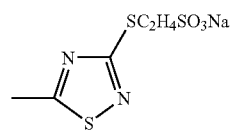 | 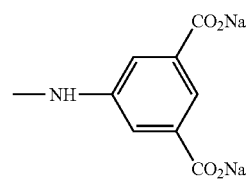 |
| Y-52 | 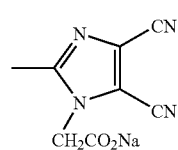 | 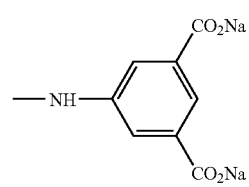 |
| Y-53 | 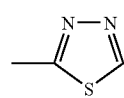 | 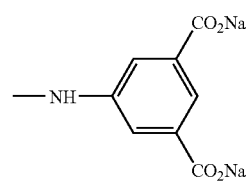 |
| Y-54 | 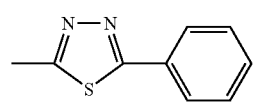 | 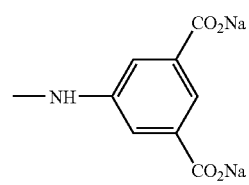 |
| Y-55 | 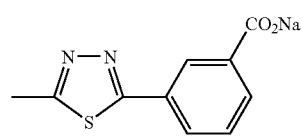 | 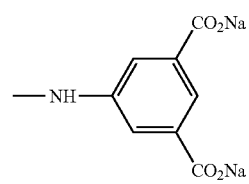 |
| Y-56 | 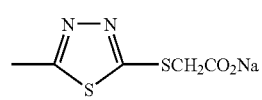 | 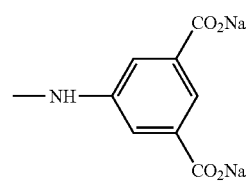 |
| Y-57 | 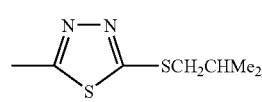 | 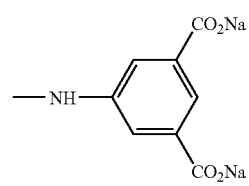 |

-continued
| | | |
|---|---|---|
| Y-58 | 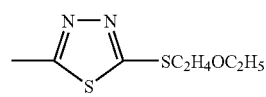 | 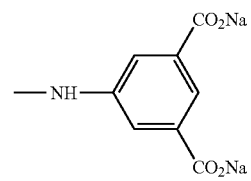 |
| Y-59 | 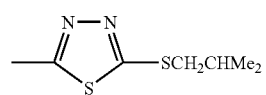 | 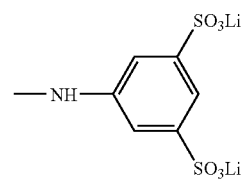 |
| Y-60 | 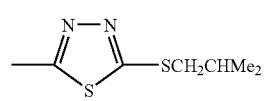 | 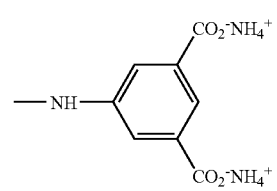 |
| Y-61 | 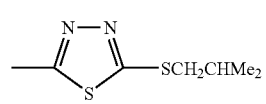 | —NHC$_8$H$_{17}$-n |
| Y-62 | 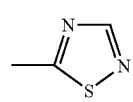 | 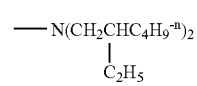 |
| Y-63 | 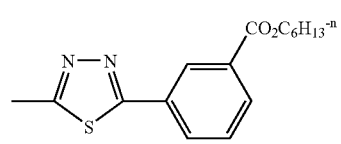 | —NHC$_6$H$_{13}$-n |
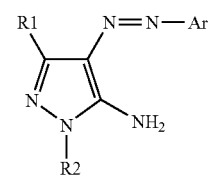
| イエロー染料 | Ar | R1 | R2 |
|---|---|---|---|
| Y-64 | 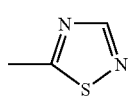 | t-C$_4$H$_9$— | 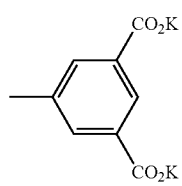 |
| Y-65 | 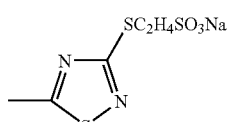 | 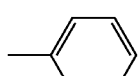 | 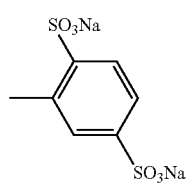 |

-continued
| | | | |
|---|---|---|---|
| Y-66 | 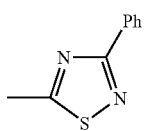 | t-C₄H₉— | 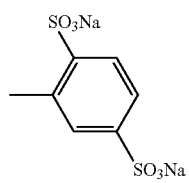 |
| Y-67 | 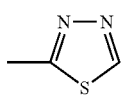 | t-C₄H₉— | 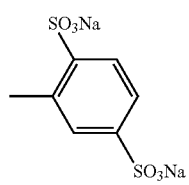 |
| Y-68 | 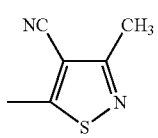 | t-C₄H₉— | 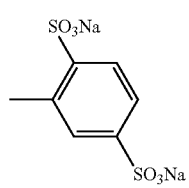 |
| Y-69 | 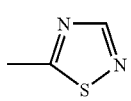 | t-C₄H₉— | 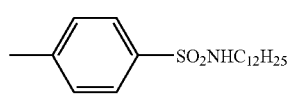 |
| Y-70 | 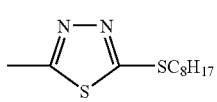 | t-C₄H₉— | 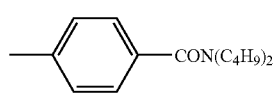 |
| Y-71 | 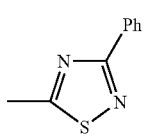 | t-C₄H₉— | 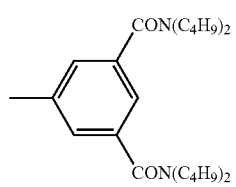 |
| Y-72 | 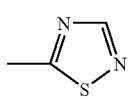 | t-C₄H₉— | 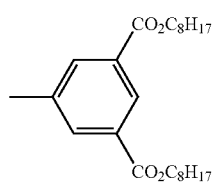 |
Y-73
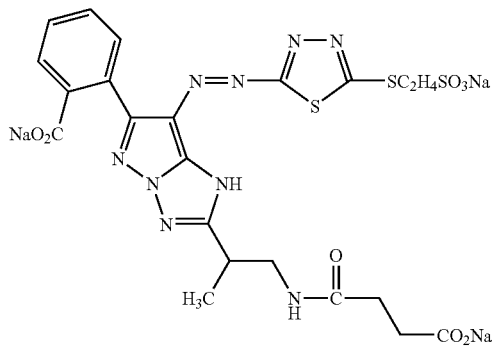

-continued
Y-74
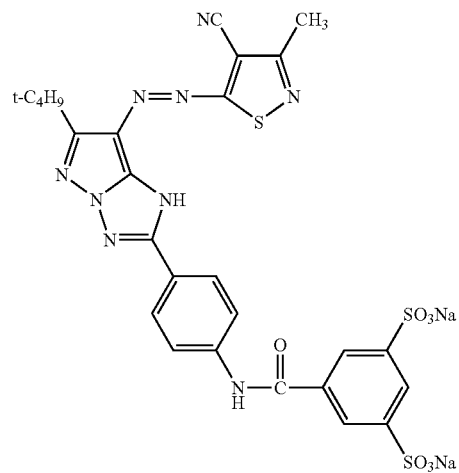
Y-75
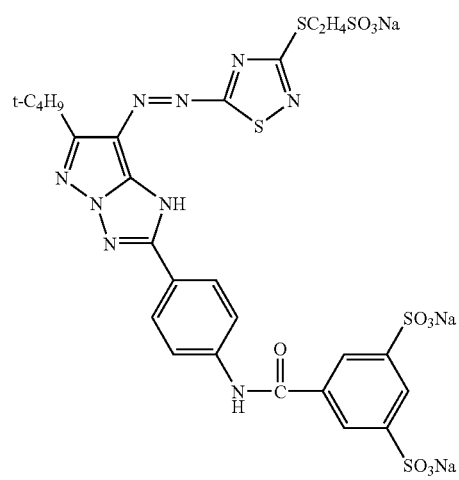
Y-76
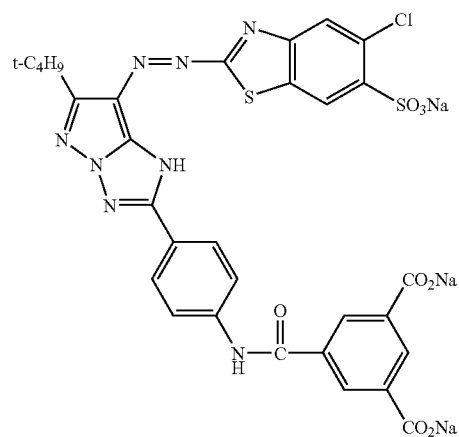

-continued
Y-77
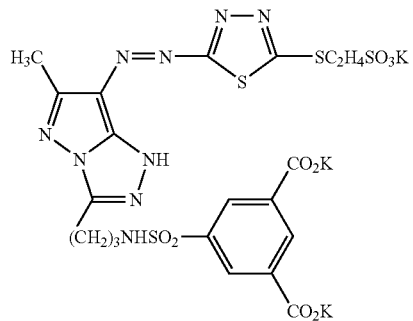
Y-78
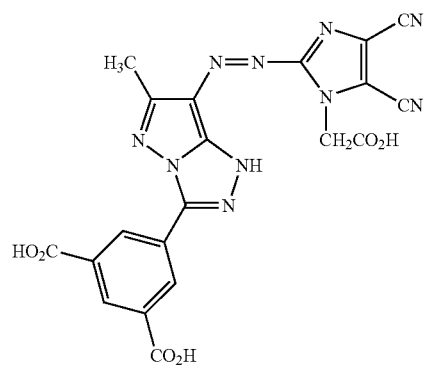
Y-79
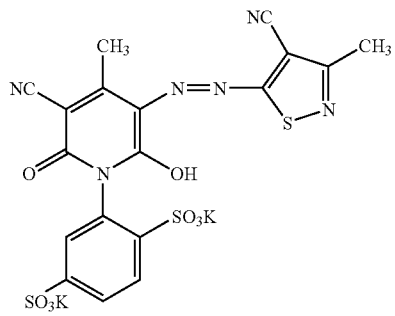
Y-80
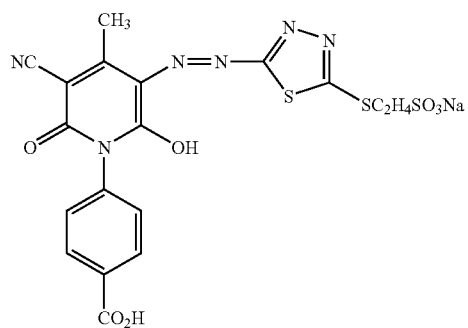

-continued

[Y-81]

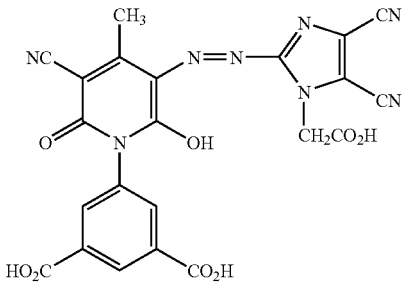

[Y-82]

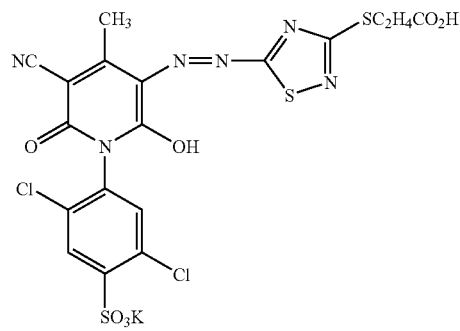

The content of the yellow dye of formula (1) in the ink is preferably from 0.2 to 20% by weight, more preferably from 0.5 to 15% by weight.

[Cyan Dye]

Phthalocyanine dyes, a type of cyan dyes for use in the invention are described in detail hereinunder.

Preferably, the phthalocyanine dyes for use in the invention have good fastness to light and to ozone, and provide good images that change little their hue and surface condition (with neither bronzing nor dye bleeding).

The light fastness of the dyes is preferably as follows: The dye is printed on Epson PM photographic image-receiving paper to form an image thereon, a part of the image having a reflection density OD of 1.0 is exposed to xenon light (Xe 1.1 W/m, intermittent exposure) via a TAC filter for 3 days, and the color retentiveness (reflection density after exposure/initial density×100) is preferably at least 90%. Also preferably, the color retentiveness after 14-day exposure is at least 85%.

The amount of Cu ion existing as its phthalate formed through decomposition of the phthalocyanine dye may be an index of the change of hue and surface condition of the image formed of the dye. The amount of the Cu ion that exists in actual prints is preferably at most 10 mg/m². The Cu ion that flows out from prints is preferably as follows: A solid image having a Cu ion content of at most 20 mg/m² is formed, and the image is stored in a 5 ppm ozone environment for 24 hours so that it is faded by ozone. In that condition, the amount of Cu ion that flows out from the image into water is preferably at most 20%. Before the image is faded, all the Cu compound is trapped in the image-receiving material.

The phthalocyanine dyes having the above-mentioned physical properties may be obtained by 1) increasing the oxidation potential thereof, 2) increasing the degree of association thereof, 3) introducing an association-promoting group into them to thereby strengthen the hydrogen bonding in π—π stacking, or 4) not introducing a substituent into the α-position thereof, or that is, for facilitating the stacking in the compounds.

The structure of the phthalocyanine dyes for use in the invention is characterized in point of the following: Ordinary phthalocyanine dyes in conventional ion are derived from unsubstituted phthalocyanine sulfonates, and their mixtures could not be specifically defined in point of the number and the position of the substituents therein. Different from these, the phthalocyanine dyes for use in the invention are characterized in that the number and the position of the substituents in them can be specifically defined. The first characteristic feature of the structure of the dyes is that they are phthalocyanine dyes not via sulfonation of unsubstituted phthalocyanine. The second characteristic feather of the structure of the dyes is that they have an electron-attractive group at the β-position of the benzene ring of phthalocyanine, preferably having an electron-attractive group at the β-position of all the benzene rings of phthalocyanine. Concretely mentioned are those substituted with a sulfonyl group (as in JP-A-2002-249677, 2003-119415); those substituted with a sulfamoyl group (as in JP-A-2002-302623, 2003-3109); those substituted with a heterocyclic sulfamoyl group (as in JP-A-2002-294097, 2003-3086); those substituted with a heterocyclic sulfonyl group (as in JP-A-2002-275386, 2003-3099); those substituted with a specific sulfamoyl group (as in JP-A-2002-256167); and those substituted with a carbonyl group (as in JP-A-2003-213153).

Also preferred are those having a specific substituent for improving the solubility, ink stability and bronzing resistance of the dyes. Concretely mentioned are those having an asymmetric carbon atom (as in JP-A-2003-213168); and those in the form of Li salts (as in JP-A-2003-213167).

Regarding the correlation between the number of associable groups and the potency (ink absorbance), the introduction of associable groups into dyes may often lower the ink absorbance and shorten the wavelength for λmax even though the ink concentration is low. Regarding the correlation between the number of associable groups and the potency (reflection density OD on Epson PM920 image-receiving paper), the increase in the number of associable groups may lower the reflection density OD at the same ionic strength. Specifically, the association of dyes on image-receiving paper may increase. Regarding the number of associable groups and the potency (ozone resistance, light fastness), the increase in the number of associable groups may improve the ozone resistance. Dyes having a larger number of associable groups may have better light fastness. For making phthalocyanine dyes have ozone resistance, some substituent must be introduced into the benzene ring of phthalocyanine. The reflection density OD and the fastness are in a trade-off relation, and therefore, the lightfastness must be increased not lowering the degree of association.

Preferred embodiments of cyan ink that contains the phthalocyanine dye having the characteristics as above are mentioned below.

1) The cyan ink is printed on Epson PM photographic image-receiving paper to form an image thereon, a part of the image having a reflection density OD of 1.0 is exposed to xenon light (Xe 1.1 W/m, intermittent exposure) via a TAC filter for 3 days, and the color retentiveness is at least 90%.

2) The cyan ink is printed to form an image, and a part of the image having a reflection density via a status A filter of from 0.9 to 1.1 is kept in a 5-ppm ozone environment for 24 hours. The color retentiveness is at least 60%, preferably at least 80%.

3) After the image formed of the cyan ion has been faded by ozone under the condition of 2, the amount of Cu ion that flows into water is at most 20%.

4) The cyan ion is penetrable into at least 30% of the upper part of the ink-receiving layer of specific image-receiving paper.

The phthalocyanine dyes of formula (2) satisfy the requirements as above.

It is known that phthalocyanine dyes are fast. However, it is also known that, when they are used in inkjet recording, phthalocyanine dyes are not resistant to ozone gas.

As so mentioned hereinabove, it is desirable that an electron-attractive group is introduced into the phthalocyanine skeleton to thereby make the phthalocyanine dyes for use in the invention have an oxidation potential higher than 1.0 V (vs SCE). For this, for example, a substituent having a large Hammett's substituent constant σp (the value indicates the degree of electron attraction or electron donation), such as sulfinyl group, sulfonyl group or sulfamoyl group is introduced into the dyes to make the dyes have a higher oxidation potential.

For the potential control as above, the phthalocyanine dyes of formula (2) are preferred for use in the invention.

The phthalocyanine dyes of formula (2) are described in detail hereinunder.

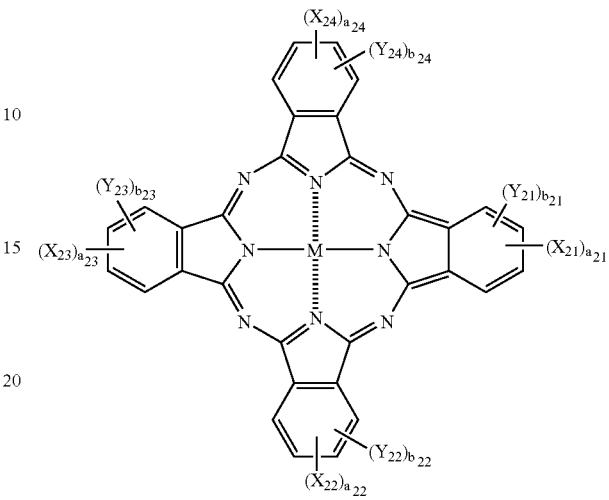

(2)

In formula (2), $X_{21}$, $X_{22}$, $X_{23}$ and $X_{24}$ each independently represent —SO-$Z_2$, —SO$_2$-$Z_2$, —SO$_2$NR$_{21}$R$_{22}$, a sulfo group, —CONR$_{21}$R$_{22}$, or —CO$_2$R$_{21}$. Of these substituents, preferred are —SO-$Z_2$, —SO$_2$-$Z_2$, —SO$_2$NR$_{21}$R$_{22}$ and —CONR$_{21}$R$_{22}$; more preferred are —SO$_2$-$Z_2$ and —SO$_2$NR$_{21}$R$_{22}$; and most preferred is —SO$_2$-$Z_2$. As so mentioned hereinabove, when any of $a_{21}$ to $a_{24}$ each indicating the number of the substituents is a number of 2 or more, then plural $X_{21}$'s to $X_{24}$'s, if any, may be the same or different and each independently represents any of the above-mentioned groups. All of $X_{21}$, $X_{22}$, $X_{23}$ and $X_{24}$ may be the same substituents; or, they may be the same type of substituent but differ in a part of the substituent, for example, all of $X_{21}$, $X_{22}$, $X_{23}$ and $X_{24}$ are the same —SO$_2$-$Z_2$, but $Z_2$ in the substituent differs between them; or they may differ from each other, for example, they include both —SO$_2$-$Z_2$ and —SO$_2$NR$_{21}$R$_{22}$ in one molecule.

$Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Preferably, it is a substituted or unsubstituted alkyl group, a substituted or unsubstituted aryl group, or a substituted or unsubstituted heterocyclic group. Most preferably, it is a substituted alkyl group, a substituted aryl group, or a substituted heterocyclic group.

$R_{21}$ and $R_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. Preferably, they are any of a hydrogen atom, a substituted or unsubstituted alkyl group, a substituted or unsubstituted aryl group, or a substituted or unsubstituted heterocyclic group. More preferably, they are any of a hydrogen atom, a substituted alkyl group, a substituted aryl group, or a substituted heterocyclic group. However, it is undesirable that both $R_{21}$ and $R_{22}$ are hydrogen atoms.

For the substituted or unsubstituted alkyl group for $R_{21}$, $R_{22}$ and $Z_2$, the alkyl group preferably has from 1 to 30 carbon atoms. Especially for increasing the dye solubility and the ink stability, a branched alkyl group is more preferred for them. Even more preferably, the group has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted cycloalkyl group for $R_{21}$, $R_{22}$ and $Z_2$ preferably has from 5 to 30 carbon atoms. Especially for increasing the dye solubility and the ink stability, the group preferably has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted alkenyl group for $R_{21}$, $R_{22}$ and $Z_2$ preferably has from 2 to 30 carbon atoms. Especially for increasing the dye solubility and the ink stability, a branched alkenyl group is more preferred for them. Even more preferably, the group has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted aralkyl group for $R_{21}$, $R_{22}$ and $Z_2$ preferably has from 7 to 30 carbon atoms. Especially for increasing the dye solubility and the ink stability, a branched aralkyl group is more preferred for them. Even more preferably, the group has an asymmetric carbon atom (and the dye is used as a racemic form). For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Above all, especially preferred are a hydroxyl group, an ether group, an ester group, a cyano group, an amido group and a sulfonamide group, as they increase the dye association and improve the dye fastness. Apart from these, the group may be substituted with a halogen atom or an ionic hydrophilic group.

The substituted or unsubstituted aryl group for $R_{21}$, $R_{22}$ and $Z_2$ preferably has from 6 to 30 carbon atoms. For the substituent for the group, referred to are those mentioned hereinafter for the substitutable groups for $Z_2$, $R_{21}$, $R_{22}$, $Y_{21}$, $Y_{22}$, $Y_{23}$ and $Y_{24}$. Especially preferred is an electron-attractive group, as it increases the oxidation potential of the dyes and improves the fastness of the dyes. The electron-attractive group has a positive σp value, Hammett's substituent constant. Above all, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group, a quaternary ammonium group; and more preferred are a cyano group, a carboxyl group, a sulfamoyl group, a carbamoyl group, a sulfonyl group, an imido group, an acyl group, a sulfo group, and a quaternary ammonium group.

The heterocyclic group for $R_{21}$, $R_{22}$ and $Z_2$ is preferably 5-membered or 6-membered, and it may be condensed with any other ring. It may be an aromatic heterocyclic group or a non-aromatic heterocyclic group. Examples of the heterocyclic group for $R_{21}$, $R_{22}$ and $Z_2$ are mentioned below in the form or hetero rings in which the substituting position is omitted. In these groups, the substituting position is not limited. For example, pyridine may be substituted at any of 2-, 3- or 4-position. Examples of the hetero ring are pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline. Of those, preferred are aromatic heterocyclic groups. Mentioned in the same manner as above, their examples are pyridine, pyrazine, pyrimidine, pyridazine, triazine, pyrazole, imidazole, benzimidazole, triazole, thiazole, benzothiazole, isothiazole, benzisothiazole, and thiadiazole. These may be further substituted. For examples of the substituent for them, referred to are those to be mentioned hereinunder for the substitutable groups for $Z_2$, $R_{21}$, $R_{22}$, $Y_{21}$, $Y_{22}$, $Y_{23}$ and $Y_{24}$. Preferred substituents for these may be the same as those mentioned hereinabove for the aryl group; and more preferred substituents for these may also be the same as those mentioned hereinabove for the aryl group.

$Y_{21}$, $Y_{22}$, $Y_{23}$ and $Y_{24}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, an ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic-oxy group, an azo group, an acyloxy group, a carbamoyloxy group, a silyloxy group, an aryloxycarbonyl group, an aryloxycarbonylamino group, an imido group, a heterocyclic-thio group, a phosphoryl group, an acyl group, a carboxyl group, or a sulfo group. These groups may be further substituted.

Above all, preferred for them are a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group, and a sulfo group; more preferred are a hydrogen atom, a halogen atom, a cyano group, a carboxyl group, and a phospho group; and most preferred is a hydrogen atom.

Examples of the substituent for the substitutable group for $Z_2$, $R_{21}$, $R_{22}$, $Y_{21}$, $Y_{22}$, $Y_{23}$ and $Y_{24}$ are mentioned below.

A linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (preferably, these groups are branched, as they improve the dye solubility and ink stability, and more preferably, they have an asymmetric carbon. Specific examples of these groups are: methyl, ethyl, propyl, isopropyl, sec-butyl, t-butyl, 2-ethylhexyl, 2-methylsulfonylethyl, 3-phenoxypropyl, trifluoromethyl, cyclopentyl); a halogen atom (e.g., chlorine, bromine), an aryl group (e.g., phenyl, 4-t-butylphenyl, 2,4-di-t-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxyl group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-t-butylphenoxy, 3-nitrophenoxy, 3-t-butyloxycarbamoylphenoxy, 3-methoxycarbamoylphenoxy), an acylamino group (e.g., acetamido, benzamido, 4-(3-t-butyl-4-hydroxyphenoxy)butanamido), an alkylamino group (e.g., methylamino, butylamino, diethylamino, methylbutylamino), an anilino group (e.g., phenylamino, 2-chloroanilino), an ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-t-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic-oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic-thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), an ionic hydrophilic group (e.g., carboxy, sulfo, phosphono, quaternary ammonium).

In case where the phthalocyanine dyes of formula (2) are soluble in water, the dyes preferably have an ionic hydrophilic group. The ionic hydrophilic group includes, for example, a sulfo group, a carboxyl group, a phosphono group, and a quaternary ammonium group. For the ionic hydrophilic group, preferred are a carboxyl group, a phosphono group and a sulfo group; and more preferred are a carboxyl group and a sulfo group. The carboxyl group, the phosphono group and the sulfo group may form salts, and examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal salts. More preferred are lithium salts, since they increase the dye solubility and the ink stability. Most preffered ionic hydrophilic group is lithium salts of sulfo group.

Regarding the number of the ionic hydrophilic groups to be in the phthalocyanine dye, it is desirable that the dye has at least two ionic hydrophilic groups per one molecule of the dye, more preferably at least two sulfo and/or carboxyl groups.

In formula (2), $a_{21}$ to $a_{24}$, and $b_{21}$ to $b_{24}$ indicate the number of the substituents of $X_{21}$ to $X_{24}$ and $Y_{21}$ to $Y_{24}$, respectively. $a_{21}$ to $a_{24}$ each independently represent a number of from 0 to 4, but all of these are not 0 at the same time $b_{21}$ to $b_{24}$ each independently represent a number of from 0 to 4. When $a_{21}$ to $a_{24}$, and $b_{21}$ to $b_{24}$ are a number of 2 or more, then plural $X_{21}$'s to $X_{24}$'s and $Y_{21}$'s to $Y_{24}$'s exist in the formula, and they may be the same or different.

$a_{21}$ and $b_{21}$ satisfy the relation of $a_{21}+b_{21}=4$. More preferably, $a_{21}$ and $b_{21}$ are so combined that $a_{21}$ is 1 or 2 while $b_{21}$ is 3 or 2, respectively. Most preferably, $a_{21}$ and $b_{21}$ are so combined that $a_{21}$ is 1 and $b_{21}$ is 3.

The same as that of $a_{21}$ and $b_{21}$ shall apply to the other combinations, $a_{22}$ and $b_{22}$, $a_{23}$ and $b_{23}$, and $a_{24}$ and $b_{24}$. Regarding the preferred embodiments of the other combinations, referred to are the same as those mentioned hereinabove for the combination of $a_{21}$ and $b_{21}$.

M represents a hydrogen atom, a metal atom or its oxide, hydroxide or halide.

M is preferably a hydrogen atom, or a metal atom such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi. Its oxide is preferably VO or GeO. The hydroxide is preferably $Si(OH)_2$, $Cr(OH)_2$ or $Sn(OH)_2$. The halide is preferably $AlCl$, $SiCl_2$, $VCl$, $VCl_2$, $VOCl$, $FeCl$, $GaCl$ or $ZrCl$.

Above all, more preferred are Cu, Ni, Zn and Al; and most preferred is Cu.

The phthalocyanine dye of formula (2) may form a dimer (e.g., Pc-M-L-M-Pc) or a trimer in which two or three Pc (phthalocyanine ring) molecules bond to each other via L (divalent linking group). In these, M's may be the same or different.

The divalent linking group for L is preferably an oxy group —O—, a thio group —S—, a carbonyl group —CO—, a sulfonyl group —SO$_2$—, an imino group —NH—, a methylene group —CH$_2$—, or a group of their combination.

Regarding the preferred combinations of the substituents of the compounds of formula (2), it is desirable that at least one of the substituents is the above-mentioned preferred group. More preferably, a larger number of the substituents are the preferred groups. Most preferably, all the substituents are the preferred groups.

Of the phthalocyanine dyes of formula (2), more preferred are those having a structure of the above-mentioned formula (5). The phthalocyanine dyes of formula (5) are described in detail hereinunder.

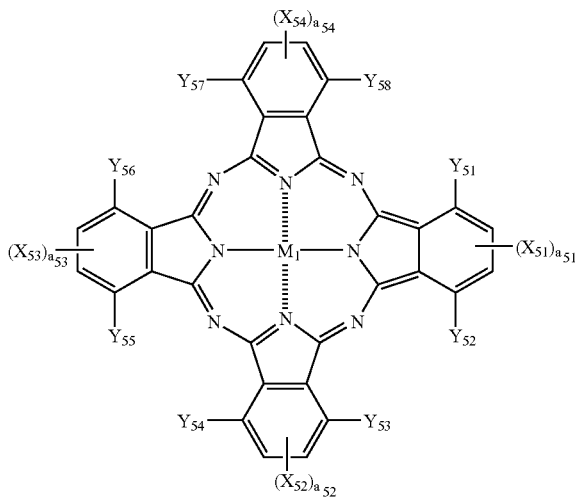

(5)

In formula (5), $X_{51}$ to $X_{54}$, and $Y_{51}$ to $Y_{58}$ have the same meanings as $X_{21}$ to $X_{24}$, and $Y_{21}$ to $Y_{24}$ in formula (2). Their preferred examples are also the same as those of the latter. $M_1$ has the same meaning as M in formula (2), and its preferred examples are also the same as those of the latter.

In formula (5), $a_{51}$ to $a_{54}$ each independently indicate an integer of 1 or 2, preferably $4 \leq a_{51}+a_{52}+a_{53}+a_{54} \leq 6$, more preferably $a_{51}=a_{52}=a_{53}=a_{54}=1$.

All of $X_{51}$, $X_{52}$, $X_{53}$ and $X_{54}$ may be the same substituents; or, they are the same type of substituent but differ in a part of the substituent, for example, all of $X_{51}$, $X_{52}$, $X_{53}$ and $X_{54}$ are the same —$SO_2$-$Z_5$, but $Z_5$ in the substituent differ between them; or they differ from each other, for example, they contain —$SO_2$-$Z_5$ and —$SO_2NR_{51}R_{52}$.

Especially preferred combinations of the substituents in the phthalocyanine dyes of formula (5) are mentioned below.

$X_{51}$ to $X_{54}$ are independently —SO-$Z_5$, —$SO_2$-$Z_5$, —$SO_2NR_{51}R_{52}$, or —$CONR_{51}R_{52}$, more preferably —$SO_2$-$Z_5$ and —$SO_2NR_{51}R_{52}$, most preferably —$SO_2$-$Z_5$.

Preferably, $Z_5$ is each independently a substituted or unsubstituted alkyl group, a substituted or unsubstituted aryl group, or a substituted or unsubstituted heterocyclic group. Most preferably, it is a substituted alkyl group, a substituted aryl group, or a substituted heterocyclic group. Also preferably, the substituent has an asymmetric carbon atom (and the dye is used as a racemic form) for further improving the dyesolubility and the ink stability. In addition, for improving the dye association and the dye fastness, the substituent preferably has any of a hydroxyl group, an ether group, an ester group, a cyano group, an amido group and a sulfonamide group.

Preferably, $R_{51}$ and $R_{52}$ are independently a hydrogen atom, a substituted or unsubstituted alkyl group, a substituted or unsubstituted aryl group, or a substituted or unsubstituted heterocyclic group. More preferably, they are any of a hydrogen atom, a substituted alkyl group, a substituted aryl group, or a substituted heterocyclic group. However, it is undesirable that both $R_{51}$ and $R_{52}$ are hydrogen atoms. Also preferably, the substituent has an asymmetric carbon atom (and the dye is used as a racemic form) for further improving the dye solubility and the ink stability. In addition, for improving the dye association and the dye fastness, the substituent preferably has any of a hydroxyl group, an ether group, an ester group, a cyano group, an amido group and a sulfonamide group.

Preferably, $Y_{51}$ to $Y_{58}$ are independently a hydrogen atom, a halogen atom, an alkyl group, an aryl group, a cyano group, an alkoxy group, an amido group, an ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, most preferably a hydrogen atom.

Preferably, $a_{51}$ to $a_{54}$ are independently 1 or 2, more preferably all one.

$M_1$ is a hydrogen atom, or a metal element or its oxide, hydroxide or halide, preferably Cu, Ni, Zn or Al, most preferably Cu.

In case where the phthalocyanine dyes of formula (5) are soluble in water, the dyes preferably have an ionic hydrophilic group. The ionic hydrophilic group includes, for example, a sulfo group, a carboxyl group, a phosphono group, and a quaternary ammonium group. For the ionic hydrophilic group, preferred are a carboxyl group, a phosphono group and a sulfo group; and more preferred are a carboxyl group and a sulfo group. The carboxyl group, the phosphono group and the sulfo group may form salts, and examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal salts. More preferred are lithium salts, since they increase the dye solubility and the ink stability. Most preferred ionic hydrophilic group is litium salts of sulfo group.

Regarding the number of the ionic hydrophilic groups to be in the phthalocyanine dye, it is desirable that the dye has at least two ionic hydrophilic groups per one molecule of the dye, more preferably at least two sulfo and/or carboxyl groups.

Regarding the preferred combinations of the substituents of the compounds of formula (5), it is desirable that at least one of the substituents is the above-mentioned preferred group. More preferably, a larger number of the substituents are the preferred groups. Most preferably, all the substituents are the preferred groups.

Regarding the chemical structure of the phthalocyanine dyes of formula (5), it is desirable that each of the four benzene rings of the phthalocyanine skeleton has at least one electron-attractive group such as a sulfinyl group, a sulfonyl group or a sulfamoyl group in such a manner that the sum total of the σp value of all the substituents on the phthalocyanine skeleton could be at least 1.6.

The Hammett's substituent constant σp is described briefly. The Hammett's rule is a rule of thumb proposed by L. P. Hammett in 1935 for quantitatively discussing the influence of substituents on the reaction or equilibrium of benzene derivatives, and its reasonableness is widely admitted in the art. The substituent constant to be obtained by the Hammett's rule includes two values σp and σm, and these are seen in many ordinary documents. For example, their details are in J. A. Dean, *Lange's Handbook of Chemistry*, Ed. 12, 1979 (McGraw-Hill); and extra issue of *Chemical Region*, No. 122, pp. 96–103, 1979 (Nanko-do).

In the phthalocyanine dyes of formula (2), in general, the position and the number of the substituents Xn (n falls between 1 and 4) and Ym (m falls between 1 and 4) inevitably differ depending on the method for their production, or that is, the dyes are generally in the form of a mixture of their analogues. Accordingly, the formula for the dyes shall indicate a mixture of such analogues that are statistically averaged. We, the present inventors have grouped the analogue mixture into three types mentioned below, and have found that a specific type of the mixture is especially preferred. Specifically, the phthalocyanine dye analogue mixtures of formulae (2) and (5) are grouped into the following three types, based on the position of the substituents therein. In formula (5), $Y_{51}, Y_{52}, Y_{53}, Y_{54}, Y_{55}, Y_{56}, Y_{57}$ and $Y_{58}$ are 1-, 4-, 5-, 8-, 9-, 12-, 13- or 16-positioned, respectively.

(1) β-substituted phthalocyanine dyes having a specific substituent at 2- and/or 3-position, 6- and/or 7-position, 10- and/or 11-position, 14- and/or 15-position.

(2) α-substituted phthalocyanine dyes having a specific substituent at 1- and/or 4-position, 5- and/or 8-position, 9- and/or 12-position, 13- and/or 16-position.

(3) α,β-substituted phthalocyanine dyes having a specific substituent at any of 1 to 16-positions with no regularity.

In this description, when phthalocyanine dye derivatives having different structures (especially in point of the substituent position) are described, the above-mentioned expressions of β-substituted, α-substituted, and α,β-substituted phthalocyanine dyes are employed.

The phthalocyanine dyes for use in the invention may be produced, for example, according to the methods described or referred to in Shirai & Kobayashi, *Phthalocyanines—Chemistry and Function*, pp. 1–62 (by IPC), and C. C. Lenznoff & A. B. P. Lever, *Phthalocyanines—Properties and Applications*, pp. 1–54 (by VCH), or according to methods similar to those methods.

The phthalocyanine compounds of formula (2) for use in the invention may be produced, for example, through sulfonation, sulfonylchloridation or amidation of substituted phthalocyanine compounds, as in WO00/17275, 00/08103, 00/08101, 98/41853, and JP-A 10-36471. In this case, sulfonation occurs at any position of the phthalocyanine nucleus and the number of the positions for sulfonation is difficult to control. Accordingly, in case where the sulfo group is introduced under the reaction condition of the process, the position and the number of the sulfo groups introduced could not be identified, and the process inevitably gives a mixture of analogues that differ in point of the position and the number of the substituents. Therefore, in case where the compounds for use in the invention are produced from the products produced according to the process, the number and the position of the heterocyclic substituted sulfamoyl groups introduced in the compound could not be identified, and the phthalocyanine dyes thus produced for use in the invention shall be in the form of a mixture of some α,β-substituted types that differ in point of the number and the position of the substituents therein.

For example, when a large number of electron-attractive groups such as sulfamoyl group are introduced into the phthalocyanine nucleus, the oxidation potential of the resulting dye is higher and the ozone resistance thereof therefore increases, as so mentioned hereinabove. However, according to the production process mentioned above, it is inevitable that the products contain phthalocyanine dyes which have fewer electron-attractive groups introduced therein and of which the oxidation potential is lower. Accordingly, for improving the ozone resistance of the dyes, it is desirable to employ a production process in which the production of the compounds having a lower oxidation potential is retarded.

The phthalocyanine compounds of formula (5) for use in the invention may be derived from tetrasulfophthalocyanine compounds that are obtained, for example, through reaction of, a phthalonitrile derivative (compound P) and/or a diiminoisoindoline derivative (compound Q) with a metal derivative of formula (6) mentioned below, or through reaction of a 4-sulfophthalic acid derivative (compound R) with the metal derivative of formula (6), according to the reaction scheme mentioned below.

Compound P

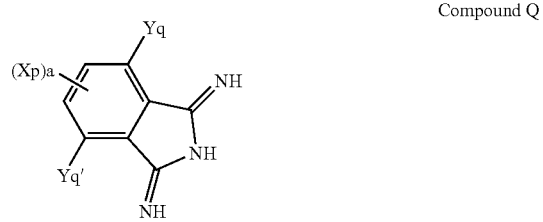

Compound Q

Compound R

In the above formulae, Xp corresponds to $X_{51}, X_{52}, X_{53}$ or $X_{54}$ in formula (5); Yq and Yq' each correspond to any of $Y_{51}, Y_{52}, Y_{53}, Y_{54}, Y_{55}, Y_{56}, Y_{57}$ or $Y_{58}$ in formula (5). In compound R, M' represents a cation, that is exemplified by alkali metal ion such as Li, Na, K, and organic cation such as triethyl ammonium ion, pyridinium ion.

$$M—(Y)d \qquad (6)$$

In formula (6), M has the same meaning as M in formula (2) and $M_1$ in formula (5); Y represents a monovalent or divalent ligand such as a halogen atom, an acetate anion, an acetylacetonate group or an oxygen atom; and d indicates an integer of from 1 to 4.

According to the production process mentioned above, therefore, it is possible to introduce a desired number of desired substituents into the dyes. In particular, when a large number of electron-attractive groups are desired to be introduced into the dyes so that the oxidation potential of the dyes may be high as in the invention, the above-mentioned production process is far superior to the production process of producing the compounds of formula (2) previously described hereinabove.

Thus obtained, the phthalocyanine compounds of formula (5) are generally in the form of a mixture of compounds of formulae (a)-1 to (a)-4 mentioned below which are isomers in point of the substitution position of Xp therein, or that is, in the form of the β-substituted compounds.

(a)-1

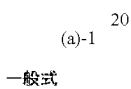

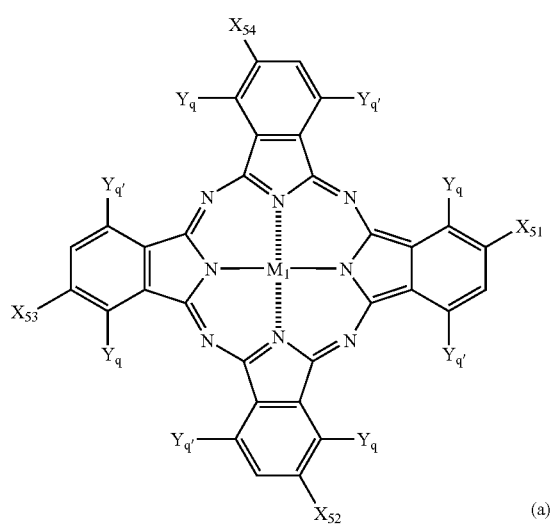

(a)-2

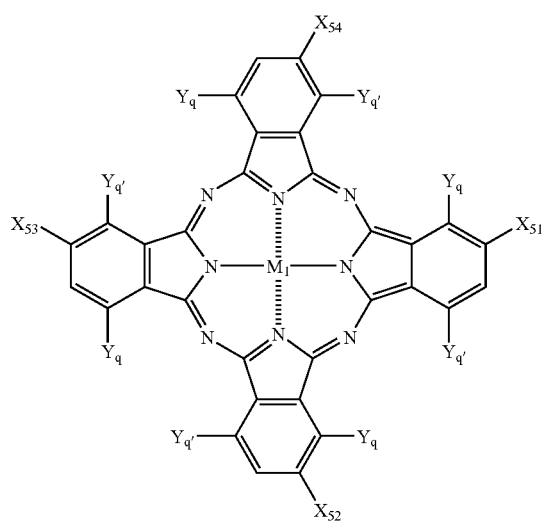

(a)-3

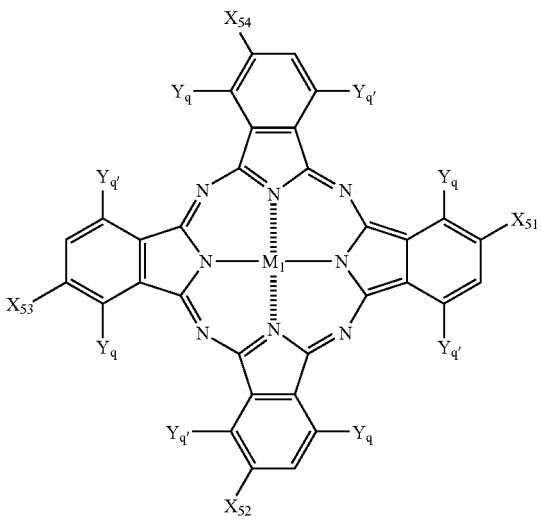

(a)-4

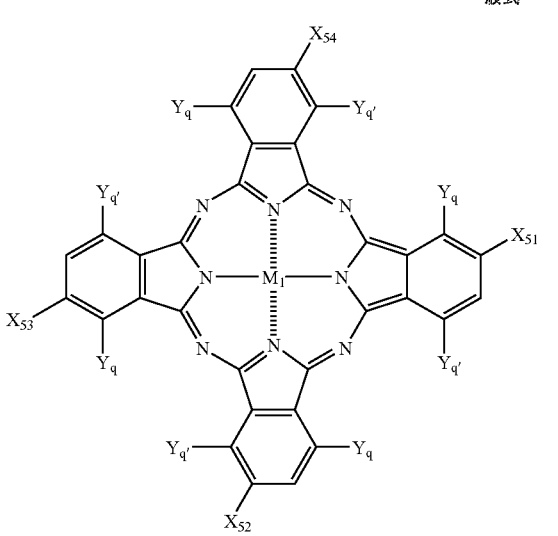

When Xp's in the starting compounds in the above-mentioned process are all the same, then β-substituted phthalocyanine dyes are obtained in which $X_{51}$, $X_{52}$, $X_{53}$ and $X_{54}$ are all the same substituents. On the other hand, when starting compounds that differ in point of Xp are combined and used in the process, dyes in which the substituents are of the same type but partially differ or dyes having different substituents can be obtained. Of the dyes of formula (5), those having different electron-attractive groups are especially preferred as their solubility and associability and even the storage stability of ink containing the dye can be controlled in any desired manner.

We, the present inventors have found that the oxidation potential higher than 1.0V (vs SCE) of the dyes of any substitution type is extremely important for improving the fastness of the dyes, and the level of the effect could not be anticipated at all from the above-mentioned related art technique. Though the detailed reason is not clear, the dyes of the β-substituted type, are superior to the dyes of α,β-substituted type in point of the hue, the light fastness and the ozone gas resistance thereof.

Specific examples (Compounds I-1 to I-12, and 101 to 190) of the phthalocyanine dyes of formulae (2) and (5) are mentioned below, but the phthalocyanine dyes for use in the invention should not be limited to these.
(I-1)
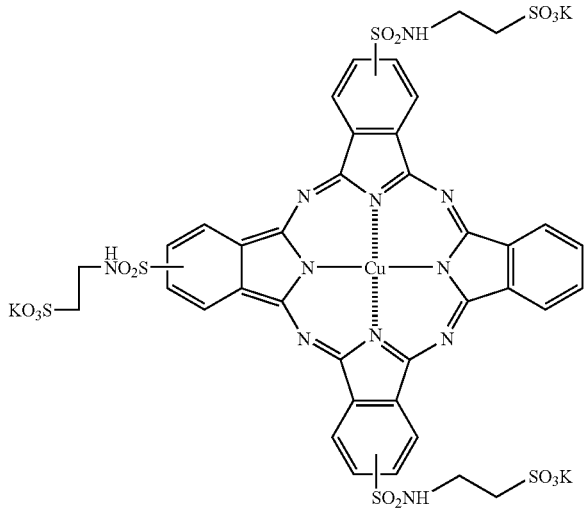
(I-2)
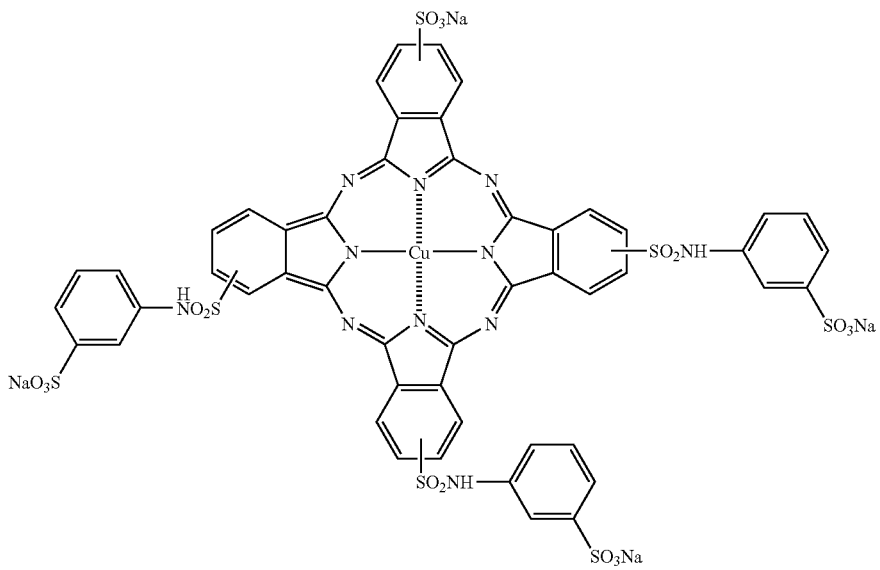
(I-3)
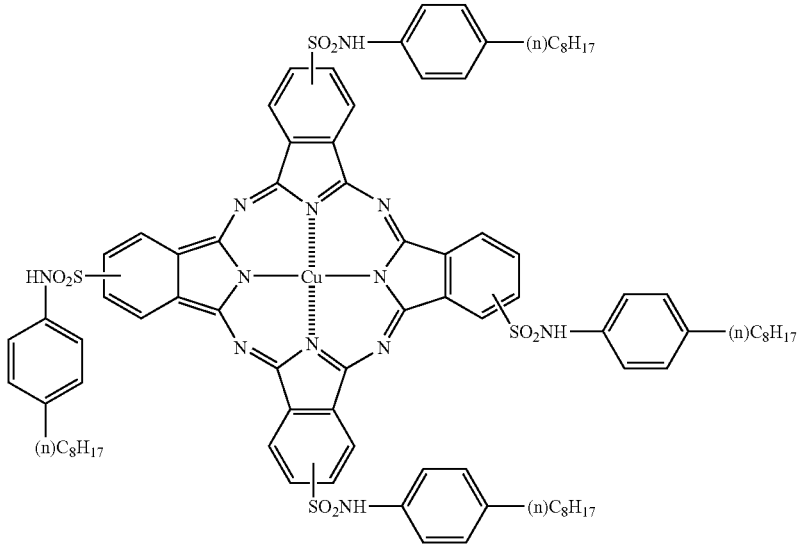

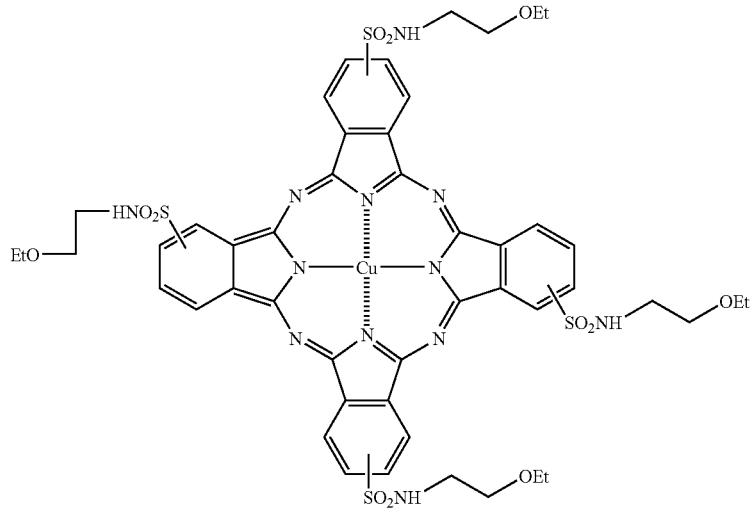
(I-4)
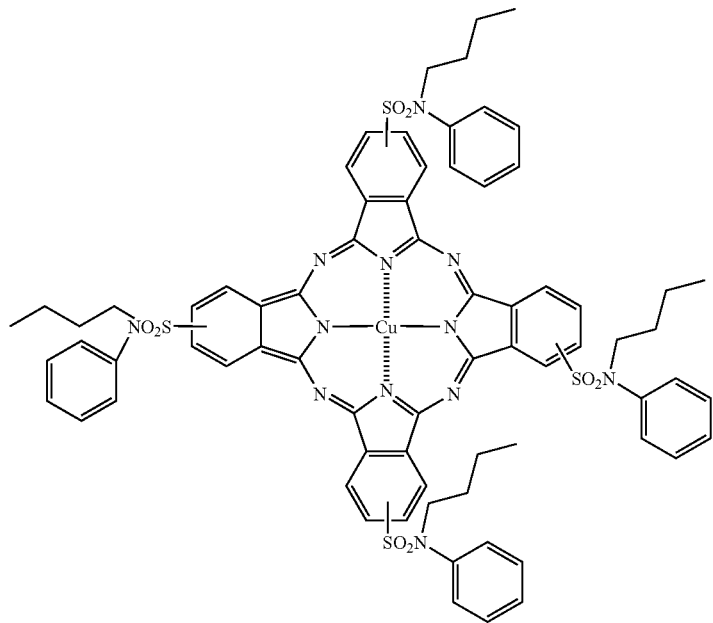
(I-5)

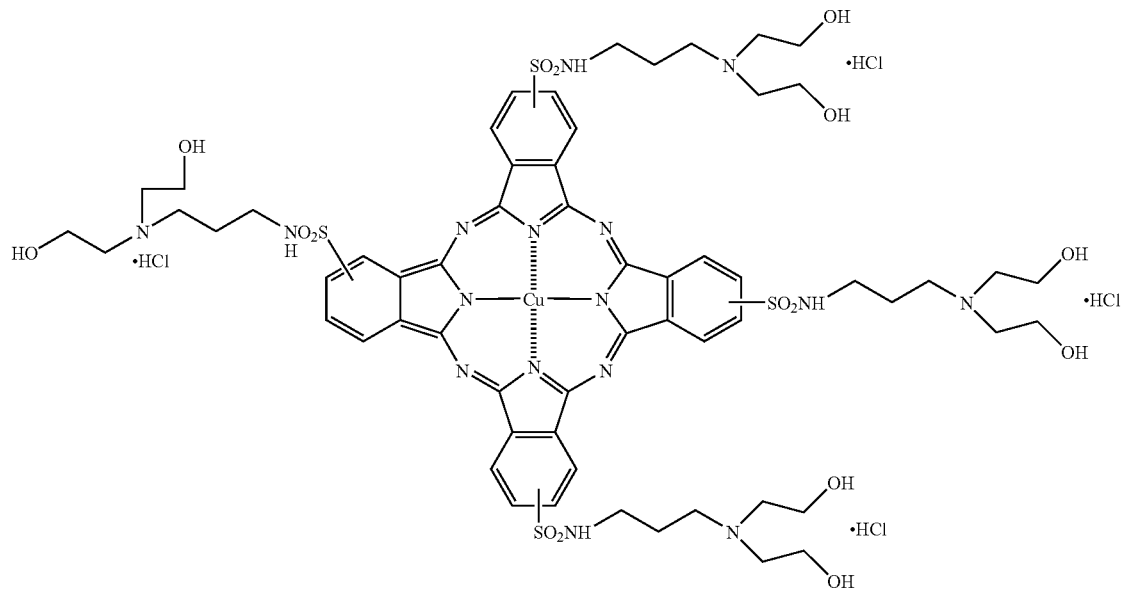
(I-6)
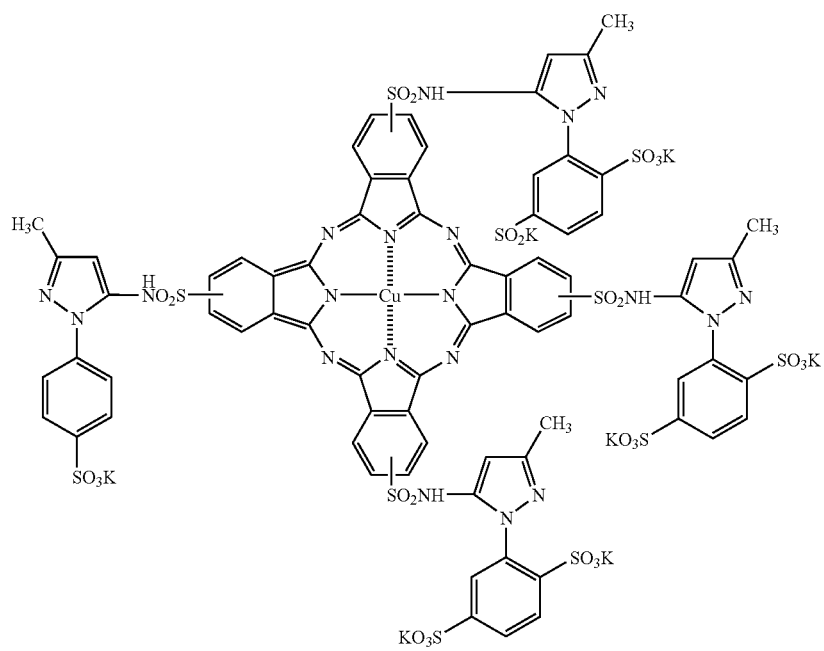
(I-7)

(I-8)
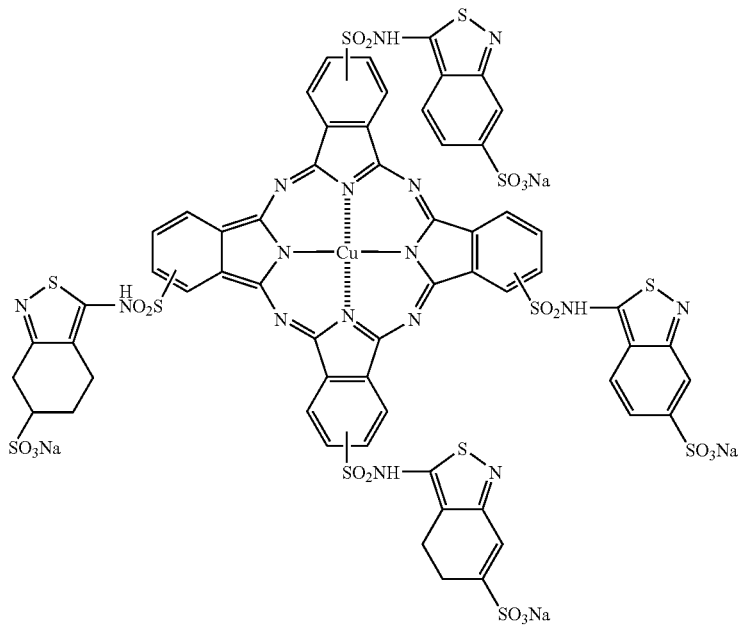
(I-9)
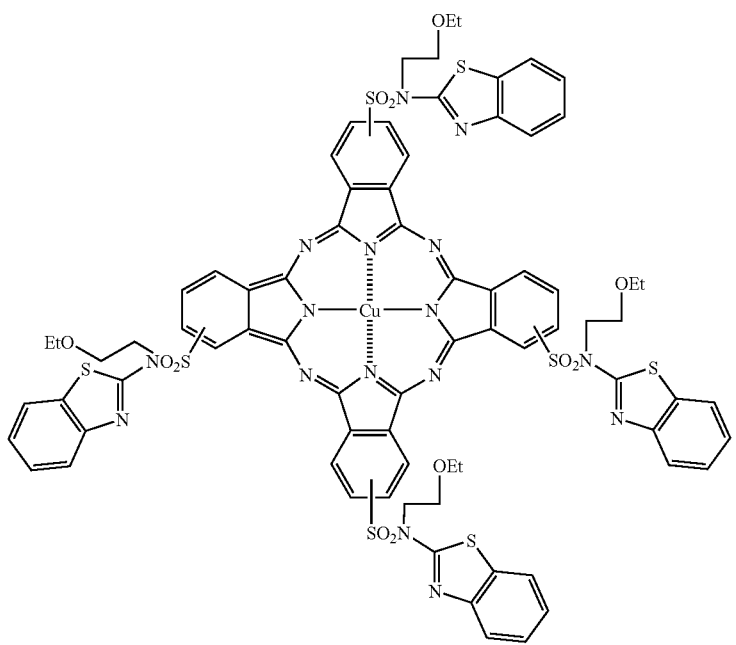

(I-10)
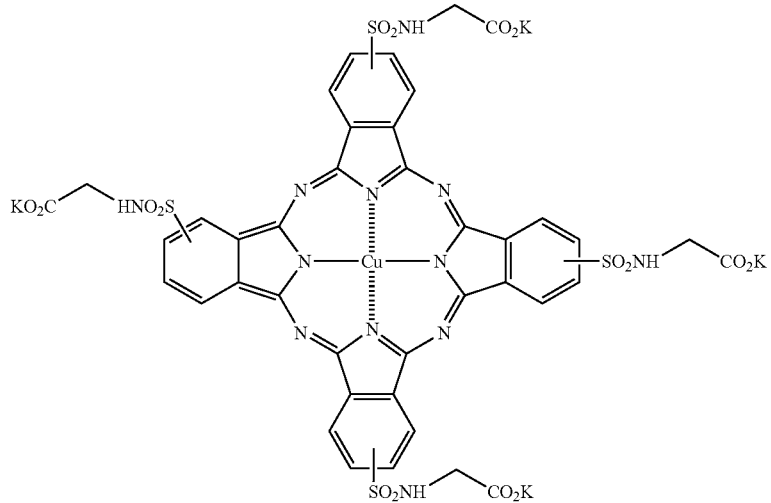
(I-11)
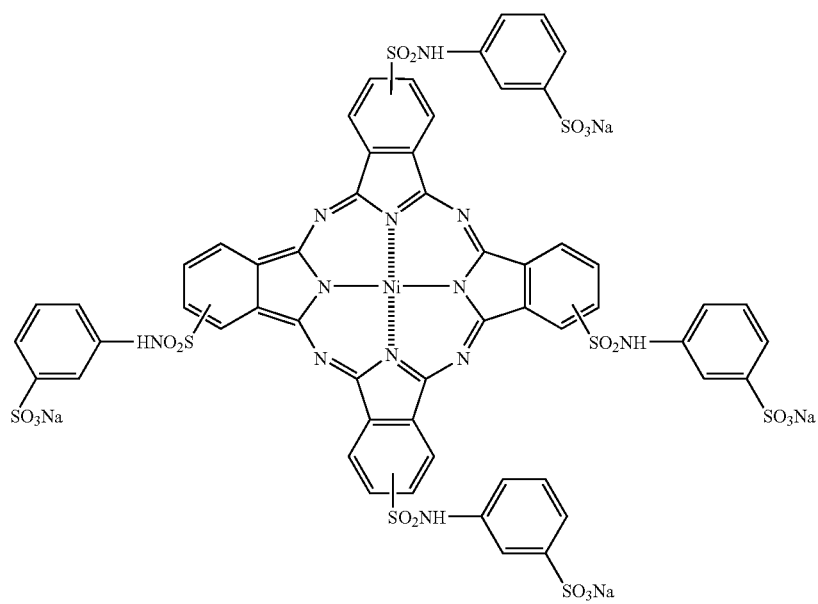

-continued
(I-12)
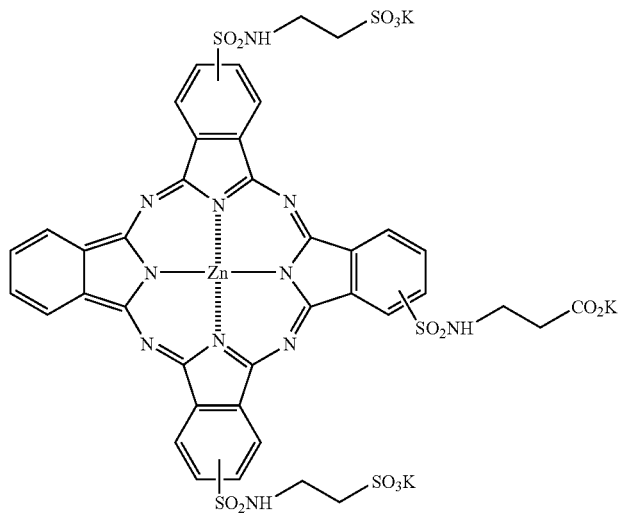
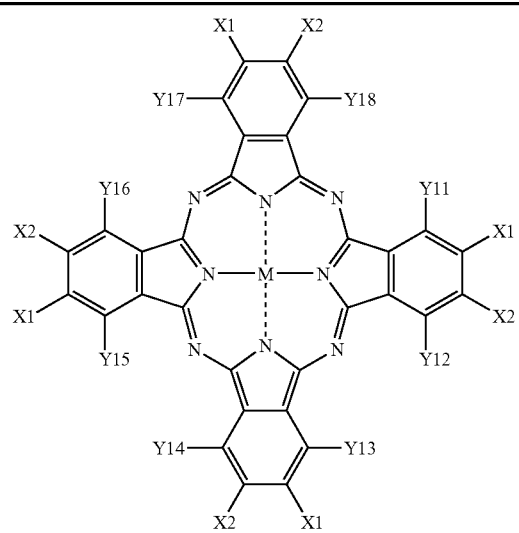
In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.
| Compound No. | M | $X_1$ |
|---|---|---|
| 101 | Cu | $-SO_2-NH-CH_2-CH_2-SO_3Li$ |
| 102 | Cu | $-SO_2-NH-CH_2-CH(OH)-CO-NH-CH_2CH_2-SO_3Na$ |
| 103 | Cu | $-SO_2-NH-CH_2-CH_2-CH_2-SO_2NH-CH_2CH(OH)-SO_3Li$ |
| 104 | Cu | $-SO_2-NH-C_6H_4-SO_2NH-CH_2CH_2-SO_3Li$ |
| 105 | Ni | $-SO_2-NH-CH_2-CH_2-CO-NH-CH(CH_2-COONa)-COONa$ |

-continued

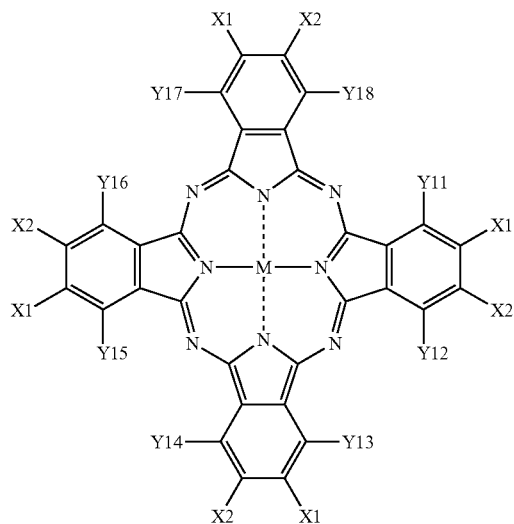

In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.

| 106 | Cu | —SO₂ |
|-----|----|----|

-continued

M-Pc(Xp1)m(Xp2)n
In the Table, no special order is defined for the position of the substituents (Xp1) and (Xp2) in β-substituted dyes.

| Compound No. | M | Xp1 | m |
|---|---|---|---|
| 146 | Cu | —SO₂—NH—CH₂—CH(CH₃)—SO₃Li | 3 |
| 147 | Cu | —SO₂—NH—CH₂—CH₂SO₃Li | 3 |
| 148 | Cu | —SO₂—NH—CH₂—CH(CH₃)—SO₃Li | 3 |
| 149 | Cu | —SO₂—NH—CH₂—CH(CH₃)—SO₃Li | 2 |
| 150 | Cu | —SO₂NH—CH₂—CH₂—SO₂—NH—CH₂CH₂—COONa | 3 |
| 151 | Cu | —SO₂—NH—C₆H₄—SO₂NH—CH₂—CH(OH)—SO₃Li | 3 |
| 152 | Cu | —SO₂—CH₂—CH₂—CH(CH₃)—SO₃Li | 2.5 |
| 153 | Cu | —SO₂—CH₂—CH₂—CH(CH₃)—SO₃Na | 2 |
| 154 | Cu | —SO₂—CH₂—CH₂—CH₂—SO₃Li | 3 |
| 155 | Cu | —SO₂—CH₂—CH₂—CH₂—COOK | 2 |
| 156 | Cu | —SO₂—CH₂—CH₂—CH₂—SO₃Li | 3 |
| 157 | Cu | —SO₂—CH₂—CH₂—O—CH₂—CH₂—SO₃Li | 2 |

-continued

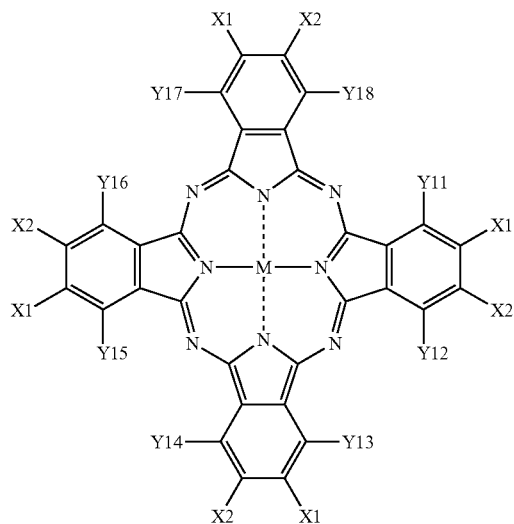

In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.

| 158 | Cu | —SO$_2$—CH$_2$—CH(OH)—CH$_2$—SO$_3$Li | 3 |
|---|---|---|---|
| 159 | Cu | —SO$_2$NHCH$_2$CH$_2$—SO$_3$Li | 3 |
| 160 | Cu | —SO$_2$—CH$_2$—CH$_2$—O—CH$_2$—CH$_2$—O—CH$_2$—CH$_2$—SO$_3$Na | 3 |
| 161 | Cu | —SO$_2$CH$_2$CH$_2$CH$_2$SO$_3$Li | 3 |
| 162 | Cu | —SO$_2$CH$_2$CH$_2$CH$_2$SO$_3$Li | 2 |
| 163 | Cu | —SO$_2$CH$_2$CH$_2$CH$_2$SO$_3$K | 3 |
| 164 | Cu | —SO$_2$CH$_2$CH$_2$CH$_2$SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$NH—CH$_2$—CH$_2$—COONa | 3 |
| 167 | Cu | —SO$_2$(CH$_2$)$_3$SO$_2$NHCH$_2$—CH(OH)—CH$_2$CO$_2$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$COOK | 2 |
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |

-continued

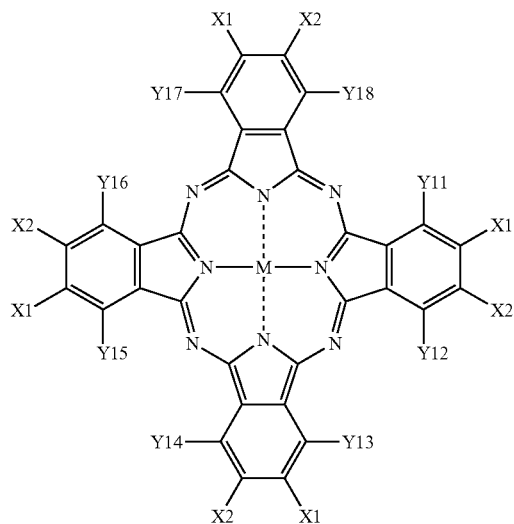

In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.

| | | | |
|---|---|---|---|
| 180 | Cu | —SO₂—CH₂—CH₂—CH₂—SO₂—NH—CH₂—CH(O—CH₃)—CH₃ | 3 |
| 181 | Cu | —SO₂—CH₂—CH₂—CH₂—CO₂—NH—CH(CH₃)—CH₂—CH₃ | 3 |
| 182 | Cu | —SO₂—CH₂—CH₂—CH₂—SO₂NH—CH₂—CH(OH)—CH₃ | 2.5 |
| 183 | Cu | —SO₂—CH₂—CH₂—CH₂—CO₂—NH—CH(CH₃)—CH₂—CH₃ | 2 |
| 184 | Cu | —SO₂—CH₂—CH₂—CH₂—SO₂—NH—CH₂—CH(OH)—CH₃ | 3 |
| 185 | Cu | —SO₂—CH₂—CH₂—CH₂—SO₂—NH—CH₂—CH(OH)—CH₃ | 3 |
| 186 | Cu | —SO₂—CH₂—CH₂—CH₂—CO₂—NH—CH(CH₃)—CH₂—CH₃ | 3 |
| 187 | Cu | —SO₂—CH₂—CH₂—CH₂—SO₂—NH—CH(—CH₃)₂ | 3 |
| 188 | Cu | —CO₂—CH₂—CH₂—CH₂—CO₂—NH—CH(CH₃)—CH₂—CH₃ | 3 |
| 189 | Cu | —CO—NH—CH₂CH₂SO₂—NH—CH(—CH₃)₂ | 3 |
| 190 | Cu | —CO—NH—CH₂—CH(CH₂CH₃)—CH₂—CH₂—CH₂CH₃ | 3 |

| Compound No. | Xp2 | n |
|---|---|---|
| 146 | —SO₂—NH—CH₂—CH(OH)—CH₃ | 1 |

-continued

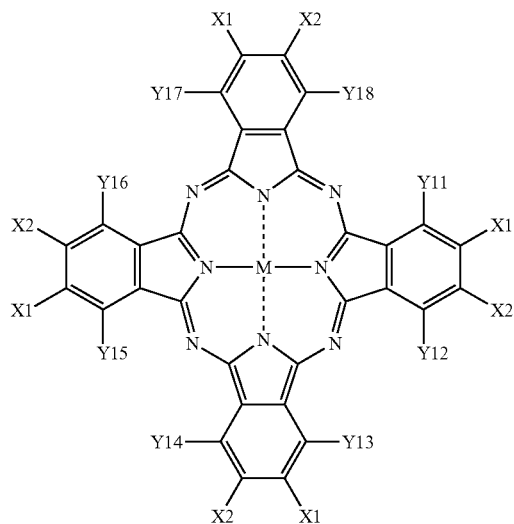

In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.

| | | |
|---|---|---|
| 147 | —SO₂—NH—CH₂—CH₂—CH₂—SO₂—NH—CH₂—CH(OH)—CH₃ | 1 |
| 148 | —SO₂NH—CH₂—CH₂—CH₂—SO₂—NH—CH₂—CH₂—O—CH₂—CH₂—OH | 1 |
| 149 | —SO₂—NH—CH₂—CH₂—CH₂—CO—N(—CH₂—CH₂—OH)₂ | 2 |
| 150 | —SO₂NH—CH(CH₃)—CH₂OH | 1 |
| 151 | —SO₂NH—CH₂—CH₂—O—CH₂—CH₂—OH | 1 |
| 152 | —SO₂—CH₂—CH₂—O—CH₂—CH₂—OH | 1.5 |
| 153 | —SO₂—CH₂—CH₂—CH₂—CO—N(—CH₂—CH₂—OH)₂ | 2 |
| 154 | —SO₂—CH₂—CH₂—CH₂—SO₂—NH—CH₂—CH(OH)—CH₃ | 1 |
| 155 | —SO₂—CH₂—CH₂—CH₂—SO₂—NH—CH₂—CH(OH)—CH₂—COOK | 2 |
| 156 | —SO₂—CH₂—CH(OH)—CH₂—SO₃Li | 1 |
| 157 | —SO₂—CH₂—CH₂—CH₂—CO₂—CH₂—CH₂—CH(OH)—CH₂—COOK | 2 |
| 158 | —SO₂—CH₂—C₆H₄—SO₂NH—CH₂—CH(OH)—CH₂—OH | 1 |
| 159 | —SO₂—CH₂—CH₂—CH₂—SO₂—NH—CH₂—CH(OH)—CH₃ | 1 |
| 160 | —SO₂—CH₂—CH₂—CH₂—CO—N(CH₂—CH₂—COONa)(CH₂—COONa) | 1 |
| 161 | —SO₂CH₂CH₂CH₂SO₂NHCH₂—CH(OH)—CH₂SO₃Li | 1 |

-continued

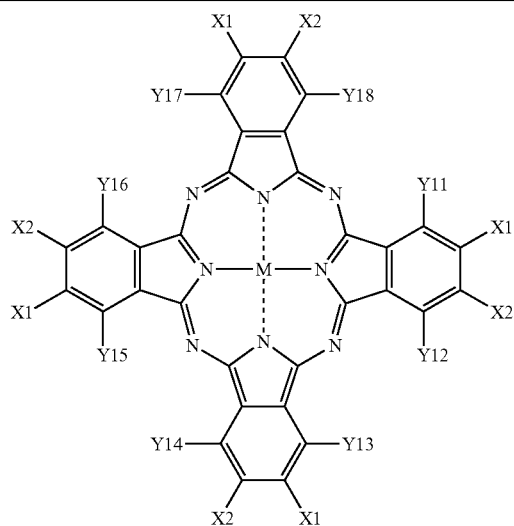

In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.

| 162 | —SO₂CH₂CH₂OCH₂CH₂OCH₂CH₂OH | 2 |
|---|---|---|
| 163 | —SO₂CH₂CH₂CH₂SO₂NH—CH(CH₃)—CH₂—OH | 1 |
| 164 | —SO₂CH₂CH₂—CH₂SO₂N(CH₂CH₂OH)₂ | 2 |
| 165 | —CO—NH—CH₂CH₂—O—CH₂—CH₂—OH | 1 |
| 166 | —CO—NH—CH₂—CH(OH)—CH₃ | 1 |
| 167 | —CO—NH—CH₂—CH₂—CH₂—CO—N(CH₂—CH₂—OH)₂ | 1.5 |
| 168 | —CO—CH₂—CH₂—CH₂—CO—N(CH₂—CH₂—OH)₂ | 2 |
| 169 | —CO₂—CH₂—CH₂—CH₂—SO₂—NH—CH₂—CH(OH)—CH₃ | 1 |
| 170 | —CO₂—CH₂—CH₂—CH₂—SO₂—NH—CH₂—CH(OH)—CH₂—COOK | 2 |
| 171 | —CO₂—CH₂—C₆H₄—SO₂NH—CH₂—CH(OH)—CH₂—OH | 1 |
| 172 | —CO₂—CH₂—CH₂—CH₂—CH₂—CO₂—CH₂—CH₂—CH(OH)—CH₂—COOK | 2 |
| 173 | —CO₂—CH₂—CH(OH)—CH₂—SO₃Li | 2 |
| 174 | —CO₂—CH₂—CH₂—CH₂—SO₂—NH—CH₂—CH(OH)—CH₃ | 1 |
| 175 | —CO₂—CH₂—CH₂—CH₂—CO—N(CH₂—CH₂—COOLi)(CH₂—COOLi) | 2 |

-continued

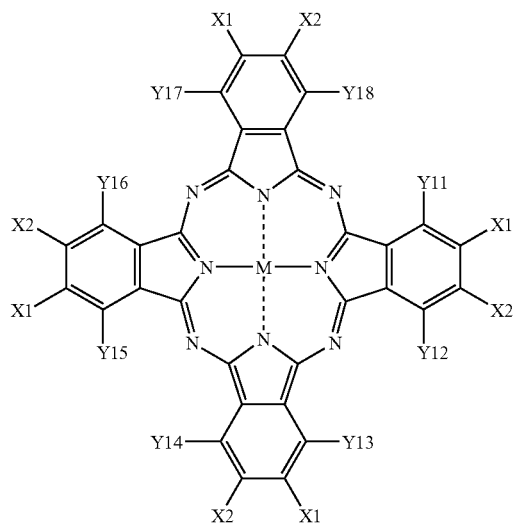

In the Table, no special order is defined independently for the specific examples of the combinations of $(X_1, X_2)$, $(Y_{11}, Y_{12})$, $(Y_{13}, Y_{14})$, $(Y_{15}, Y_{16})$, $(Y_{17}, Y_{18})$.

| | | |
|---|---|---|
| 176 | —SO₂—CH₂—CH₂—CH₂—SO₂—NH—CH₂—CH(CH₂CH₃)—CH₂CH₂—CH₂CH₃ | 1 |
| 177 | —SO₂—CH₂—CH₂—CH₂—SO₂—NH—CH₂—CH(OH)—CH₃ | 1 |
| 178 | —SO₂—CH₂—CH₂—CH₂—CO₂—CH₂—CH(CH₂CH₃)—CH₂CH₂—CH₂CH₃ | 1 |
| 179 | —SO₂—CH₂—CH₂—CH₂—SO₂—NH—CH₂—CH(O—CH₃)—CH₃ | 2 |
| 180 | —SO₂NH—CH₂—CH₂—SO₂NH—CH₂—CH₂—O—CH₂—CH₂—OH | 1 |
| 181 | —SO₂—CH₂—CH₂—CH₂—SO₂—NH—CH—(CH₃)₂ | 1 |
| 182 | —SO₂—CH₂—CH₂—CH₂—CO₂—NH—CH(CH₃)—CH₂—CH₃ | 1.5 |
| 183 | —SO₂—CH₂—CH₂—CH₂—SO₂—NH—(CH₂)₃—CH₂—O—CH₂CH₂—OH | 2 |
| 184 | —SO₂—CH₂—CH₂—O—CH₂—CH₂—O—CH₃ | 1 |
| 185 | —SO₂—CH₂—CH₂—O—CH₂—CH₂—O—CH₂—CH₂—O—CH₃ | 1 |
| 186 | —SO₂—CH₂—CH₂—O—CH₂—CH₂—O—CH₂—CH₂—OH | 1 |
| 187 | —CO₂—CH₂—CH(CH₂CH₃)—CH₂—CH₂—CH₂CH₃ | 1 |
| 188 | —CO₂—CH₂—CH₂—O—CH₂—CH₂—O—CH₃ | 1 |
| 189 | —SO₂—NH—CH₂—CH(CH₂CH₃)—CH₂—CH₂—CH₂—CH₃ | 1 |
| 190 | —CO—NH—CH₂—CH₂—O—CH₂—CH₂—O—CH₃ | 1 |

The structure of the phthalocyanine compounds of M-Pc $(X_{p1})_m(X_{p2})_n$, Nos. 146 to 190 is as follows:

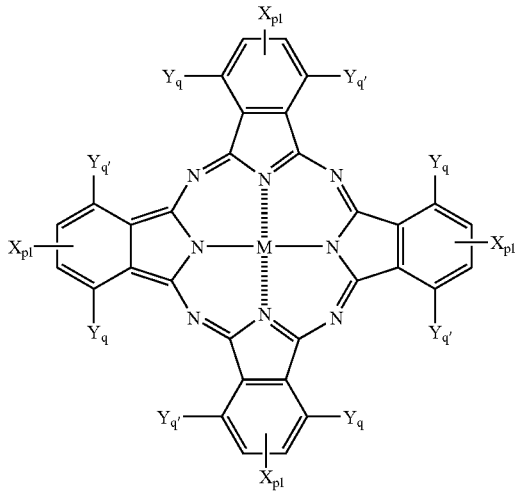

($X_{p1}$ is independently $X_{p1}$ or $X_{p2}$.)

The phthalocyanine dyes of formula (2) may be produced according to the description of the above-mentioned patents. The phthalocyanine dyes of formula (5) may be produced according to the methods mentioned above, or according to the methods described in JP-A 2001-226275, 2001-96610, 2001-47013, 2001-193638. The starting substances, the dye intermediates and the production routes are not limited to those referred to herein.

The phthalocyanine dyes of the invention may be used singly, but may be combined with any other dyes, especially with any other phthalocyanine dyes. When they are combined for use in the invention, the additional phthalocyanine dye may be mixed with the dye of the invention. As the case may be, however, a phthalonitrile derivative (compound P) or a diiminoisoindoline derivative (compound Q) may be mixed with an analogue compound not having the substituent Xp in producing the dyes of formula (II) so as to thereby prepare the intended phthalocyanine dye-containing mixture.

The content of the phthalocyanine dye of formula (2) in the ink is preferably from 0.2 to 20% by weight, more preferably from 0.5 to 15% by weight.

[Magenta Dye]

The magenta dyes for use in the invention are preferably azo dyes having, in an aqueous medium, an absorption peak in a spectral range of from 500 to 580 nm having an oxidation potential more positive than 1.0 V (vs SCE), preferably more positive than 1.1 V (vs SCE), even preferably more positive than 1.15 V (vs SCE)

The first characteristic feature of the preferred structure of the azo dyes that serve as magenta dyes in the invention is that they have a chromophore of a formula, (hetero ring A)—N=N—(hetero ring B). In this case, the hetero ring A and the hetero ring B may have the same structure. Concretely, the hetero ring A and the hetero ring B are 5-membered or 6-membered heterocyclic rings, and are selected, for example, from pyrazole, imidazole, triazole, oxazole, thiazole, selenazole, pyridone, pyrazine, pyrimidine and pyridine. Concretely, the hetero rings are described in JP-A2000-15853, 2001-279145, 2002-309116, 2003-12650.

The second characteristic feature of the preferred structure of the azo dyes is that the azo group in them has, at least one one side thereof, a coupling component of an aromatic, nitrogen-containing 6-membered hetero ring directly bonding thereto. Concrete examples of the azo dyes of the type are described in JP-A 2001-110457

The third characteristic feature of the preferred structure of the azo dyes is that the auxochrome therein has a structure of an aromatic cyclic amino group or a heterocyclic amino group. Concretely, the auxochrome is an anilino group or a heterylamino group.

The fourth characteristic feature of the preferred structure of the azo dyes is that they have a stereostructure. Specific examples of the dyes of the type are described in JP-A 2002-12015.

Having the above-mentioned specific structure, the azo dyes may have an increased oxidation potential and enhanced ozone resistance. For increasing the oxidation potential of the azo dyes, for example, α-hydrogen atom is removed from them. From the viewpoint of the increased oxidation potential thereof, the azo dyes of formula (3) are preferred for use in the invention. Regarding the means for increasing the oxidation potential of azo dyes, concretely referred to is the description of JP-A 2001-254878.

The magenta ink of the invention that comprises the azo dye having any of the above-mentioned structural features preferably has λmax (absorption maximum wavelength) of from 500 to 580 nm as its hue is good. More preferably, the half-value width of the maximum absorption wavelength on the long wavelength side and on the short wavelength side is small, or that is, the absorption peak is sharp. This is concretely described in JP-A 2002-309133. α-methyl introduction into the azo dyes of formula (3) realizes a sharp absorption peak of the resulting dyes.

The forced fading rate constant to ozone gas of the magenta ink that contains the azo dye is preferably at most $5.0 \times 10^{-2}$ [hour$^{-1}$], more preferably at most $3.0 \times 10^{-2}$ [hour$^{-1}$], even more preferably at most $1.5 \times 10^{-2}$ [hour$^{-1}$].

The forced fading rate constant to ozone gas of the magenta ink is determined as follows: The magenta ink alone is printed on a reflection-type image-receiving medium, and a part of the colored area of the thus-formed image having a color of the main spectral absorption region of the ink and having a reflection density, measured through a status A filter, of from 0.90 to 1.10 is specifically selected as an initial density point. The initial density is the start density (=100%). The image is faded in a ozone fading tester in which the ozone concentration is all the time 5 mg/liter. The period of time for which the density of the faded sample is reduced to 80% of the initial density of the original sample is counted, and its reciprocal [hour$^{-1}$] is obtained. On the presumption that the faded density and the fading time will follow the rate formula of primary reaction, the value is defined as the fading reaction rate constant.

The print patch for the test may be any of JIS code 2223 black square symbol-printed patch, Macbeth chart stepwise color patch, or any other gradation density patch that enables area measurement.

The reflection density of the reflection image (stepwise color patch) to be printed for the test is measured by the use of a densitometer that satisfies the International Standard ISO5-4 (geometric condition for reflection density), via a status A filter.

The test chamber for the forced fading rate constant test to ozone gas is equipped with an ozone generator capable of all the time maintaining the internal ozone density at 5 mg/liter (e.g., high-pressure discharging system for applying AC voltage to dry air), and the temperature to which the samples are exposed in the generator is controlled at 25° C.

The forced fading rate constant is an index of the oxidizability of the samples in an oxidizing atmosphere, for example, in an environment with photochemical smog, vehicle exhaust gas, organic vapor from painted furniture or carpets, or gas generated from frames in light rooms. Concretely, the ozone gas is the representative of these oxidizing atmospheres.

The dyes of formula (3) are typical azo dyes having the above-mentioned characteristics for use in the invention, and these are described hereinunder.

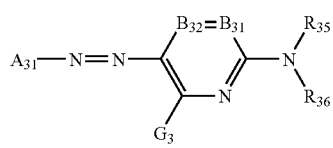
(3)

In formula (3), $A_{31}$ represents a 5-membered hetero ring.

$B_{31}$ and $B_{32}$ each represent $=CR_{31}-$ or $-CR_{32}=$, or either one of them is a nitrogen atom and the other is $=CR_{31}-$ or $-CR_{32}=$.

$R_{35}$ and $R_{36}$ each independently represent a hydrogen atom, or a substituent. The substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and the hydrogen atom in each group may be substituted.

$G_3$, $R_{31}$ and $R_{32}$ each independently represent a hydrogen atom, or a substituent. The substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group(arylamino group, heterocyclic-amino group), an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic-thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, a sulfo group, or a heterocyclic-thio group, and the each group may be further substituted.

$R_{31}$ and $R_{35}$, or $R_{35}$ and $R_{36}$ may bond to each other to form a 5- or 6-membered ring.

In formula (3), $A_{31}$ represents a 5-membered heterocyclic group. Examples of the hetero atom of the hetero ring are N, O and S. Preferably, the hetero ring is a nitrogen-containing 5-membered hetero ring. The hetero ring may be condensed with an aliphatic ring, an aromatic ring or any other hetero ring. Preferred examples of the hetero ring for $A_{31}$ are pyrazole, imidazole, thiazole, isothiazole, oxazole, thiadiazole, triazole, benzothiazole, benzoxazole, benzisothiazole, and benzoimidazole rings. These hetero rings may be further substituted. Above all, pyrazole, imidazole, isothiazole, thiadiazole, benzothiazole and triazole rings of the following formula (a) to (f) are preferred.

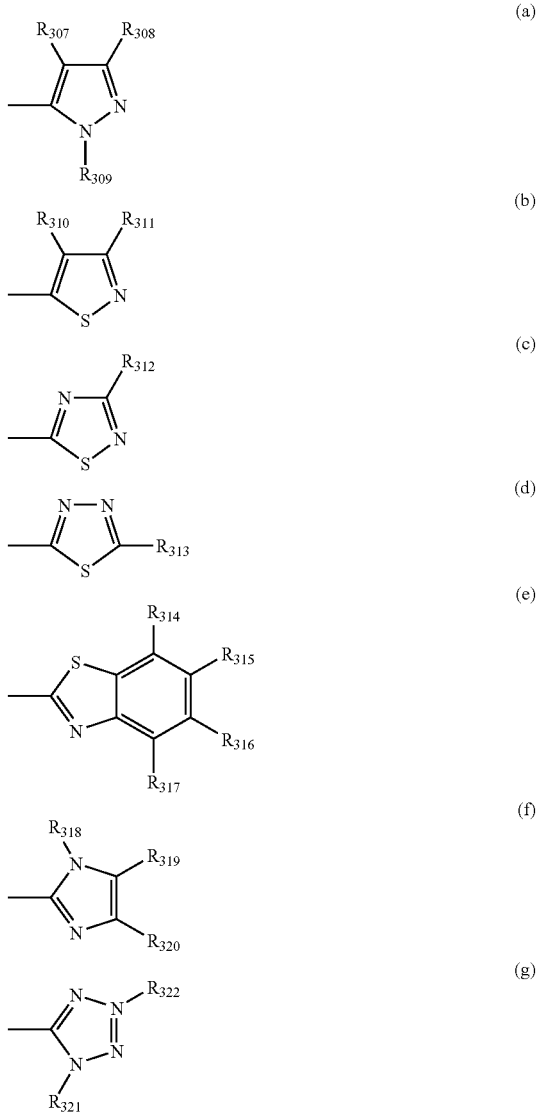

In formulae (a) to (g), $R_{307}$ to $R_{322}$ represent the same substituents as those described for $G_3$, $R_{31}$ and $R_{32}$ in formula (3).

Of formulae (a) to (g), preferred are pyrazole, isothiazole and triazole rings of formulae (a), (b) and (c); and most preferred is the pyrazole ring of formula (a).

In formula (3), $B_{31}$ and $B_{32}$ represent $=CR_{31}-$ and $-CR_{32}=$, respectively, or any one of them represents a nitrogen atom and the other represents $=CR_{31}-$ or $-CR_{32}=$. Preferably, they represent $=CR_{31}-$ and $-CR_{32}=$.

$R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group; and these groups may be further substituted. Preferably, $R_{35}$ and $R_{36}$ each are a hydrogen atom, an aliphatic group, an aromatic group, a heterocyclic group, an acyl group, or an alkyl or arylsulfonyl group; more preferably, a hydrogen atom, an aromatic group, a heterocyclic group, an acyl group, or an alkyl or arylsulfonyl group; most preferably, a hydrogen atom, an aryl group or a heterocyclic group. These groups may be further substituted. However, $R_{35}$ and $R_{36}$ are not hydrogen atoms at the same time.

$G_3$, $R_{31}$ and $R_{32}$ each independently represents a hydrogen atom, halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group(including anilino, heterocyclic amino), an acylamino group, an ureido group, a sulfamoylamino group, an alkoxycarbonylamino group, an aryloxycarbonylamino group, an alkylorarylsulfonyl group, a heterocyclicsulfonylamino group, a nitrogen group, an alkyl or arylthio group, a heterocyclic thio group, an alkyl or aryl sulfonyl group, a heterocyclic sulfonyl group, an alkyl or arylsulfinyl group, a heterocyclic sulfinyl group, a sulfamoyl group, or a sulfo group. These groups may be further substituted Preferably, the substituent of $G_3$ is a hydrogen atom, a halogen atom, an aliphatic group, an aromatic group, a hydroxyl group, an alkoxy group, an aryloxy group, an acyloxy group, a heterocyclic-oxy group, an amino group (including anilino, heterocyclic amino), an acylamino group, an ureido group, a sulfamoylamino group, an alkoxycarbonylamino group, an aryloxycarbonylamino group, an alkyl or arylthio group, or a heterocyclic-thio group; more preferably a hydrogen atom, a halogen atom, an alkyl group, a hydroxyl group, an alkoxy group, an aryloxy group, an acyloxy group, an amino group (including anilino, heterocyclic amino), or an acylamino group; most preferably a hydrogen atom, an anilino group, or an acylamino group. These groups may be further substituted.

Also preferably, $R_{31}$ and $R_{32}$ each are any of a hydrogen atom, an alkyl group, a halogen atom, an alkoxycarbonyl group, a carboxyl group, a carbamoyl group, a hydroxyl group, an alkoxy group or a cyano group. These groups may be substituted.

$R_{31}$ and $R_{35}$, or $R_{35}$ and $R_{36}$ may bond to each other to form a 5- or 6-membered ring.

For the substituents for the substituted groups of $A_{31}$, $R_{31}$, $R_{32}$, $R_{35}$, $R_{36}$ and $G_3$, referred to are those mentioned hereinabove for the substituents for the substituted groups of $G_3$, $R_{31}$ and $R_{32}$.

In case where the dyes of formula (3) are soluble in water, it is desirable that any of $A_{31}$, $R_{31}$, $R_{32}$, $R_{35}$, $R_{36}$ and $G_3$ has an additional substituent of an ionic hydrophilic group. The ionic hydrophilic group for the substituent includes a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. The carboxyl, phosphono and sulfo groups may be in the form of salts. Examples of the counter ion to form the salts are ammonium ions, alkali metal ions (e.g., lithium, sodium and potassium ions), and organic cations (e.g., tetramethylammonium, tetramethylguanidium and tetramethylphosphonium ions).

The term(substituent) used for the description of the formula (3) is described in detail here. These terms are common to the formula (3) and after-mentioned formula (3-A).

The halogen atom includes fluorine, chlorine and bromine atoms.

The aliphatic group means to include an alkyl group, a substituted alkyl group, an alkenyl group, a substituted alkenyl group, an alkynyl group, a substituted alkynyl group, an aralkyl group and a substituted aralkyl group. The wording "substituted" for the "substituted alkyl group" and others means that the hydrogen atom existing in the "alkyl group" and others is substituted with any of the substituents mentioned hereinabove for $G_3$, $R_{31}$ and $R_{32}$.

The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The aromatic group means to include an aryl group and a substitute aryl group. The aryl group is preferably a phenyl or naphthyl group, more preferably a phenyl group. The aromatic group preferably has from 6 to 20 carbon atoms, more preferably from 6 to 16 carbon atoms. Examples of the aromatic group are phenyl, p-tolyl, p-methoxyphenyl, o-chlorophenyl and m-(3-sulfopropylamino)phenyl groups.

The heterocyclic group means to include a substituted heterocyclic group and an unsubstituted heterocyclic group. The hetero ring may be condensed with an aliphatic ring, an aromatic or any other hetero ring. The heterocyclic group is preferably a 5- or 6-membered heterocyclic group. Examples of the substituent of the substituted heterocyclic group are an aliphatic group, a halogen atom, an alkylsulfonyl group, an arylsulfonyl group, an acyl group, an acylamino group, a sulfamoyl group, a carbamoyl group, and an ionic hydrophilic group. Examples of the heterocyclic group are 2-pyridyl, 2-thienyl, 2-thiazolyl, 2-benzothiazolyl, 2-benzoxazolyl and 2-furyl groups.

The alkylsulfonyl and arylsulfonyl groups include substituted alkylsulfonyl and arylsulfonyl groups and unsubstituted alkylsulfonyl and arylsulfonyl groups. Examples of the alkylsulfonyl and arylsulfonyl groups are methylsulfonyl and phenylsulfonyl groups, respectively.

The alkylsulfinyl and arylsulfinyl groups include substituted alkylsulfinyl and arylsulfinyl groups and unsubstituted alkylsulfinyl and arylsulfinyl groups. Examples of the alkylsulfinyl and arylsulfinyl groups are methylsulfinyl and phenylsulfinyl groups, respectively.

The acyl group includes a substituted acyl group and an unsubstituted acyl group. The acyl group preferably has from 1 to 20 carbon atoms. One example of the substituent for the group is an ionic hydrophilic group. Examples of the acyl group are acetyl and benzoyl groups.

The halogen atom includes fluorine, chlorine and bromine atoms.

The amino group includes an amino group substituted with an alkyl, aryl or heterocyclic group, in which the alkyl group, the aryl group and the heterocyclic group may be further substituted. The alkylamino group preferably has from 1 to 20 carbon atoms. One example of the substituent is an ionic hydrophilic group. Examples of the alkylamino group are methylamino and diethylamino groups.

The arylamino group includes a substituted arylamino group and an unsubstituted arylamino group. The arylamino group preferably has from 6 to 20 carbon atoms. Examples of the substituent are a halogen atom, and an ionic hydrophilic group. Examples of the arylamino group are phenylamino and 2-chlorophenylamino groups.

The heterocyclic amino group includes a substituted heterocyclic amino group and an unsubstituted heterocyclic amino group. The heterocyclic amino group preferably has from 2 to 20 carbon atoms. Examples of the substituent are an alkyl group, a halogen atom, and an ionic hydrophilic group.

The alkoxy group includes a substituted alkoxy group and an unsubstituted alkoxy group. The alkoxy group preferably has from 1 to 20 carbon atoms. Examples of the substituent are an alkoxy group, a hydroxyl group, and an ionic hydrophilic group. Examples of the alkoxy group are methoxy, ethoxy, isopropoxy, methoxyethoxy, hydroxyethoxy and 3-carboxypropoxy groups.

The aryloxy group includes a substituted aryloxy group and an unsubstituted aryloxy group. The aryloxy group preferably has from 6 to 20 carbon atoms. Examples of the substituent are an alkoxy group and an ionic hydrophilic group. Examples of the aryloxy group are phenoxy, p-methoxyphenoxy and o-methoxyphenoxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The heterocyclic-oxy group includes a substituted heterocyclic-oxy group and an unsubstituted heterocyclic-oxy group. The heterocyclic-oxy group preferably has from 2 to 20 carbon atoms. Examples of the substituent are an alkyl group, an alkoxy group, and an ionic hydrophilic group. Examples of the heterocyclic-oxy group are 23-pyridyloxy and 3-thienyloxy groups.

The alkoxycarbonyloxy group includes a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group includes a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The acylamino group includes a substituted acylamino group and an unsubstituted acylamino group. The acylamino group preferably has from 2 to 20 carbon atoms. One example of the substituent is an ionic hydrophilic group. Examples of the acylamino group are acetylamino, propionylamino, benzoylamino, N-phenylacetylamino and 3,5-disulfobenzoylamino groups.

The ureido group includes a substituted ureido group and an unsubstituted ureido group. The ureido group preferably has from 1 to 20 carbon atoms. Examples of the substituent are an alkyl group and an aryl group. Examples of the ureido group are 3-methylureido, 3,3-dimethylureido and 3-phenylureido groups.

The sulfamoylamino group includes a substituted sulfamoylamino group and an unsubstituted sulfamoylamino group. One example of the substituent is an alkyl group. One example of the sulfamoylamino group is an N,N-dipropylsulfamoylamino group.

The alkoxycarbonylamino group includes a substituted alkoxycarbonylamino group and an unsubstituted alkoxycarbonylamino group. The alkoxycarbonylamino group preferably has from 2 to 20 carbon atoms. One example of the substituent is an ionic hydrophilic group. One example of the alkoxycarbonylamino group is an ethoxycarbonylamino group.

The alkylsulfonylamino and arylsulfonylamino groups include substituted alkylsulfonylamino and arylsulfonylamino groups and unsubstituted alkylsulfonylamino and arylsulfonylamino groups. The alkylsulfonylamino and arylsulfonylamino groups preferably have from 1 to 20 carbon atoms. One example of the substituent is an ionic hydrophilic group. Examples of the alkylsulfonylamino and arylsulfonylamino groups are methylsulfonylamino, N-phenylmethylsulfonylamino, phenylsulfonylamino and 3-carboxyphenylsulfonylamino groups.

The carbamoyl group includes a substituted carbamoyl group and an unsubstituted carbamoyl group. One example of the substituent is an alkyl group. Examples of the carbamoyl group are methylcarbamoyl and dimethylcarbamoyl groups.

The sulfamoyl group includes a substituted sulfamoyl group and an unsubstituted sulfamoyl group. One example of the substituent is an alkyl group. Examples of the sulfamoyl group are dimethylsulfamoyl and di(2-hydroxyethyl) sulfamoyl groups.

The alkoxycarbonyl group includes a substituted alkoxycarbonyl group and an unsubstituted alkoxycarbonyl group. The alkoxycarbonyl group preferably has from 2 to 20 carbon atoms. One example of the substituent is an ionic hydrophilic group. Examples of the alkoxycarbonyl group are methoxycarbonyl and ethoxycarbonyl groups.

The acyloxy group includes a substituted acyloxy group and an unsubstituted acyloxy group. The acyloxy group preferably has from 1 to 20 carbon atoms. One example of the substituent is an ionic hydrophilic group. Examples of the acyloxy group are acetoxy and benzoyloxy groups.

The carbamoyloxy group includes a substituted carbamoyloxy group and an unsubstituted carbamoyloxy group. One example of the substituent is an alkyl group. One example of the carbamoyloxy group is an N-methylcarbamoyloxy group.

The aryloxycarbonyl group includes a substituted aryloxycarbonyl group and an unsubstituted aryloxycarbonyl group. The aryloxycarbonyl group preferably has from 7 to 20 carbon atoms. One example of the substituent is an ionic hydrophilic group. One example of the aryloxycarbonyl group is a phenoxycarbonyl group.

The aryloxycarbonylamino group includes a substituted aryloxycarbonylamino group and an unsubstituted aryloxycarbonylamino group. The aryloxycarbonylamino group preferably has from 7 to 20 carbon atoms. One example of the substituent is an ionic hydrophilic group. One example of the aryloxycarbonylamino group is a phenoxycarbonylamino group.

The alkyl, aryl and heterocyclic-thio groups include substituted alkyl, aryl and heterocyclic-thio groups and unsubstituted alkyl, aryl and heterocyclic-thio groups. The alkyl, aryl and heterocyclic-thio groups preferably have from 1 to 20 carbon atoms. One example of the substituent is an ionic hydrophilic group. Examples of the alkyl, aryl and heterocyclic-thio groups are methylthio, phenylthio and 2-pyridylthio groups.

The heterocyclic-oxycarbonyl group includes a substituted heterocyclic-oxycarbonyl group and an unsubstituted heterocyclic-oxycarbonyl group. The heterocyclic-oxycarbonyl group preferably has from 2 to 20 carbon atoms. One example of the substituent is an ionic hydrophilic group. One example of the heterocyclic-oxycarbonyl group is a 2-pyridyloxycarbonyl group.

The heterocyclic sulfonylamino group includes a substituted heterocyclic sulfonylamino group and an unsubstituted heterocyclic sulfonylamino group. The heterocyclic sulfonylamino group preferably has from 1 to 12 carbon atoms. One example of the substituent is an ionic hydrophilic group. Examples of the heterocyclic sulfonylamino group are 2-thiophenesulfonylamino and 3-pyridinesulfonylamino groups.

The heterocyclic sulfonyl group includes a substituted heterocyclic sulfonyl group and an unsubstituted heterocyclic sulfonyl group. The heterocyclic sulfonyl group preferably has from 1 to 20 carbon atoms. One example of the substituent is an ionic hydrophilic group. Examples of the heterocyclic sulfonyl group are 2-thiophenesulfonyl and 3-pyridinesulfonyl groups.

The heterocyclic sulfinyl group includes a substituted heterocyclic sulfinyl group and an unsubstituted heterocyclic sulfinyl group. The heterocyclic sulfinyl group preferably has from 1 to 20 carbon atoms. One example of the substituent is an ionic hydrophilic group. One example of the heterocyclic sulfinyl group is a 4-pyridinesulfinyl group.

In the present invention, more preferred are dyes represented by the following formula (3-A):

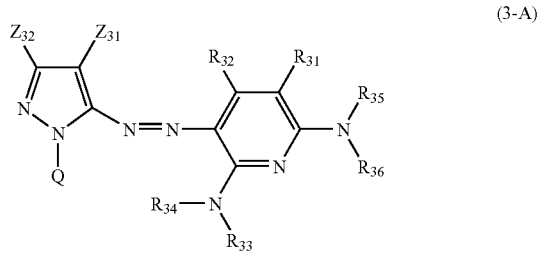

(3-A)

In the formula, $R_{31}$, $R_{32}$, $R_{35}$ and $R_{36}$ have the same meanings as in formula (3).

$R_{33}$ and $R_{34}$ each independently represent a hydrogen atom or a substituent. The substituent includes an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group. Of those, preferred are a hydrogen atom, an aromatic group, a heterocyclic group, an acyl group, an alkylsulfonyl group and an arylsulfonyl group; and more preferred are a hydrogen atom, an aromatic group and a heterocyclic group.

$Z_{31}$ represents an electron-attractive group having a Hammett's substituent constant σp of at least 0.20. Preferably, $Z_{31}$ is an electron-attractive group having σp of at least 0.30, more preferably at least 0.45, even more preferably at least 0.60, but not exceeding 1.0.

Concretely, the electron-attractive group of which the Hammett's substituent constant σp is at least 0.60 includes a cyano group, a nitro group, an alkylsulfonyl group (e.g., methylsulfonyl), and an arylsulfonyl group (e.g., phenylsulfonyl).

Examples of the electron-attractive group having a Hammett's substituent constant σp of at least 0.45 are, in addition to the groups mentioned above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenoalkyl group (e.g., trifluoromethyl).

Examples of the electron-attractive group having a Hammett's substituent constant σp of at least 0.30 are, in addition to the groups mentioned above, an acyloxy group (e.g., acetoxy), a carbamoyl group (e.g., N-ethylcarbamoyl, N,N-diethylcarbamoyl), a halogenoalkoxy group (e.g., trifluoromethoxy), a halogenoaryloxy group (e.g., pentafluorophenyloxy), a sulfonyloxy group (e.g., methylsulfonyloxy), a halogenoalkylthio group (e.g., difluoromethylthio), an aryl group substituted with at least two electron-attractive groups each having σp of at least 0.15 (e.g., 2,4-dinitrophenyl, pentachlorophenyl), and a heterocyclic group (e.g., 2-benzoxazolyl, 2-benzothiazolyl, 1-phenyl-2-benzimidazolyl).

Examples of the electron-attractive group having σp of at least 0.20 are, in addition to the groups mentioned above, a halogen atom.

Above all, $Z_{31}$ is preferably any of an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms; more preferably any of a cyano group, an alkylsulfonyl group having from 1 to 20 carbon atoms, or an arylsulfonyl group having from 6 to 20 carbon atoms; most preferably a cyano group.

$Z_{32}$ represents a hydrogen atom, or a substituent. The substituent includes an aliphatic group, an aromatic group and a heterocyclic group. Preferably, $Z_{32}$ is an aliphatic group, more preferably an alkyl group having from 1 to 6 carbon atoms.

Q represents a hydrogen atom, or a substituent. The substituent includes an aliphatic group, an aromatic group or a heterocyclic group. Above all, Q is preferably a group that comprises non-metallic atoms necessary for forming a 5- to 8-membered ring. The 5- to 8-membered ring may be substituted, and may be a saturated ring or may have an unsaturated bond. Above all, it is more preferably an aromatic group or a heterocyclic group. Preferred non-metallic atoms for it are nitrogen, oxygen, sulfur and carbon atoms. Examples of the cyclic structure are benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulforane and thian rings.

The hydrogen atom of each group in formula (3-A) may be substituted. For the substituents, referred to are those mentioned hereinabove for the groups $G_3$, $R_{31}$ and $R_{32}$ in formula (3), and ionic hydrophilic groups.

Especially preferred combinations of the substituents of the azo dyes of formula (3) are mentioned below. $R_{35}$ and $R_{36}$ are preferably any of a hydrogen atom, an alkyl group, an aryl group, a heterocyclic group, a sulfonyl group or an acyl group; more preferably any of a hydrogen atom, an aryl group, a heterocyclic group or a sulfonyl group; most preferably any of a hydrogen atom, an aryl group or a heterocyclic group. However, $R_{35}$ and $R_{36}$ must not be hydrogen atoms at the same time.

$G_3$ is preferably a hydrogen atom, a halogen atom, an alkyl group, a hydroxyl group, an amino group or an acylamino group, more preferably a hydrogen atom, a halogen atom, an amino group or an acylamino group, most preferably a hydrogen atom, an amino group or an acylamino group.

$A_{31}$ is preferably a pyrazole ring, an imidazole ring, an isothiazole ring, a thiadiazole ring or a benzothiazole ring, more preferably a pyrazole ring or an isothiazole ring, most preferably a pyrazole ring.

Also preferably, $B_{31}$ and $B_{32}$ are $=CR_{31}-$ and $-CR_{32}=$, respectively; and $R_{31}$ and $R_{32}$ are preferably any of a hydrogen atom, an alkyl group, a halogen atom, a cyano group, a carbamoyl group, a carboxyl group, a hydroxyl group, an alkoxy group or an alkoxycarbonyl group, more preferably any of a hydrogen atom, an alkyl group, a carboxyl group, a cyano group or a carbamoyl group.

Regarding the preferred combinations of the substituents of the compounds of formula (3), it is desirable that at least one of the substituents is the above-mentioned preferred group. More preferably, a larger number of the substituents are the preferred groups. Most preferably, all the substituents are the preferred groups.

Specific examples of the azo dyes of formula (3) are mentioned below, to which, however, the invention should not be limited.

-continued
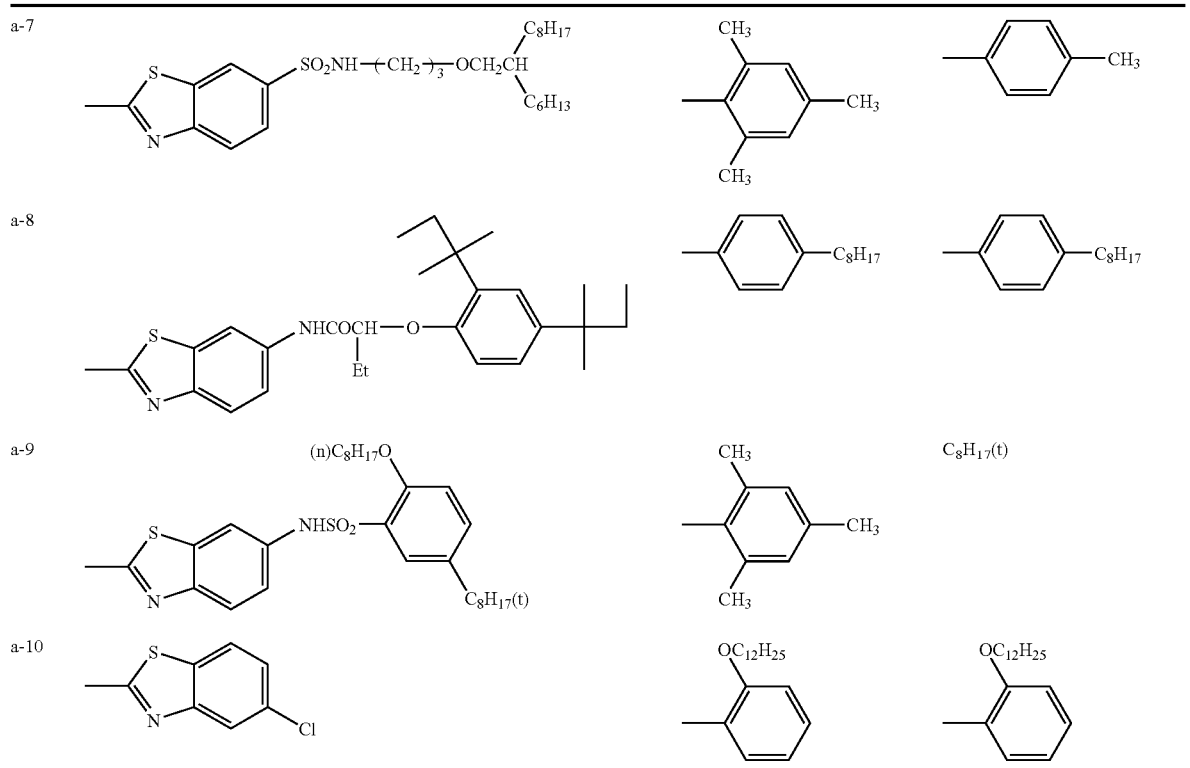
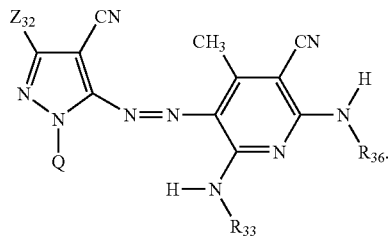
| Dye | $Z_{32}$ | Q | $R_{33}$ | $R_{36}$ |
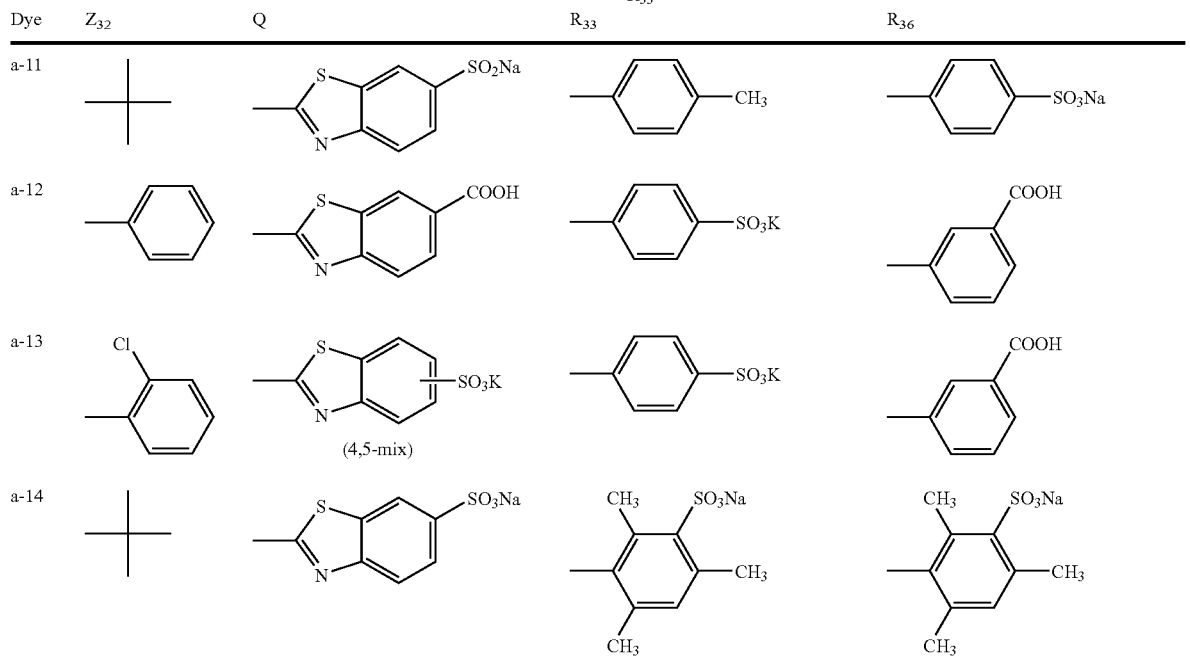

-continued
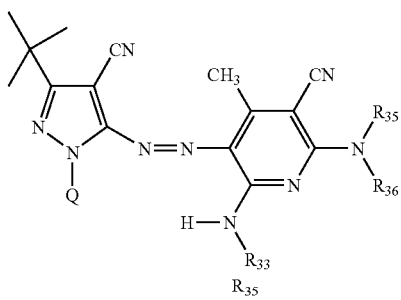
| Dye | Q | R35 |
|---|---|---|
| a-18 | 2-methylbenzothiazole | 2-methylbenzothiazole |
| a-19 | 5-chloro-2-methylbenzothiazole | —SO₂CH₃ |
| a-20 | 2-methylbenzothiazole | —COCH₃ |
| a-21 | 6-chloro-2-methylbenzothiazole | —SO₂CH₃ |
| a-22 | 2-methylbenzothiazole | H |
| a-23 | 2-methylbenzothiazole | H |

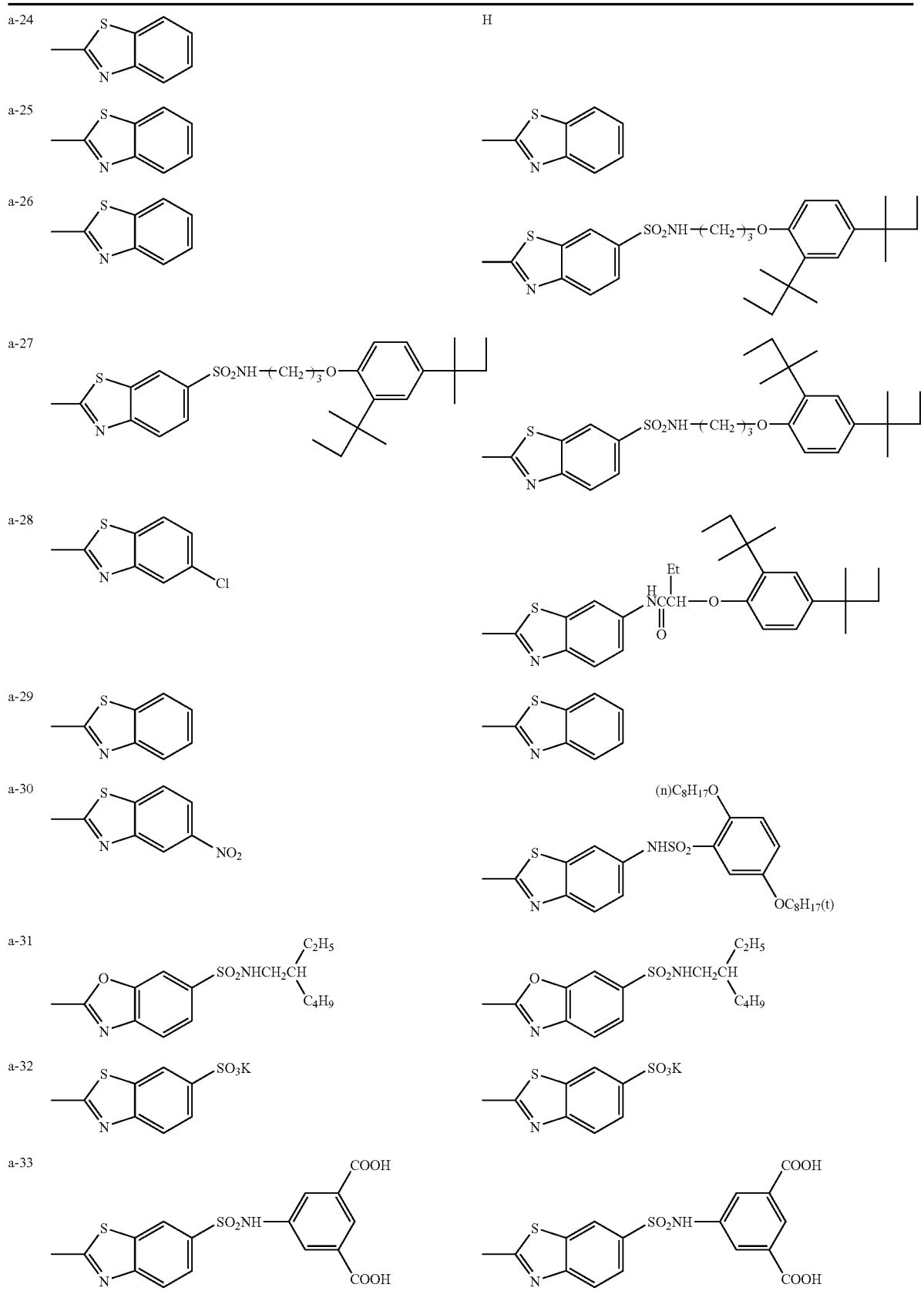

-continued
a-34 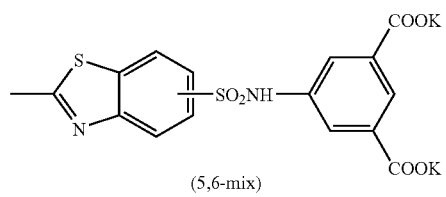 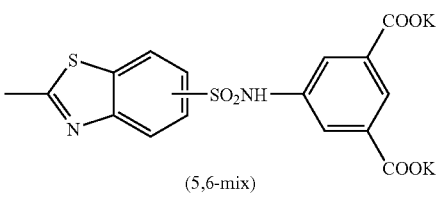
(5,6-mix) (5,6-mix)
a-35 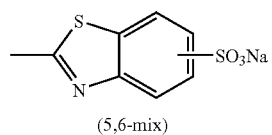 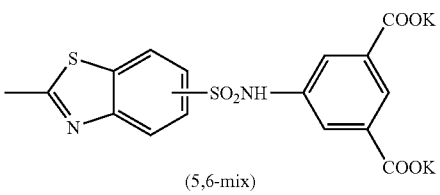
(5,6-mix) (5,6-mix)
a-36 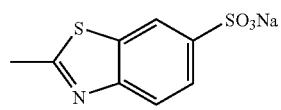 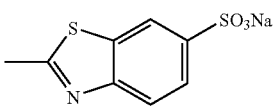
a-37 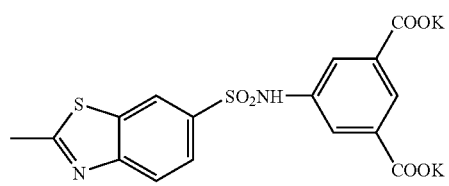 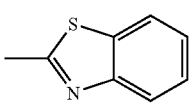
a-38 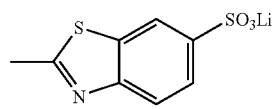 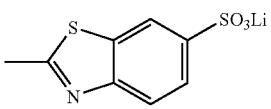
a-39 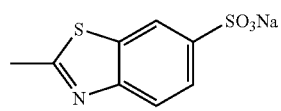 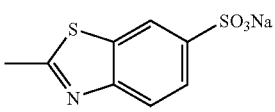
a-40 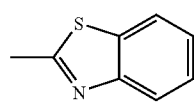 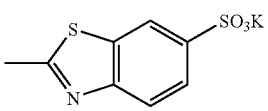
| Dye | $R_{36}$ | $R_{33}$ |
|---|---|---|
| a-18 | 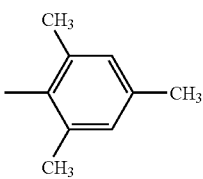 | 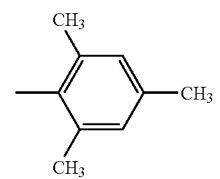 |
| a-19 | 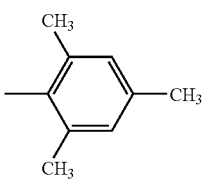 | 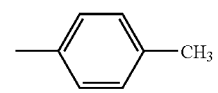 |
| a-20 | $C_8H_{17}(t)$ | $C_8H_{17}(t)$ |

-continued
| | | |
|---|---|---|
| a-21 | 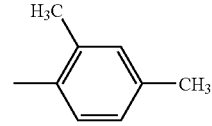 | C_8H_{17}(t) |
| a-22 | 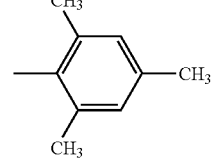 | |
| a-23 | 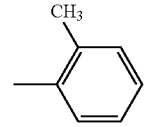 | |
| a-24 | 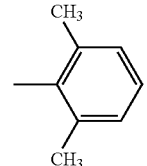 | |
| a-25 | 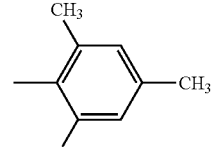 | |
| a-26 | 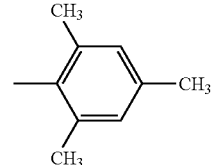 | |
| a-27 | 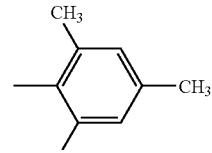 | |
| a-28 | 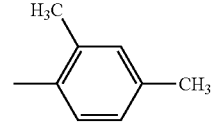 | |
| a-29 | 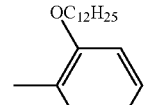 | |
| a-30 | 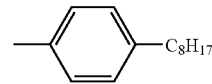 | C_8H_{17}(t) |

-continued
a-31 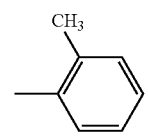 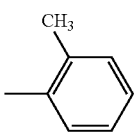
a-32 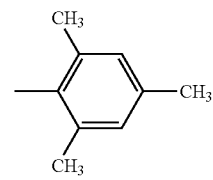 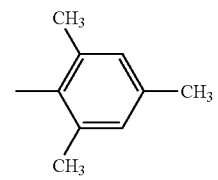
a-33 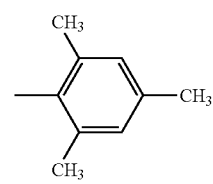 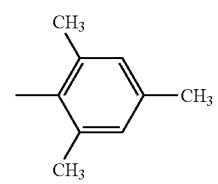
a-34 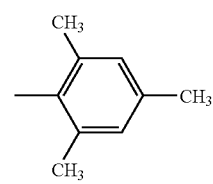 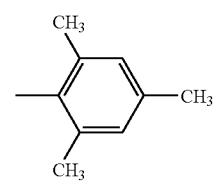
a-35 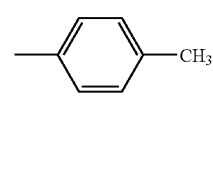 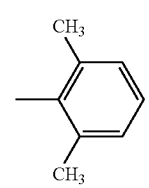
a-36 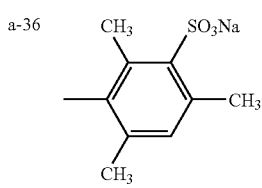 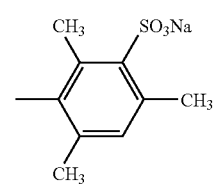
a-37 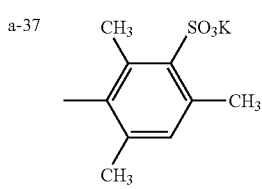 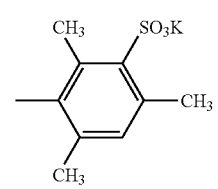
a-38 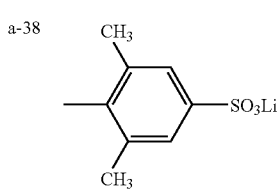 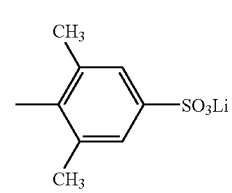

-continued
a-39 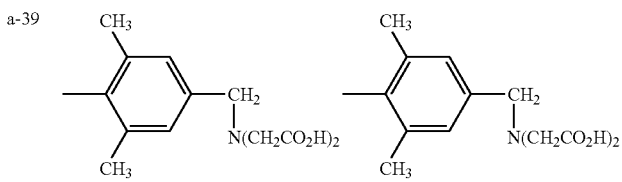
a-40 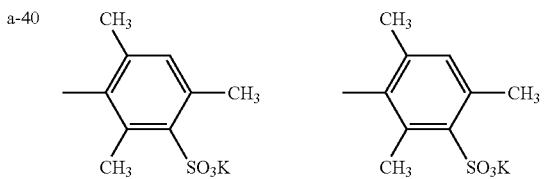
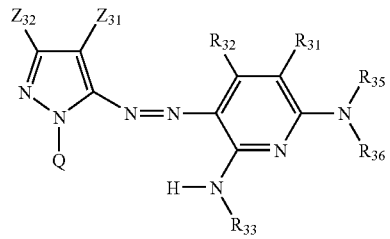
| Dye | $Z_{32}$ | $Z_{31}$ | Q | $R_{32}$ | $R_{31}$ | $R_{35}$ |
|---|---|---|---|---|---|---|
| a-41 | ![o-xylyl] CH₃ | CN | 2-pyridyl | H | CONH₂ | SO₂CH₃ |
| a-42 | t-Bu | Br | 2-pyrimidyl | COOEt | H | 2-benzothiazolyl |
| a-43 | 2-pyridyl | SO₂CH₃ | 4-methyl-2,6-bis(NHCH₃)-1,3,5-triazinyl | CONH₂ | H | 6-chloro-2-benzothiazolyl |
| a-44 | t-Bu | CN | 2,4,5-tricyano-phenyl | H | H | 5-chloro-2-benzothiazolyl |
| a-45 | t-Bu | Br | 2,6-dichloro-4-nitrophenyl | H | CONH₂ | C(=O)CH₃ |
| a-46 | t-Bu | CN | 2-benzothiazolyl | CH₃ | H | 2-benzothiazolyl |

-continued
| Dye | R36 | R33 |
|---|---|---|
| a-41 | 2-methyl-6-octyloxyphenyl | 2,3-dimethylphenyl |
| a-42 | C8H17(t) | COCH3 |
| a-43 | 4-methylphenyl | COC(CH3)3 |
| a-44 | 2,3-dimethylphenyl | SO2CH3 |
| a-45 | 2,3,5-trimethylphenyl | 4-C8H17-phenyl |
| a-46 | 2,6-diethyl-4-methylphenyl | 2,6-diethyl-4-methylphenyl |
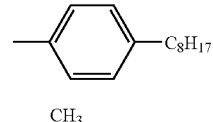
| Dye | Z32 | R32 | R31 | R35 | R36 | R33 |
|---|---|---|---|---|---|---|
| b-1 | CH3 | CH3 | CN | H | 4-C8H17-phenyl | 4-C8H17-phenyl |
| b-2 | CH3 | CH3 | CN | H | 2,4,6-trimethylphenyl | 2,4,6-trimethylphenyl |
| b-3 | CH3 | CH3 | CONH2 | H | 4-C8H17-phenyl | 2,4,6-trimethylphenyl |

-continued
| | | | | | | | |
|---|---|---|---|---|---|---|---|
| b-4 | $CH_3$ | $CH_3$ | H | H | 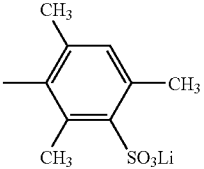 | | 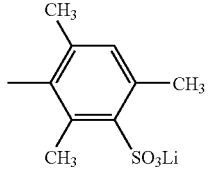 |
| b-5 | $CH_3$ | H | CN | H | 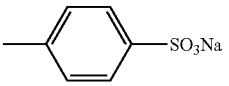 | | 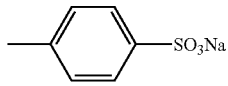 |
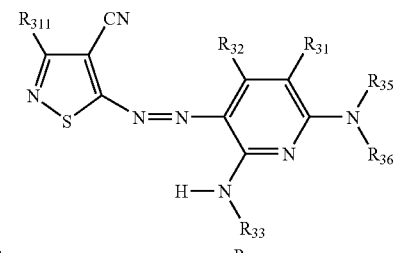
| Dye | $R_{311}$ | $R_{32}$ | $R_{31}$ | $R_{35}$ | $R_{36}$ | $R_{33}$ |
|---|---|---|---|---|---|---|
| b-6 | $CH_3$ | $CH_3$ | H | 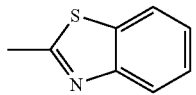 | 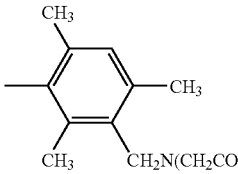 | 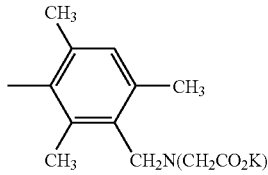 |
| b-7 | $CH_3$ | $CH_3$ | H | 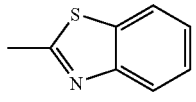 | 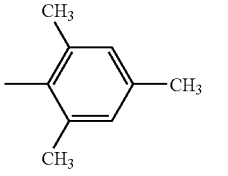 | 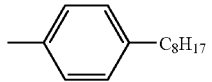 |
| b-8 | $CH_3$ | H | H | $SO_2CH_3$ | 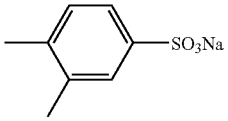 | 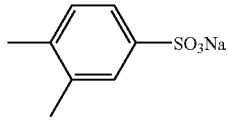 |
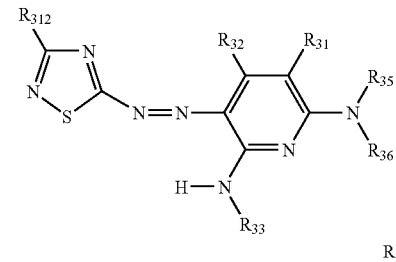
| Dye | $R_{312}$ | $R_{32}$ | $R_{31}$ | $R_{35}$ | $R_{36}$ | $R_{33}$ |
|---|---|---|---|---|---|---|
| c-1 | —$SCH_3$ | $CH_3$ | CN | H | $C_8H_{11}(t)$ | 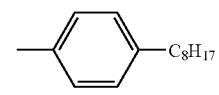 |
| c-2 | 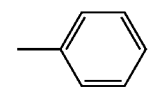 | H | $CONH_2$ | H | | 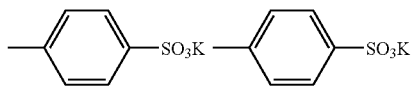 |

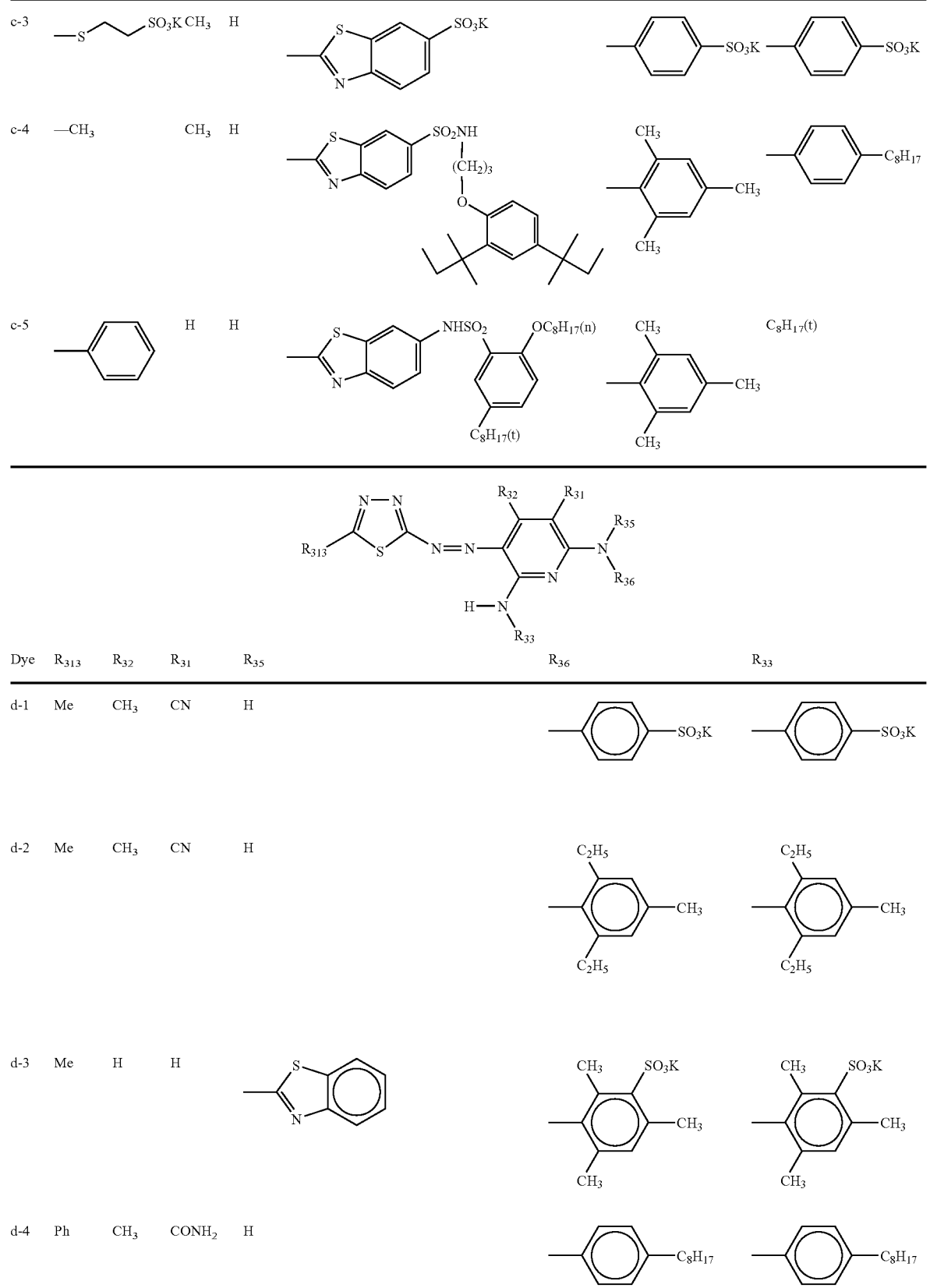

-continued
| d-5 | Ph | CH₃ | H | 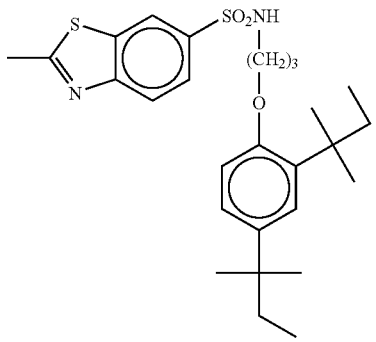 | 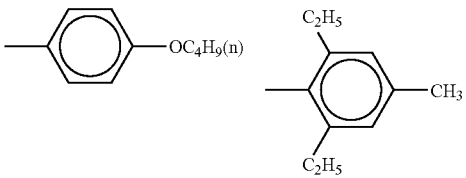 |
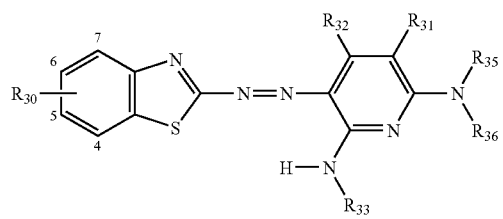
| Dye | R₃₀ | R₃₂ | R₃₁ | R₃₅ | R₃₆ | R₃₃ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazolyl | —C₆H₄—C₈H₁₇ | —C₆H₄—C₈H₁₇ |
| e-3 | 5,6-diCl | CH₃ | H | 2-methylbenzothiazolyl | mesityl | COCH₃ |
| e-4 | 5-CH₃ | H | CN | H | —C₆H₄—SO₃K | —C₆H₄—SO₃K |
| e-5 | 5-NO₂ | CH₃ | H | SO₂CH₃ | 2,3-dimethylphenyl | mesityl |
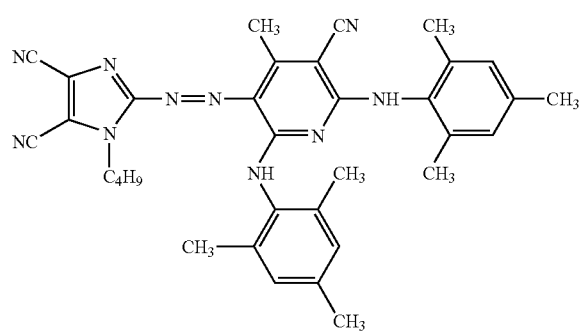
f-1

-continued

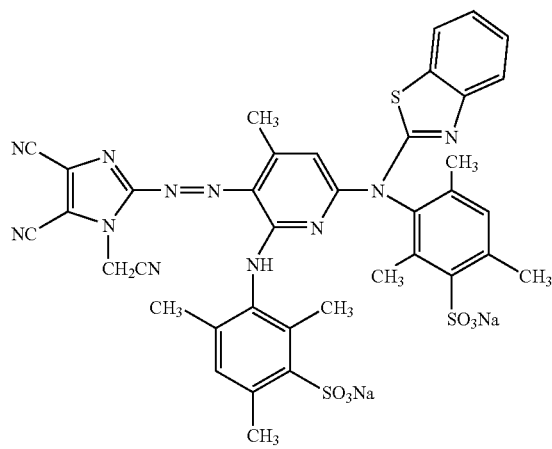

f-2

The content of the azo dye of formula (3) in the ink is preferably from 0.2 to 20% by weight, more preferably from 0.5 to 15% by weight. Also preferably, the solubility of the dye in water at 20° C. (or the dispersibility thereof in a stable condition) is at least 5% by weight, more preferably at least 10% by weight.

[Black Dye]

A dye (L) is used in the black ink for use in the invention. This has a wavelength λmax falling between 500 nm and 700 nm, and the half-value width of the absorption spectrum of its diluted solution that is standardized to have an absorbance of 1.0, ($W\lambda_{1/2}$) is at least 100 nm, but preferably from 120 nm to 500 nm, more preferably from 120 nm to 350 nm.

The dye (L) may be used alone for black ink, so far as it may realize a "tight" black image of high quality (in which none of B, G and R color tones are highlighted irrespective of the viewing light source) by itself. In general, however, the dye is combined with any other dye capable of covering the region that is poorly absorbed by the dye (L). Concretely, it is desirable that the dye (L) is combined with a dye (S) having a main absorption in an yellow region (and having λmax of from 350 to 500 nm). As the case may be, the dye (L) may also be combined with any other dye to form black ink.

In the invention, the dye is, either alone or as combined with any other dye, dissolved or dispersed in an aqueous medium to produce black ink. The preferred properties of the black ink for inkjet recording are that 1) its weather resistance is good and/or 2) the image does not lose the black balance even after faded. In order to have the preferred properties, it is desirable that the black ink satisfies the following conditions.

Using the black ink, 48-point size, black square symbols of JIS code 2223 are printed, and their reflection density ($D_{vis}$) is measured via a status A filter (visual filter). This is an initial density of the sample. One example of the reflection densitometer equipped with a status A filter is an X-Rite densitometer. To measure the density of "black" herein, the measured data $D_{vis}$ are referred to as the standard observation reflection density. The printed matter is forcedly faded by the use of an ozone fading tester where 5 ppm ozone is generated all the time. The period of time (t) for which the reflection density ($D_{vis}$) of the faded sample is reduced to 80% of the initial density of the original sample is counted, and a forced fading rate constant ($k_{vis}$) is derived from a relational formula, $0.8 = \exp(-k_{vis} \cdot t)$.

Preferably, the rate constant ($k_{vis}$) of the black ink is at most $5.0 \times 10^{-2}$ [hour$^{-1}$], more preferably at most $3.0 \times 10^{-2}$ [hour$^{-1}$], even more preferably at most $1.0 \times 10^{-2}$ [hour$^{-1}$] (condition 1).

Using the black ink, 48-point size, black square symbols of JIS code 2223 are printed, and the reflection density of three colors C (cyan), M (magenta) and Y (yellow), except $D_{vis}$, is measured via a status A filter. Thus measured, the data are initial density $D_R$, $D_G$ and $D_B$. These data $D_R$, $D_G$ and $D_B$ indicate the C reflection density through red filter, the M reflection density through green filter, and the Y reflection density through blue filter, respectively. The printed matter is forcedly faded by the use of an ozone fading tester where 5 ppm ozone is generated all the time, in the same manner as above. From the period of time for which the reflection density $D_R$, $D_G$ and $D_B$ of the faded sample is reduced to 80% of the initial density of the original sample, the forced fading rate constant ($k_R$, $k_G$, $k_B$) is derived in the same manner as above. The ratio (R) of the maximum value to the minimum value of the three rate constants (for example, when $k_R$ is the maximum value and the $k_G$ is the minimum value, $R = k_R/k_G$) is preferably at most 1.2, more preferably at most 1.1, even more preferably at most 1.05 (condition 2).

In the "printed matter with 48-point size, black square symbols of JIS code 2223 thereon" used in the above, the image is printed to a size that fully covers the aperture of the tester in order that it may be enough for the density measurement.

As so mentioned hereinabove, it is desirable that the oxidation potential of at least one dye to be used in the black in is higher than 1.0 V (vs SCE), more preferably higher than 1.1 V (vs SCE), even more preferably higher than 1.2 V (vs SCE), most preferably higher than 1.25 V (vs SCE). Also preferably, λmax of at lest one dye in the ink is 500 nm or more (condition 3).

To produce the black ink, the azo dye of formula (4) is used. For the azo dye of formula (4), mentioned are those corresponding to the dye (L). The dye (L) has λmax falling between 500 nm and 700 nm, and the half-value width of the absorption spectrum of its diluted solution that is standardized to have an absorbance of 1.0 is at least 100 nm. Apart from it, those corresponding to the dye (S) are further mentioned for the azo dye of formula (4). The dye (S) has λmax of from 350 nm to 500 nm. Preferably in the invention, at least one dye (L) is the dye of formula (4); more preferably, at least one dye (L) and at least one dye (S) are both the dyes of formula (4). Even more preferably, at least 90% by mass of all dye in the ink is the dye of formula (4) (condition 4).

The black ink of the invention satisfies at least one of the above-mentioned conditions 1 to 4.

The dyes of formula (4) are described below.

(4)

wherein $A_{41}$, $A_{42}$ and $A_{43}$ each independently represent an optionally-substituted heterocyclic group; and $A_{41}$ and $A_{43}$ are monovalent group, and $A_{42}$ is a divalent group.

Of the azo dyes of formula (4), preferred are those of the following formula (4-A):

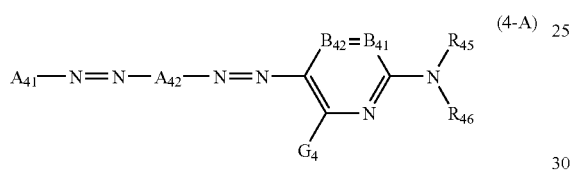

(4-A)

$B_{41}$ and $B_{42}$ represent =$CR_{41}$— and —$CR_{42}$=, respectively, or any one of them is a nitrogen atom and the other is =$CR_{41}$— or —$CR_{42}$=.

$G_4$, $R_{41}$ and $R_{42}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including alkylamino, arylamino, heterocyclic-amino), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group. These groups may be substituted.

$R_{45}$ and $R_{46}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. These groups may be substituted.

$R_{41}$ and $R_{45}$, or $R_{45}$ and $R_{46}$ may bond to each other to form a 5- or 6-membered ring. $A_{41}$ and $A_{42}$ have the same meaning as those of formula (4).

Of the azo dyes of formula (4-A), more preferred are those of the following formulae (4-B1) or (4-B2):

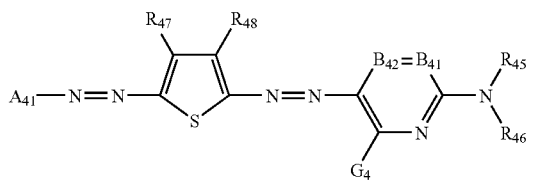

(4-B1)

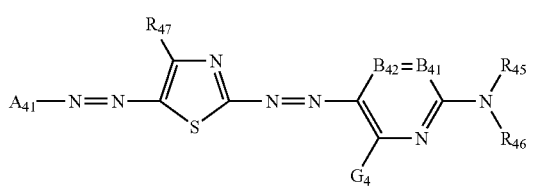

(4-B2)

In formulae (4-B1) or (4-B2), $R_{47}$ and $R_{48}$ have the same meaning as that of $R_{41}$ in formula (4-A). $A_{41}$, $R_{45}$, $R_{46}$, $B_{41}$, $B_{42}$ and $G_4$ have the same meaning as those in formula (4-A)

The azo dyes of formula (4) and its more specific concept, formulae (4-A) and (4-B) for use in the invention are described in detail hereinunder. (Formula (4-B) indicates both formulae (4-B1) and (4-B2).

First described are the groups and the substituents in these formulae.

The halogen atom includes fluorine, chlorine and bromine atoms.

The aliphatic group means to include an alkyl group, a substituted alkyl group, an alkenyl group, a substituted alkenyl group, an alkynyl group, a substituted alkynyl group, an aralkyl group and a substituted aralkyl group. The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The monovalent aromatic group means to include an aryl group and a substitute aryl group. The aryl group is preferably a phenyl or naphthyl group, more preferably a phenyl group. The monovalent aromatic group preferably has from 6 to 20 carbon atoms, more preferably from 6 to 16 carbon atoms. Examples of the monovalent aromatic group are phenyl, p-tolyl, p-methoxyphenyl, o-chlorophenyl and m-(3-sulfopropylamino)phenyl groups. The divalent aromatic group corresponds to but differs from the monovalent aromatic group in that it is a divalent group. Its examples are phenylene, p-tolylene, p-methoxyphenylene, o-chlorophenylene, m-(3-sulfopropylamino)phenylene and naphthylene groups.

The heterocyclic group includes a substituted heterocyclic group and an unsubstituted heterocyclic group. The hetero ring may be condensed with an aliphatic ring, an aromatic ring or any other hetero ring. The hetero ring is preferably 5-membered or 6-membered. The hetero atoms for the hetero ring are N, O and S. Examples of the substituent are an aliphatic group, a halogen atom, an alkyl or arylsulfonyl group, an acyl group, an acylamino group, a sulfamoyl group, a carbamoyl group, and an ionic hydrophilic group. Examples of the monovalent heterocyclic group are 2-pyridyl, 2-thienyl, 2-thiazolyl, 2-benzothiazolyl, 2-benzoxazolyl and 2-furyl groups. The divalent heterocyclic group is derived from the above-mentioned monovalent heterocyclic group by removing one hydrogen atom from it to give a free bond.

The carbamoyl group means to include a substituted carbamoyl group and an unsubstituted carbamoyl group. One example of the substituent of the substituted carbamoyl group is an alkyl group. Examples of the carbamoyl group are methylcarbamoyl and dimethylcarbamoyl groups.

The alkoxycarbonyl group means to include a substituted alkoxycarbonyl group and an unsubstituted alkoxycarbonyl group. The alkoxycarbonyl group preferably has from 2 to 20 carbon atoms. One example of the substituent of the substituted group is an ionic hydrophilic group. Examples of the alkoxycarbonyl group are methoxycarbonyl and ethoxycarbonyl groups.

The aryloxycarbonyl group means to include a substituted aryloxycarbonyl group and an unsubstituted aryloxycarbonyl group. The aryloxycarbonyl group preferably has from 7 to 20 carbon atoms. One example of the substituent of the substituted group is an ionic hydrophilic group. One example of the alkoxycarbonyl group is a phenoxycarbonyl group.

The heterocyclic-oxycarbonyl group means to include a substituted heterocyclic-oxycarbonyl group and an unsubstituted heterocyclic-oxycarbonyl group. The heterocyclic-oxycarbonyl group preferably has from 2 to 20 carbon atoms. One example of the substituent of the substituted group is an ionic hydrophilic group. One example of the heterocyclic-oxycarbonyl group is a 2-pyridyloxycarbonyl group.

The acyl group means to include a substituted acyl group and an unsubstituted acyl group. The acyl group preferably has from 1 to 20 carbon atoms. One example of the substituent of the substituted acyl group is an ionic hydrophilic group. Examples of the acyl group are acetyl and benzoyl groups.

The alkoxy group means to include a substituted alkoxy group and an unsubstituted alkoxy group. The alkoxy group preferably has from 1 to 20 carbon atoms. Examples of the substituent of the substituted alkoxy group are an alkoxy group, a hydroxyl group, and a ionic hydrophilic group. Examples of the alkoxy group are methoxy, ethoxy, isopropoxy, methoxyethoxy, hydroxyethoxy and 3-carboxypropoxy groups.

The aryloxy group means to include a substituted aryloxy group and an unsubstituted aryloxy group. The aryloxy group preferably has from 6 to 20 carbon atoms. Examples of the substituent for the substituted aryloxy group are an alkoxy group and an ionic hydrophilic group. Examples of the aryloxy group are phenoxy, p-methoxyphenoxy and o-methoxyphenoxy groups.

The heterocyclic-oxy group means to include a substituted heterocyclic-oxy group and an unsubstituted heterocyclic-oxy group. The heterocyclic-oxy group preferably has from 2 to 20 carbon atoms. Examples of the substituent of the substituted group are an alkyl group, an alkoxy group, and an ionic hydrophilic group. Examples of the heterocyclic-oxy group are 3-pyridyloxy and 3-thienyloxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The acyloxy group means to include a substituted acyloxy group and an unsubstituted acyloxy group. The acyloxy group preferably has from 1 to 20 carbon atoms. One example of the substituent of the substituted acyloxy group is an ionic hydrophilic group. Examples of the acyloxy group are acetoxy and benzoyloxy groups.

The carbamoyloxy group means to include a substituted carbamoyloxy group and an unsubstituted carbamoyloxy group. One example of the substituent of the substituted carbamoyloxy group is an alkyl group. One example of the carbamoyloxy group is an N-methylcarbamoyloxy group.

The alkoxycarbonyloxy group means to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group means to include a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The amino group means to include an unsubstituted amino group and an amino group substituted with any of an alkyl group, an aryl group or a heterocyclic group. The substituent, alkyl group, aryl group may be further substituted. The alkylamino group preferably has from 1 to 20 carbon atoms. One example of the substituent of the substituted groups is an ionic hydrophilic group. Examples of the alkylamino group are methylamino and diethylamino groups.

The arylamino group means to include a substituted arylamino group and an unsubstituted arylamino group. The arylamino group preferably has from 6 to 20 carbon atoms. Examples of the substituent of the substituted arylamino group are a halogen atom and an ionic hydrophilic group. Examples of the arylamino group are anilino and 2-chlorophenylamino groups.

The heterocyclic amino group means to include a substituted heterocyclic amino group and an unsubstituted heterocyclic amino group. The heterocyclic amino group preferably has from 2 to 20 carbon atoms. Examples of the substituent of the substituted group are an alkyl group, a halogen atom and an ionic hydrophilic group.

The acylamino group means to include a substituted acylamino group and an unsubstituted acylamino group. The acylamino group preferably has from 2 to 20 carbon atoms. One example of the substituent of the substituted acylamino group is an ionic hydrophilic group. Examples of the acylamino group are acetylamino, propionylamino, benzoylamino, N-phenylacetylamino and 3,5-disulfobenzoylamino groups.

The ureido group means to include a substituted ureido group and an unsubstituted ureido group. The ureido group preferably has from 1 to 20 carbon atoms. Examples of the substituent of the substituted ureido group are an alkyl group and an aryl group. Examples of the ureido group are 3-methylureido, 3,3-dimethylureido and 3-phenylureido groups.

The sulfamoylamino group means to include a substituted sulfamoylamino group and an unsubstituted sulfamoylamino group. One example of the substituent of the substituted sulfamoylamino group is an alkyl group. One example of the sulfamoylamino group is an N,N-dipropylsulfamoylamino group.

The alkoxycarbonylamino group means to include a substituted alkoxycarbonylamino group and an unsubstituted alkoxycarbonylamino group. The alkoxycarbonylamino group preferably has from 2 to 20 carbon atoms. One example of the substituent of the substituted alkoxycarbonylamino group is an ionic hydrophilic group. One example of the alkoxycarbonylamino group is an ethoxycarbonylamino group.

The aryloxycarbonylamino group means to include a substituted aryloxycarbonylamino group and an unsubstituted aryloxycarbonylamino group. The aryloxycarbonylamino group preferably has from 7 to 20 carbon atoms. One example of the substituent of the substituted group is an ionic hydrophilic group. One example of the aryloxycarbonylamino group is a phenoxycarbonylamino group.

The alkylsulfonylamino and arylsulfonylamino group means to include a substituted alkylsulfonylamino and arylsulfonylamino group and an unsubstituted alkylsulfonylamino and arylsulfonylamino group. The sulfonylamino group preferably has from 1 to 20 carbon atoms. One example of the substituent of the substituted group is an ionic hydrophilic group. Examples of the sulfonylamino group are methylsulfonylamino, N-phenyl-methylsulfonylamino, phenylsulfonylamino and 3-carboxyphenylsulfonylamino groups.

The heterocyclic sulfonylamino group means to include a substituted heterocyclic sulfonylamino group and an unsubstituted heterocyclic sulfonylamino group. The heterocyclic sulfonylamino group preferably has from 1 to 12 carbon atoms. One example of the substituent of the substituted group is an ionic hydrophilic group. Examples of the heterocyclic sulfonylamino group are 2-thiophenesulfonylamino and 3-pyridinesulfonylamino groups.

The heterocyclic sulfonyl group means to include a substituted heterocyclic sulfonyl group and an unsubstituted heterocyclic sulfonyl group. The heterocyclic sulfonyl group preferably has from 1 to 20 carbon atoms. One example of the substituent of the substituted group is an ionic hydrophilic group. Examples of the heterocyclic sulfonyl group are 2-thiophenesulfonyl and 3-pyridinesulfonyl groups.

The heterocyclic sulfinyl group means to include a substituted heterocyclic sulfinyl group and an unsubstituted heterocyclic sulfinyl group. The heterocyclic sulfinyl group preferably has from 1 to 20 carbon atoms. One example of the substituent of the substituted group is an ionic hydrophilic group. One example of the heterocyclic sulfinyl group is a 4-pyridinesulfinyl group.

The alkylthio, arylthio and heterocyclic-thio group means to include a substituted alkylthio, arylthio and heterocyclic-thio group and an unsubstituted alkylthio, arylthio and heterocyclic-thio group. The alkylthio, arylthio and heterocyclic-thio group preferably has from 1 to 20 carbon atoms. One example of the substituent of the substituted group is an ionic hydrophilic group. Examples of the alkylthio, arylthio and heterocyclic-thio group are methylthio, phenylthio and 2-pyridylthio groups.

The alkylsulfonyl and arylsulfonyl group means to include a substituted alkylsulfonyl and arylsulfonyl group, and an unsubstituted alkylsulfonyl and arylsulfonyl group. Examples of the alkylsulfonyl and arylsulfonyl group are methylsulfonyl and phenylsulfonyl groups.

The alkylsulfinyl and arylsulfinyl group means to include a substituted alkylsulfinyl and arylsulfinyl group, and an unsubstituted alkylsulfinyl and arylsulfinyl group. Examples of the alkylsulfinyl and arylsulfinyl group are methylsulfinyl and phenylsulfinyl groups.

The sulfamoyl group means to include a substituted sulfamoyl group and an unsubstituted sulfamoyl group. One example of the substituent of the substituted sulfamoyl group is an alkyl group. Examples of the sulfamoyl group are dimethylsulfamoyl and di(2-hydroxyethyl)sulfamoyl groups.

Next described are the formulae (4), (4-A) and (4-B).

The above descriptions shall apply to the groups and the substituents that will be described hereinunder.

In formula (4), $A_{41}$, $A_{42}$ and $A_{43}$ each independently represent an optionally-substituted aromatic group ($A_{41}$ and $A_{43}$ are a monovalent aromatic group such as an aryl group; and $A_{42}$ is a divalent aromatic group such as an arylene group), or an optionally-substituted heterocyclic group ($A_{41}$ and $A_{43}$ are a monovalent heterocyclic group; and $A_{42}$ is a divalent heterocyclic group). Examples of the aromatic ring are benzene ring and naphthalene ring; and the hetero atoms to form the hetero ring are N, O and S. The hetero ring may be condensed with an aliphatic ring, an aromatic ring or any other hetero ring.

The substituent may be an arylazo group or a heterocyclic azo group. Accordingly, the dyes of formula (4) include trisazo dyes and tetrakisazo dyes.

Preferably, at least two of $A_{41}$, $A_{42}$ and $A_{43}$ are heterocyclic groups.

The heterocyclic group of $A_{43}$ is preferably an aromatic, nitrogen-containing 6-membered heterocyclic group. More preferably, $A_{43}$ is an aromatic, nitrogen-containing 6-membered heterocyclic group of the following formula (4-C). The preferred embodiment of formula (4) corresponds to formula (4-A)

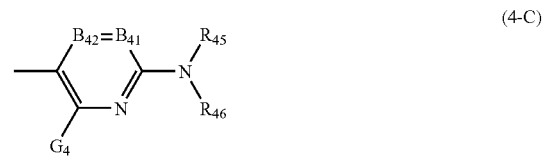

(4-C)

In formula (4-C), $B_{41}$ and $B_{42}$ represent $=CR_{41}-$ and $-CR_{42}=$, respectively, or any one of them represents a nitrogen atom and the other represents $=CR_{41}-$ or $-CR_{42}=$. Preferably, they represent $=CR_{34}-$ and $-CR_{42}=$.

$R_{45}$ and $R_{46}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. These groups may be substituted. Preferably, $R_{45}$ and $R_{46}$ each are a hydrogen atom, an aliphatic group, an aromatic group, a heterocyclic group, an acyl group, or an alkyl or arylsulfonyl group. More preferably, they are any of a hydrogen atom, an aromatic group, a heterocyclic group, an acyl group, or an alkyl or arylsulfonyl group; most preferably, any of a hydrogen atom, an aryl group or a heterocyclic group. The groups may be substituted.

$G_4$, $R_{41}$ and $R_{42}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including alkylamino, arylamino, heterocyclic amino), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group, and each group may be substituted.

The substituent for $G_4$ is preferably a hydrogen atom, a halogen atom, an aliphatic group, an aromatic group, a hydroxyl group, an alkoxy group, an aryloxy group, an acyloxy group, a heterocyclic-oxy group, an amino group (including alkylamino, arylamino, heterocyclic amino), an acylamino group, an ureido group, a sulfamoylamino group, an alkoxycarbonylamino group, an aryloxycarbonylamino group, an alkyl or arylthio group, or a heterocyclic-thio group; more preferably a hydrogen atom, a halogen atom, an alkyl group, a hydroxyl group, an alkoxy group, an aryloxy group, an acyloxy group, an amino group (including alkylamino, arylamino, heterocyclic amino), or an acylamino group; most preferably a hydrogen atom, an anilino group, or an acylamino group. These groups may be substituted.

The substituent for $R_{41}$ and $R_{42}$ each is preferably a hydrogen atom, an alkyl group, a halogen atom, an alkoxycarbonyl group, a carboxyl group, a carbamoyl group, a hydroxyl group, an alkoxy group, or a cyano group. These groups may be substituted.

$R_{41}$ and $R_{45}$, or $R_{34}$ and $R_{46}$ may bond to each other to form a 5- or 6-membered ring.

For the substituents for the substituted groups for $A_{41}$, $R_{41}$, $R_{42}$, $R_{45}$, $R_{46}$ and $G_4$, referred to are those mentioned hereinabove for the groups for $G_4$, $R_{41}$ and $R_{42}$. Preferably, the dyes have an ionic hydrophilic group at any position of $A_{41}$, $R_{41}$, $R_{42}$, $R_{45}$, $R_{46}$ and $G_4$ therein.

The substituent, ionic hydrophilic group includes, for example, a sulfo group, a carboxyl group, a phosphono group and a quaternary ammonium group. Preferably, it is a carboxyl group, a phosphono group or a sulfo group, more preferably a carboxyl group or a sulfo group. The carboxyl group, phosphono group and sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred is lithium ion.

When $A_{42}$ has a cyclic structure, preferred hetero rings are thiophene, thiazole, imidazole, benzimidazole and thienothiazole rings. These heterocyclic groups may be substituted. Above all, especially preferred are thiophene, thiazole, imidazole, benzimidazole and thienothiazole rings of the following (h) to (l). When $A_{42}$ is a thiophene ring (h) and when $A_{43}$ has the structure of formula (4-C), then formula (4) corresponds to formula (4-1). When $A_{42}$ is a thiophene ring (i) and when $A_{43}$ has the structure of formula (4-C), then formula (4) correspond to formula (4-B2).

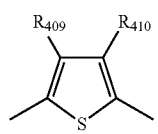
(h)

-continued

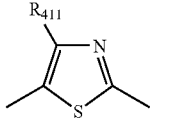
(i)

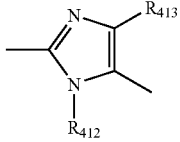
(j)

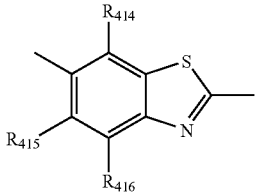
(k)

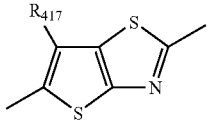
(l)

In formulae (h) to (l), $R_{409}$ to $R_{417}$ have the same meanings as those of the substituents of $G_4$, $R_{41}$ and $R_{42}$ in formula (4-A).

Of the dyes of formula (4-B), more preferred are those having a structure of the following formula (4-D1) or (4-D2). (Formula (4-D) indicates both formulae (4-D1) and (4-D2).):

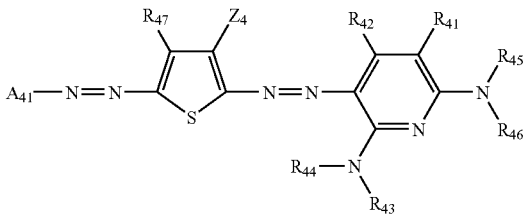
(4-D1)

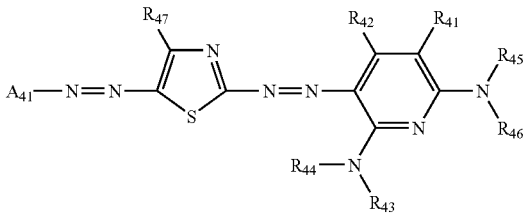
(4-D2)

In the formulae, $Z_4$ represents an electron-attractive group having a Hammett's substituent constant σp of at least 0.20. Preferably, $Z_4$ is an electron-attractive group having σp of at least 0.30, more preferably at least 0.45, even more preferably at least 0.60, but not exceeding 1.0. Concretely, the electron-attractive substituents to be mentioned hereinunder are preferred for the $Z_4$. Especially preferably, $Z_4$ is an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a haloalkyl group having from 1 to 20 carbon atoms. More preferably, it is a cyano group, an alkylsulfonyl group having from 1 to 20 carbon atoms, or an arylsulfonyl group having from 6 to 20 carbon atoms, and most preferably it is a cyano group. The Hammett's substituent constant σp as referred to herein is described in JP-a 2003-306623, paragraphs [0059] to [0060].

$R_{41}$, $R_{42}$, $R_{45}$, $R_{46}$ and $R_{47}$ in formula (4-D) have the same meanings as in formula (4-B). $R_{43}$ and $R_{44}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group; preferably a hydrogen atom, an aromatic group, a heterocyclic group, an acyl group, or an alkyl or arylsulfonyl group; more preferably a hydrogen atom, an aromatic group or a heterocyclic group.

The groups in formula (4-D) may be substituted. For the substituents, referred to are those mentioned hereinabove for the groups $G_4$, $R_{45}$ and $R_{46}$ in formula (4-A), and ionic hydrophilic groups.

$A_{41}$ may be any of an aromatic group or a heterocyclic group, but is preferably a benzene ring, a naphthalene ring, a pyridine ring, an imidazole ring, a pyrazole ring, a thiazole ring, an isothiazole ring, a thiadiazole ring, a benzothiazole ring or a benzisothiazole ring, more preferably a benzene ring, a naphthalene ring, a pyridine ring, a pyrazole ring, an imidazole ring, an isothiazole ring or a benzothiazole ring, most preferably a benzene ring or a naphthalene ring.

It is desirable that the azo dyes for the black dyes for use in the invention have a substituent of an aromatic group or an aromatic heterocyclic group and are so designed that the total of the conjugated π electrons of the aromatic ring not directly bonding to the azo group is more than 12, in order that they are stable in aqueous solutions or inks. The aromatic ring directly bonding to an azo group is meant to indicate the entire aromatic ring that directly bonds to an azo group, whereas the aromatic ring not directly bonding to an azo group is meant to indicate the aromatic ring that does not directly bond to the azo group of an azo dye but exists as the substituent of the chromophoric group in the dye. For example, when a naphthalene ring directly bonds to an azo group, then not only one benzene ring moiety bonding to the azo group of the naphthalene but also the entire naphthalene ring is the aromatic ring directly bonding to the azo group. When a bisphenyl group bonds to an azo group, then the phenyl group bonding to the azo group is the aromatic ring directly bonding to the azo group but the other phenyl group is the aromatic ring not directly bonding to the azo group. The aromatic ring includes not only an aryl group but also a heterocyclic aromatic ring. Preferably, the azo dyes for use in the invention are so designed that the number of the conjugated π electrons of the aromatic ring not directly bonding to the azo group is more than 12. The number of conjugated π electrons is counted as follows: In an azo dye having one benzene ring and one naphthalene ring not directly bonding to the azo dye, the number of conjugated π electrons therein is 6+10=16. The conjugated π electrons of an aromatic ring are conjugated π electrons that are in an aromatic ring (this includes hetero rings and is not limited to 6-membered rings). Having the aromatic ring as the substituent thereof, the dyes are well dissociable and their storage stability is therefore increased. The substituting position of the aromatic ring is preferably $R_{41}$, $R_{42}$, $R_{43}$, $R_{44}$, $R_{45}$, $R_{46}$, $R_{47}$, more preferably $R_{43}$, $R_{44}$, $R_{45}$, $R_{46}$, $R_{47}$.

Preferred embodiments of the substituents of the black azo dyes for use in the invention are described. $R_{45}$ and $R_{46}$ are preferably a hydrogen atom, an alkyl group, an aryl group, a heterocyclic group, a sulfonyl group or an acyl group, more preferably a hydrogen atom, an aryl group, a heterocyclic group or a sulfonyl group, most preferably a hydrogen atom, an aryl group or a heterocyclic group. However, $R_{45}$ and $R_{46}$ must not be hydrogen atoms at the same time.

$G_4$ is preferably a hydrogen atom, a halogen atom, an alkyl group, a hydroxyl group, an amino group, or an acylamino group, more preferably a hydrogen atom, a halogen atom, an amino group, or an acylamino group, most preferably a hydrogen atom, an amino group, or an acylamino group.

$A_{41}$ is preferably a benzene ring, a naphthalene ring, a pyridine ring, an imidazole ring, or a pyrazole ring, most preferably a benzene ring, or a naphthalene ring.

$B_{41}$ and $B_{42}$ are preferably $=CR_{41}-$ and $-CR_{42}=$, respectively; and $R_{41}$ and $R_{42}$ are preferably a hydrogen atom, an alkyl group, a halogen atom, a cyano group, a carbamoyl group, a carboxyl group, a hydroxyl group, an alkoxy group, or an alkoxycarbonyl group, more preferably a hydrogen atom, an alkyl group, a carboxyl group, a cyano group, or a carbamoyl group.

Regarding the preferred combinations of the substituents of the compounds of formula (4), it is desirable that at least one of the substituents is the above-mentioned preferred group. More preferably, a larger number of the substituents are the preferred groups. Most preferably, all the substituents are the preferred groups.

For better color hue, fastness and storage stability thereof, it is desirable that the dyes for use in the invention satisfy the following physical properties:

Physical Property 1:
680 nm≧λmax(DMF)≧570 nm, in which λmax(DMF) means the maximum absorption wavelength of the absorption spectrum of the dye in DMF.

Physical Property 2:
The oxidation potential is higher than 1.0 V (vs SCE).

Physical Property 3:
|λmax(DMF)−λmax (water)|≧30 nm, in which λmax (water) means the maximum absorption wavelength of the absorption spectrum of the dye in water.

Physical Property 4:
ε(water)/ε(DMF)≦0.9, in which ε(DMF) means the molar extinction coefficient of the dye in DMF, and ε(water) means the molar extinction coefficient of the dye in water.

Physical Property 5:
Abs (monomer)/Abs (associate)≦0.75, in which Abs (associate) means the absorbance at the maximum absorption wavelength of the associate in the absorption spectrum measured in water, and Abs(monomer) means the absorbance at the maximum absorption wavelength of the monomer in the absorption spectrum measured in DMF.

When the dyes satisfy the above-mentioned physical properties, then they are black dyes having good black hue, good lightfastness, good ozone resistance and good storage stability in ink.

For the definition of the above-mentioned physical properties, referred to is the related description in Japanese Patent Application No. 2003-353498.

Specific examples of the azo dyes of formula (4) are mentioned below. However, the azo dyes for use in the invention should not be limited to these. The carboxyl group, the phosphono group and the sulfo group in these examples may form salts. Examples of the counter ion of the salts are ammonium ions, alkali metal ions (e.g., lithium ion, sodium ion, potassium ion), and organic cations (e.g., tetramethylammonium ion, tetramethylguanidium ion, tetramethylphosphonium ion). Of those, preferred are ammonium ions and organic cations and lithium ion; and most preferred is lithium ion.

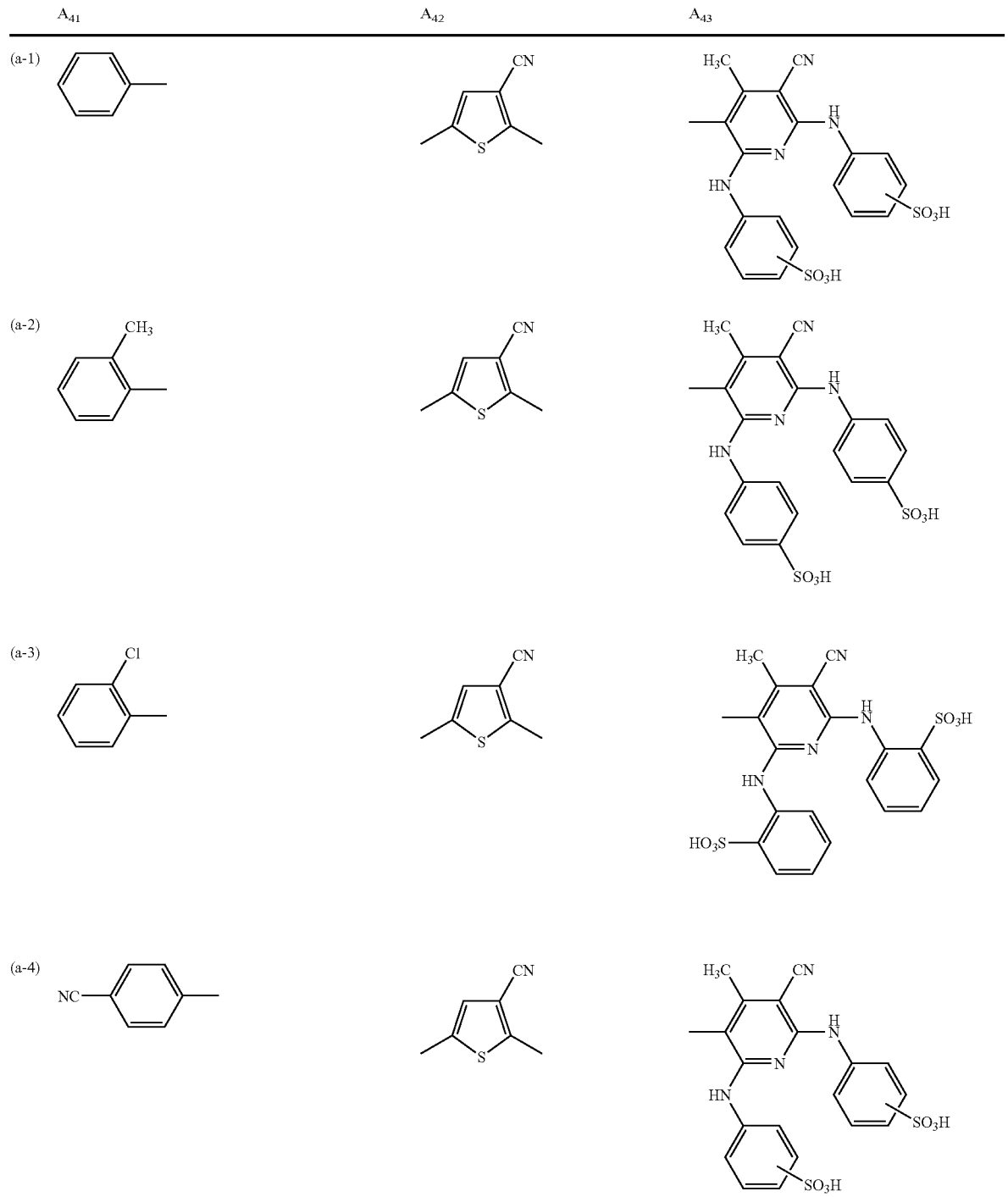

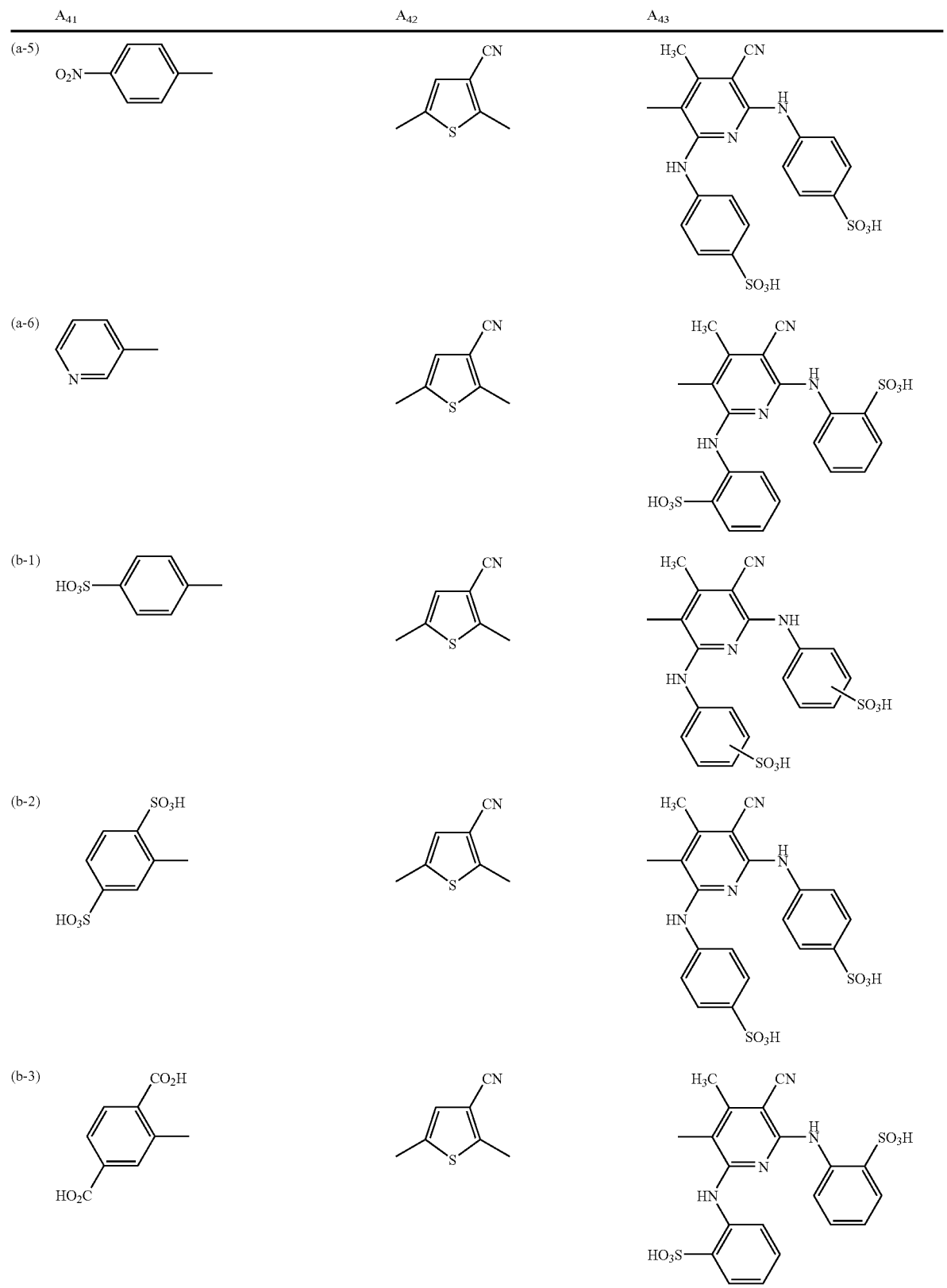

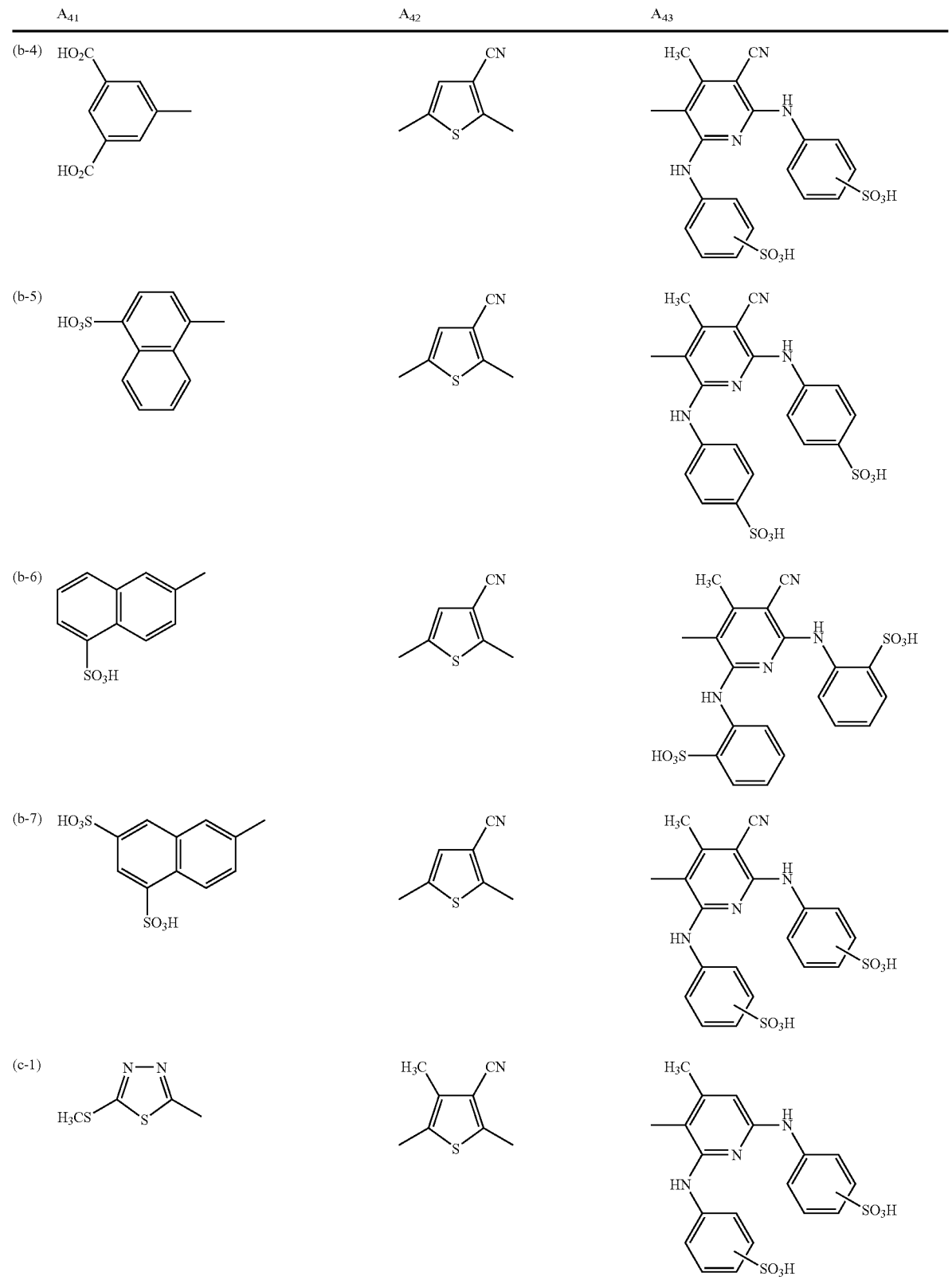

-continued
$A_{41}-N=N-A_{42}-N=N-A_{43}$
| $A_{41}$ | $A_{42}$ | $A_{43}$ |
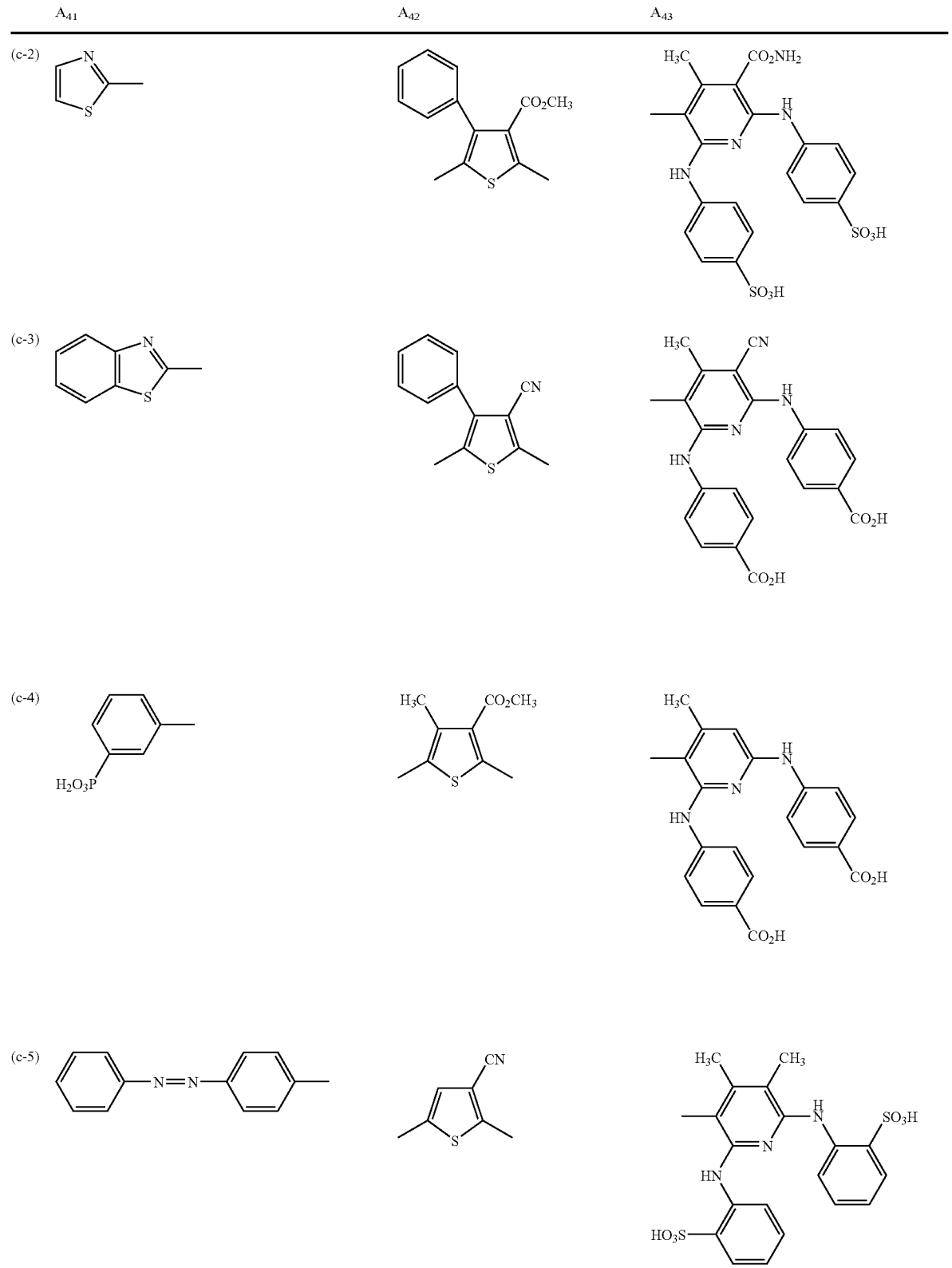

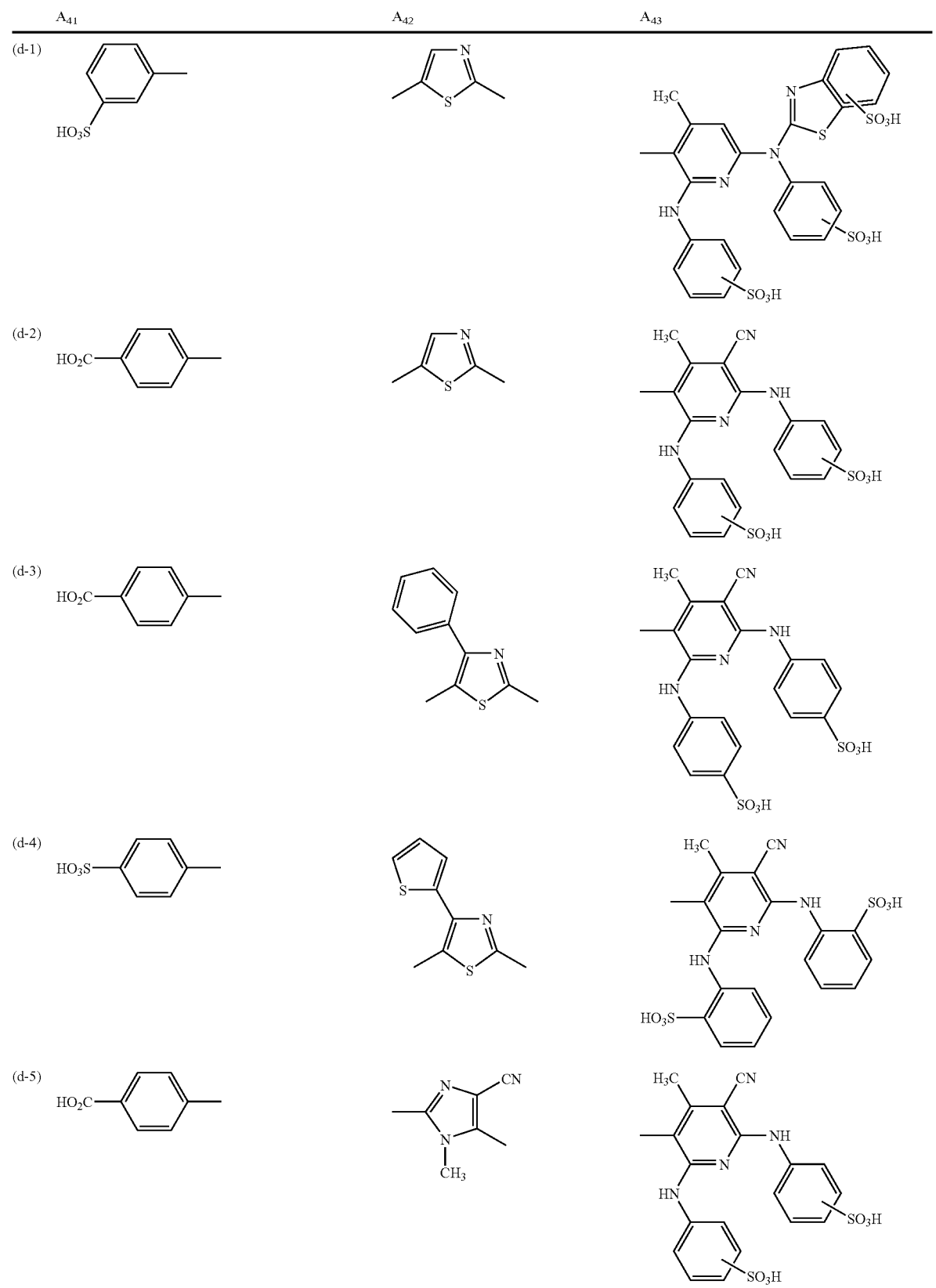

-continued
| | $A_{41}$—N=N—$A_{42}$—N=N—$A_{43}$ | | |
|---|---|---|---|
| | $A_{41}$ | $A_{42}$ | $A_{43}$ |
| (d-6) | 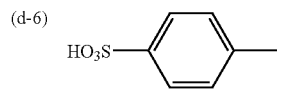 | 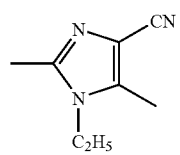 | 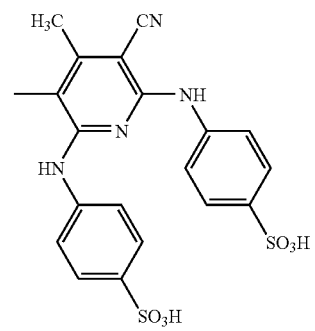 |
| (e-1) | 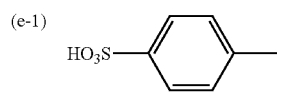 | 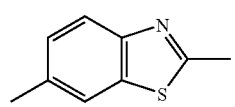 | 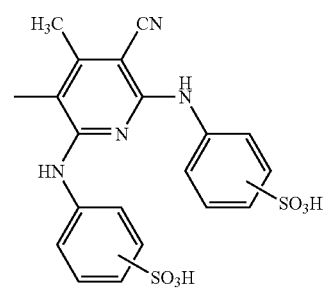 |
| (e-2) | 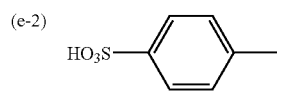 | 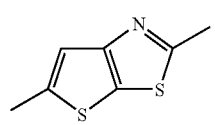 | 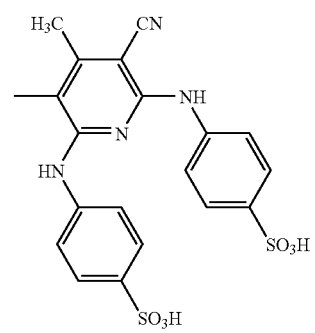 |
| (f-1) | 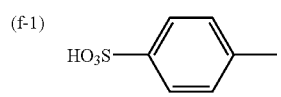 | 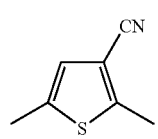 | 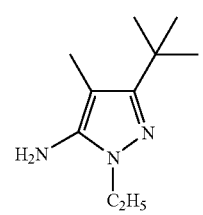 |
| (f-2) | 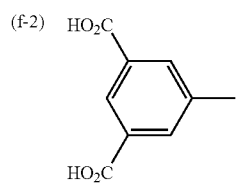 | 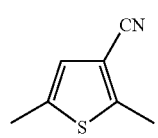 | 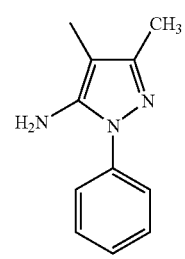 |

-continued
$A_{41}-N=N-A_{42}-N=N-A_{43}$
| $A_{41}$ | $A_{42}$ | $A_{43}$ |
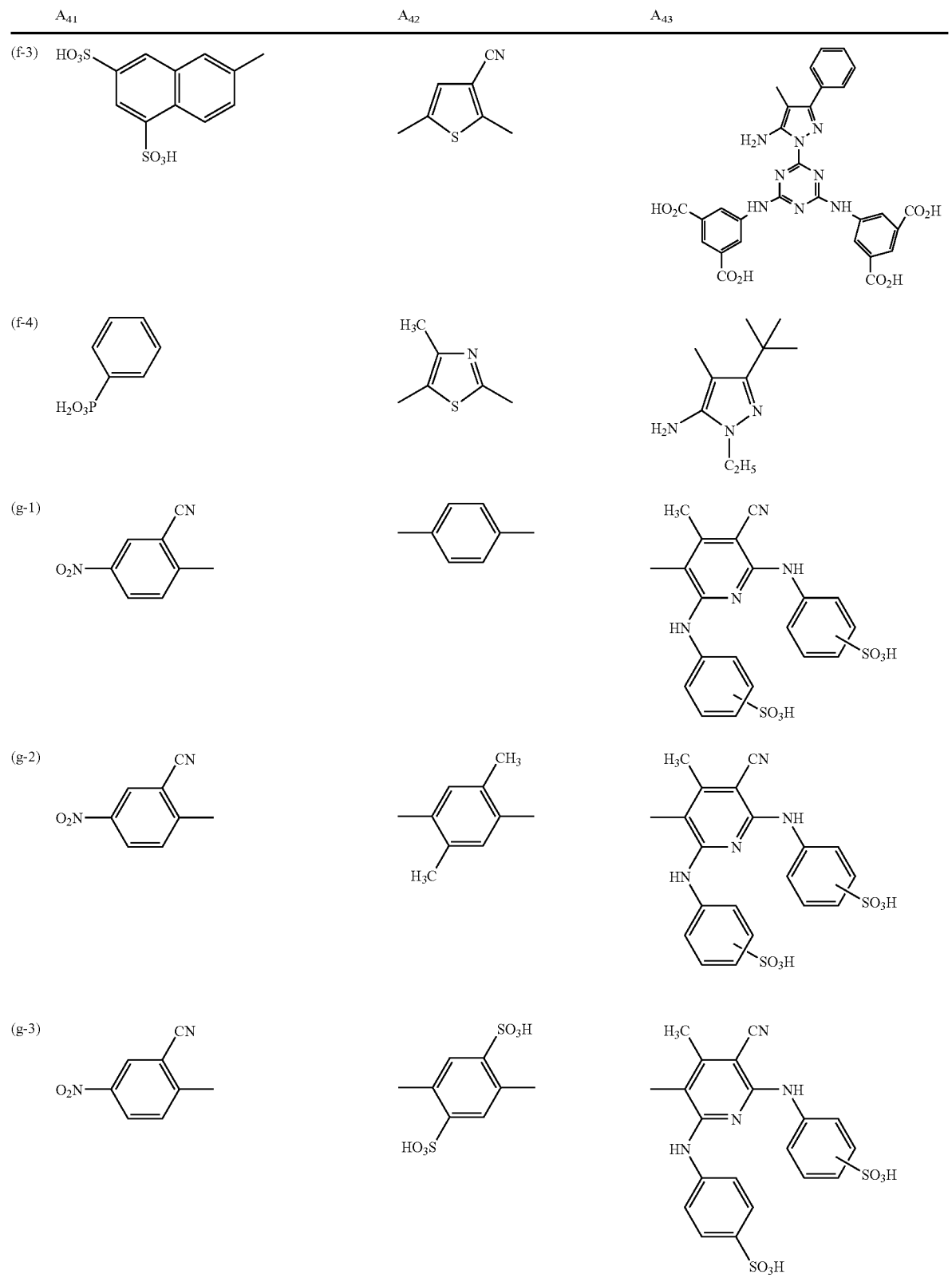

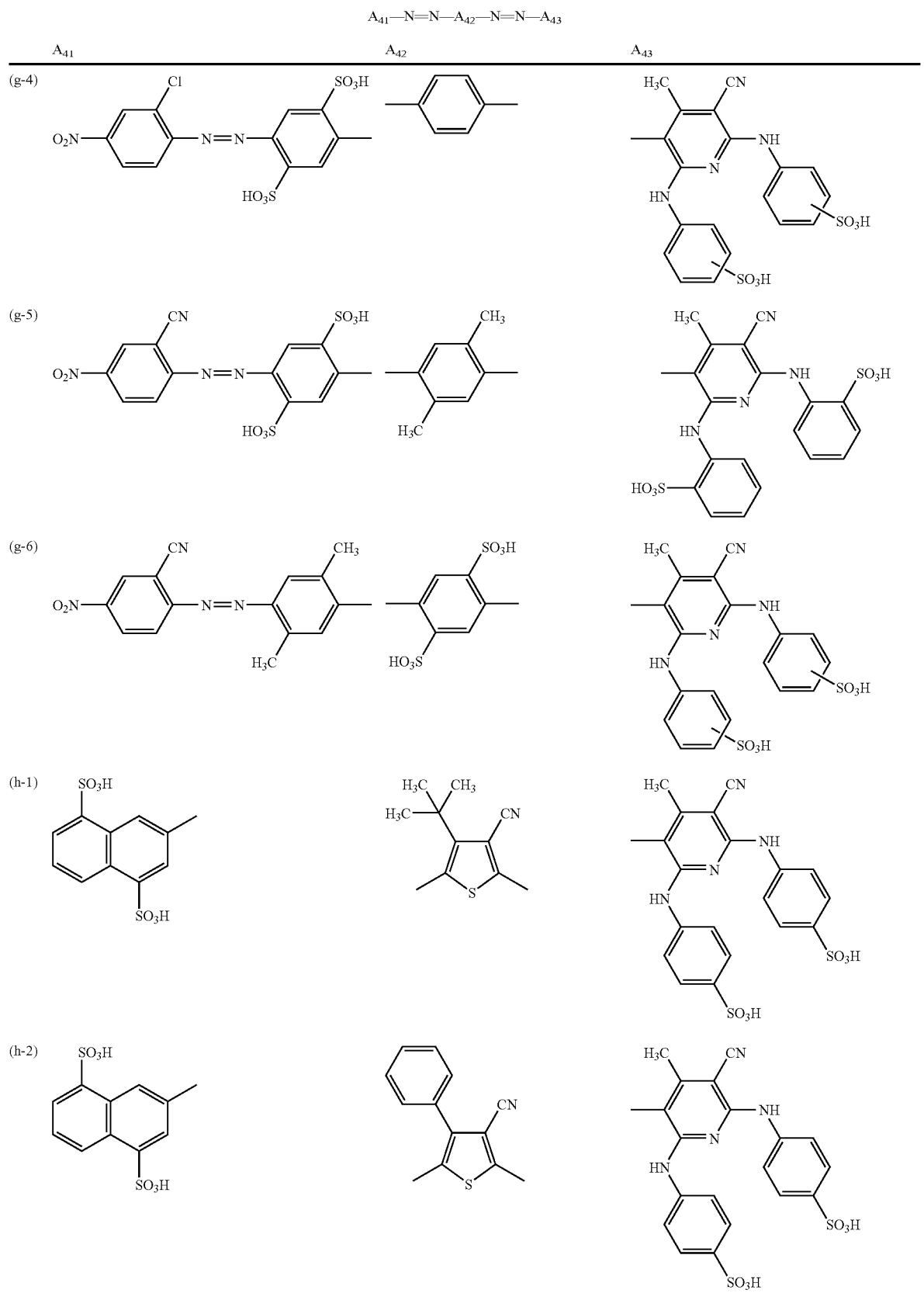

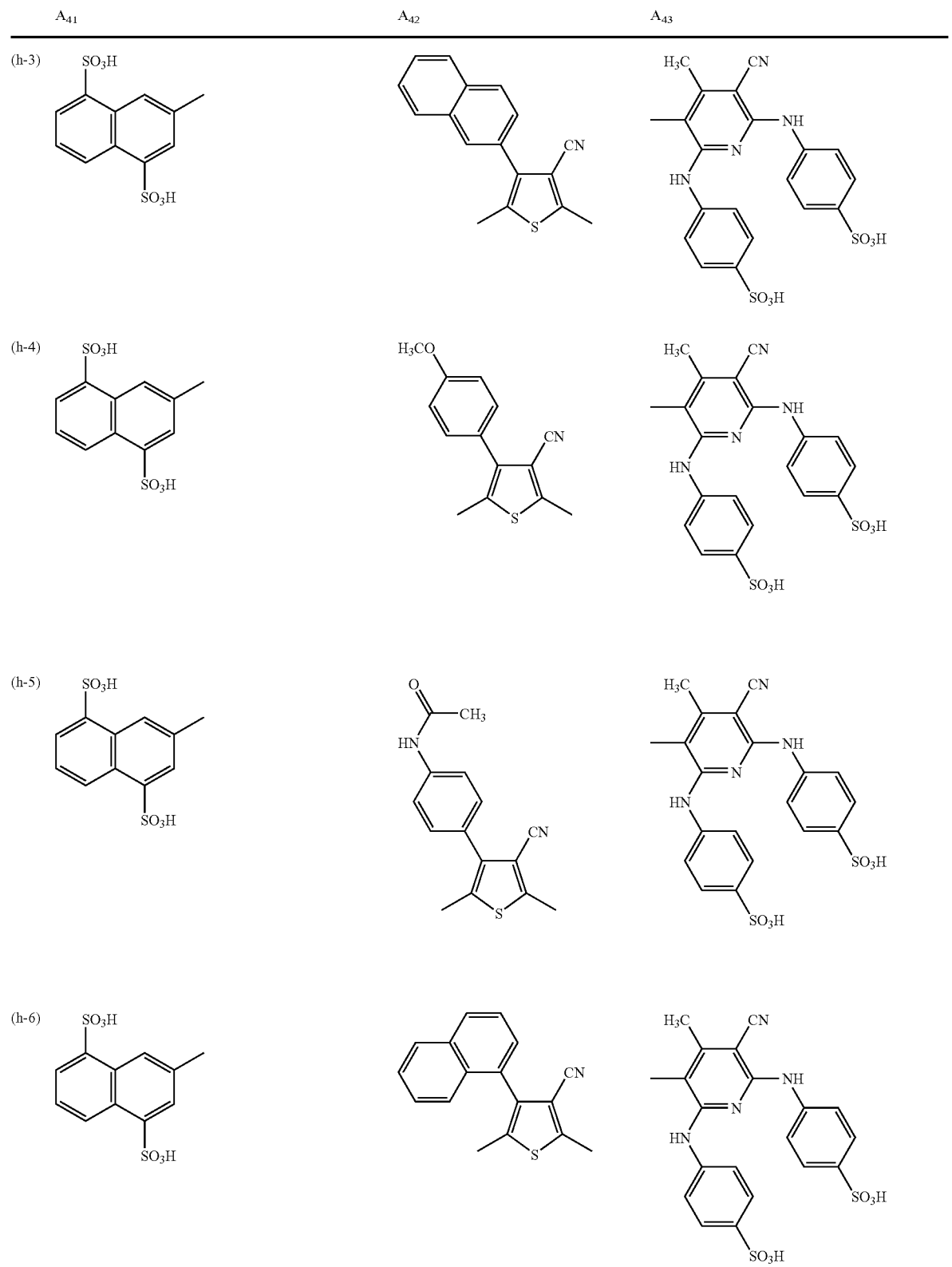

-continued
$$A_{41}-N=N-A_{42}-N=N-A_{43}$$
| A41 | A42 | A43 |
|---|---|---|
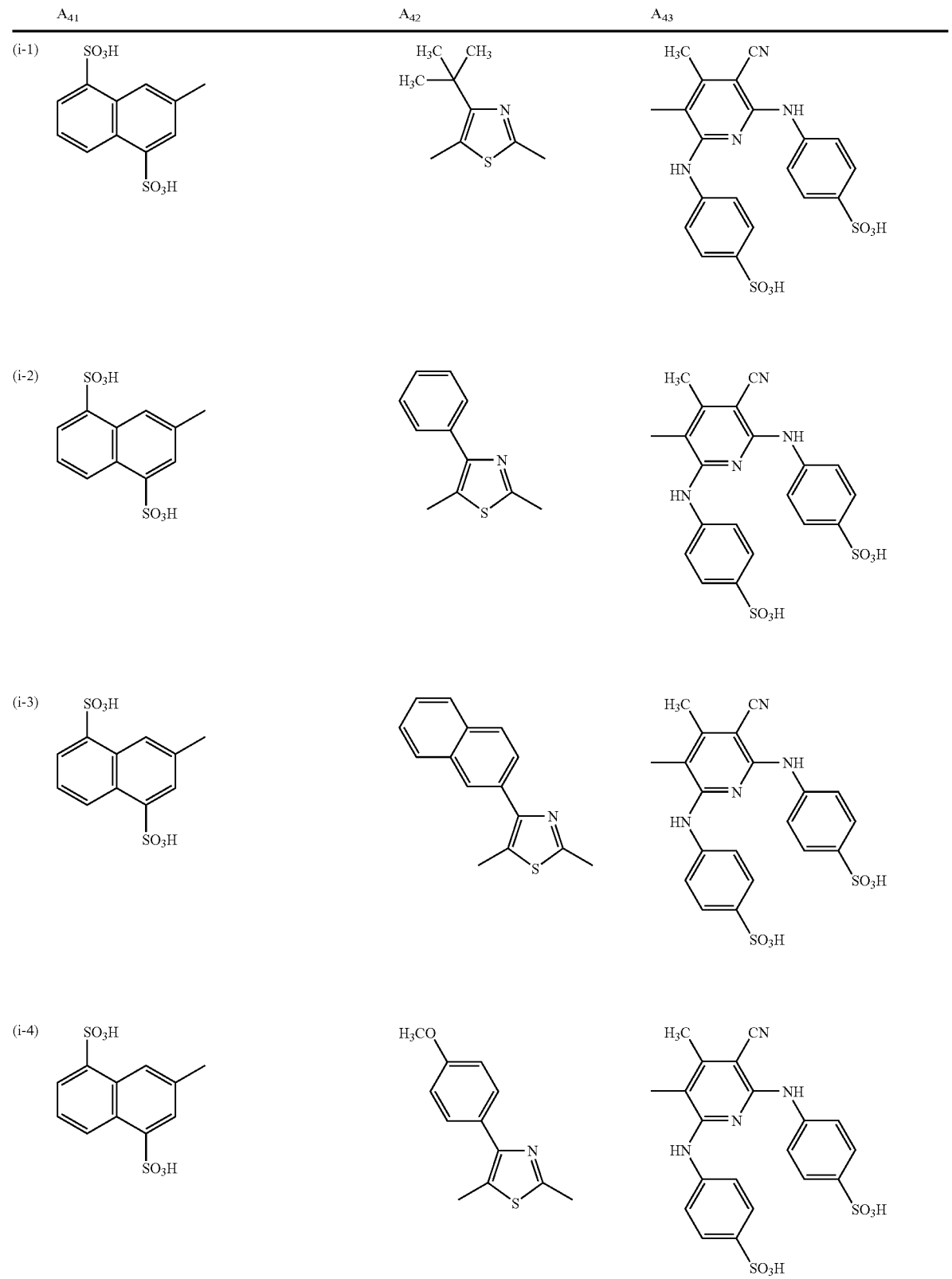

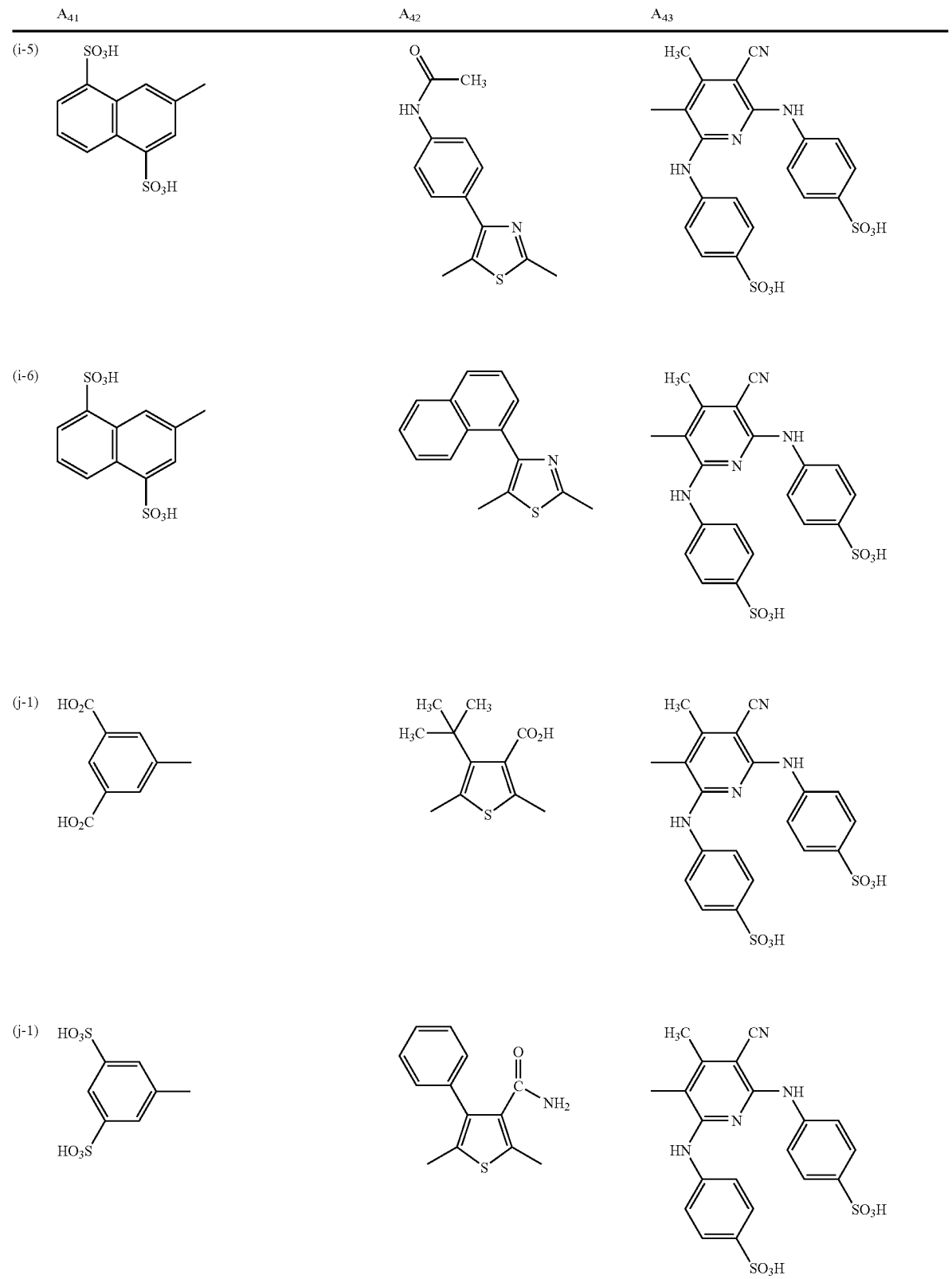

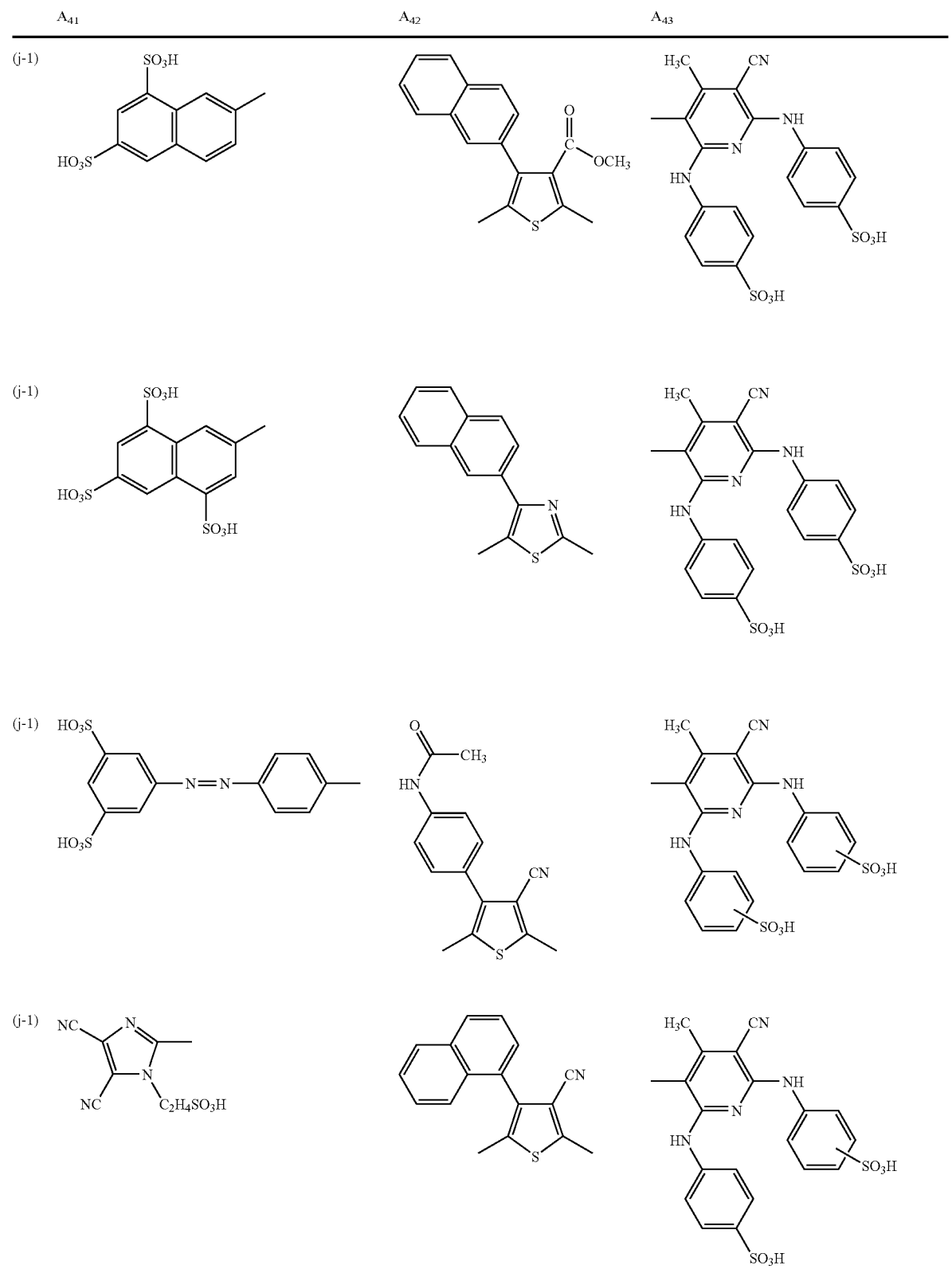

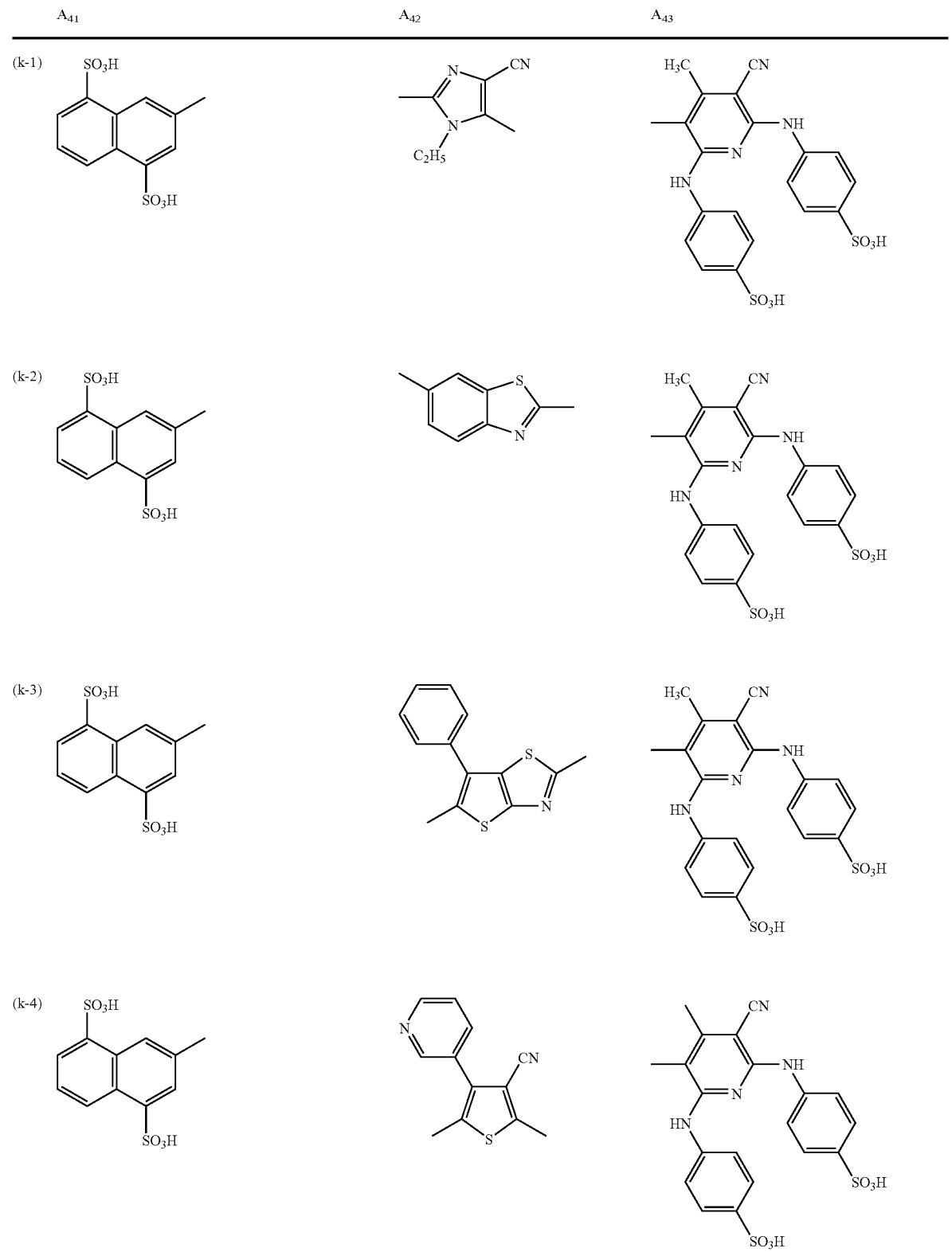

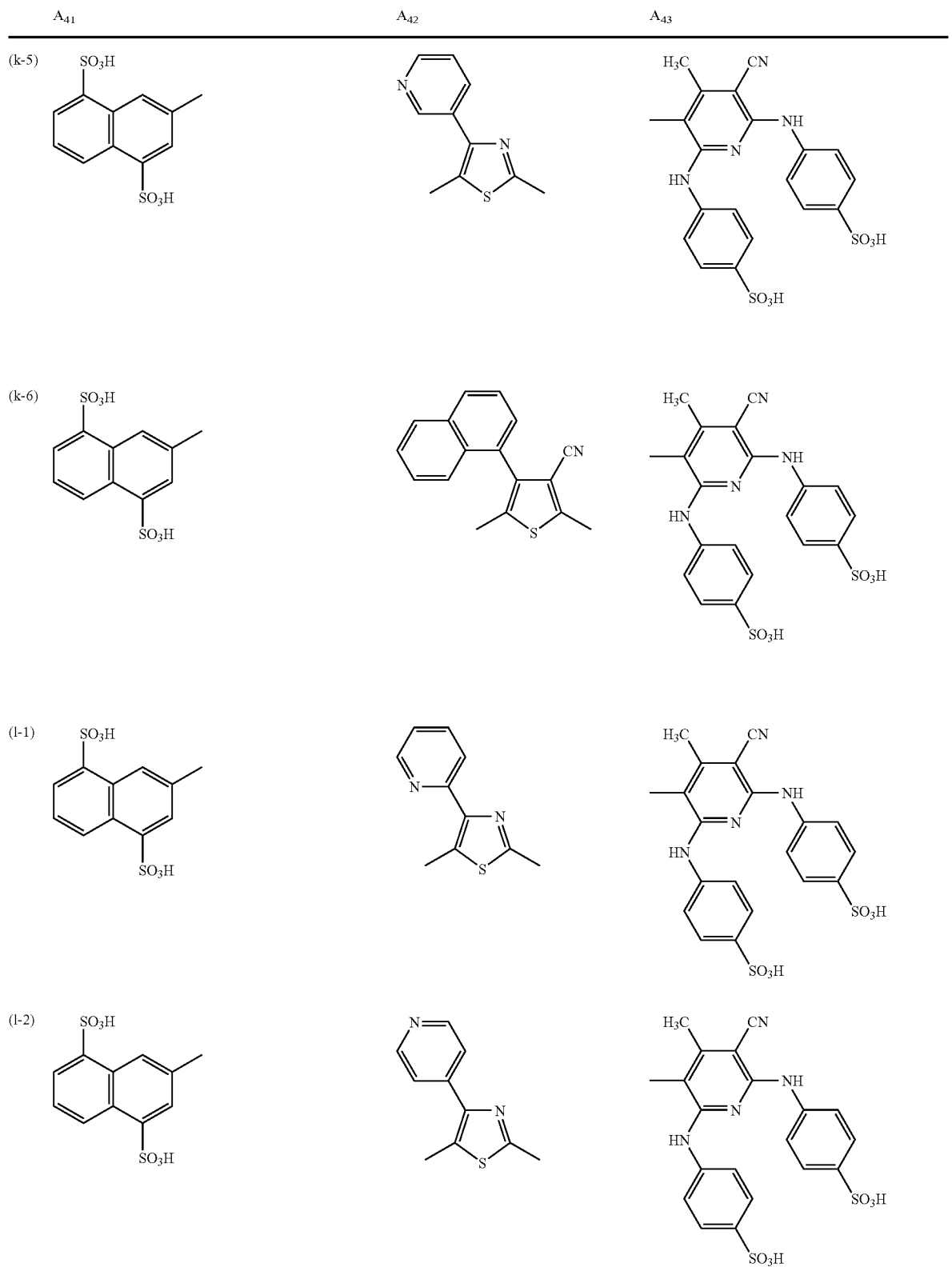

-continued

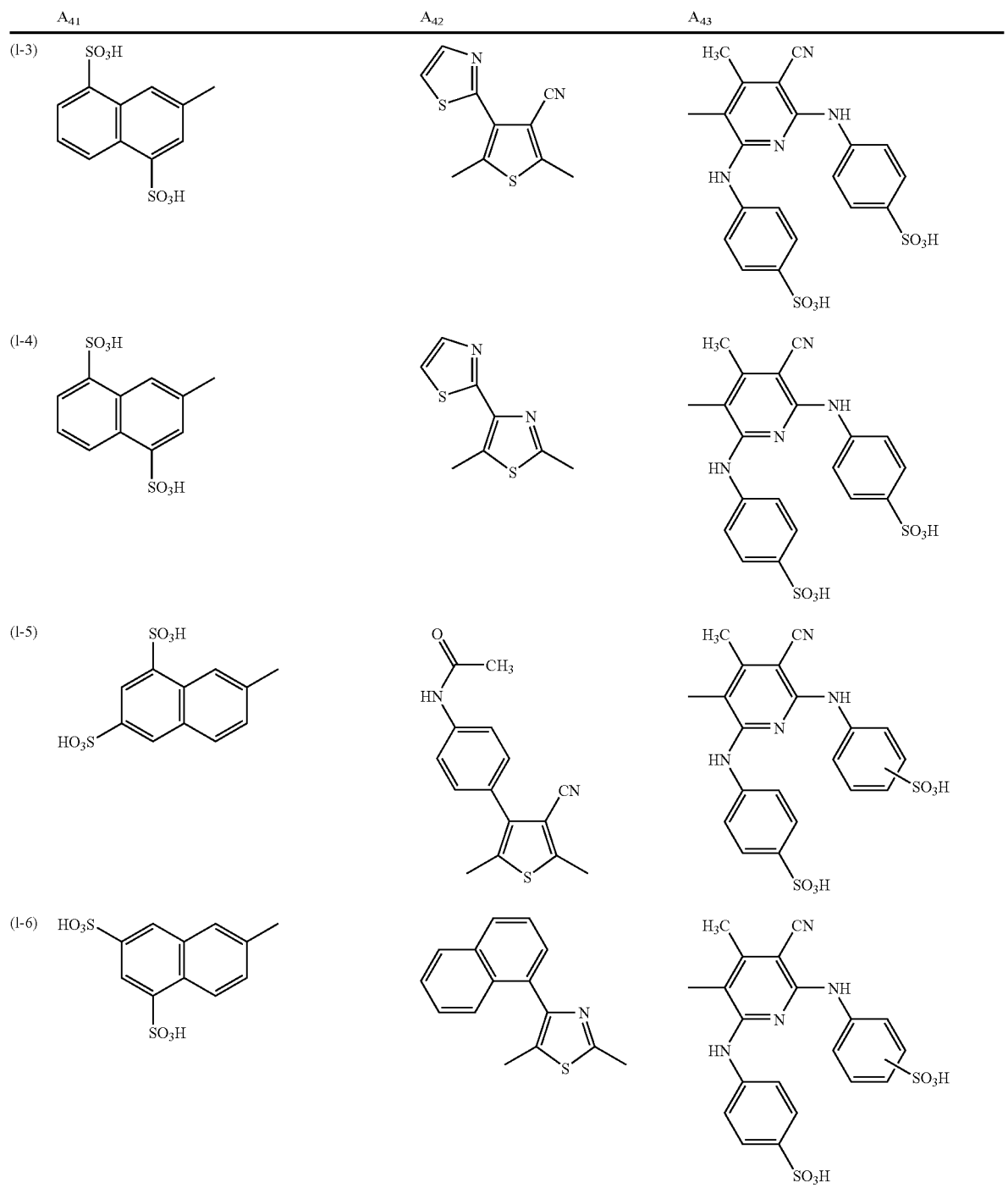

The azo dyes of formulae (4) may be produced through coupling reaction of a diazo component with a coupling component. Those are described in JP-A-2003-306623 and 2003-353498.

As a dye having λmax of 350 nm to 500 nm, after-mentioned yellow dyes and yellow pigments are preferbly used.

The content of the azo dye of formula (4) in the ink is preferably from 0.2 to 20% by weight, more preferably from 0.5 to 15% by weight.

[Adjustment of Ink and the Like]

In the ink of the invention, the above-mentioned dye may be combined with any other dye for obtaining full-color images or for controlling the color tone of the ink. Examples of the additional dyes are mentioned below.

Yellow dyes are, for example, aryl or heterylazo dyes having, as the coupling component thereof, phenols, naphthols, anilines, pyrazolones, pyridones or open-chain active methylene compounds; azomethine dyes having, as the coupling component thereof, open-chain active methylene compounds; methine dyes such as benzylidene dyes, monomethine-oxonole dyes; quinone dyes such as naphthoquinone dyes, anthraquinone dyes. Other dye species than these are quinophthalone dyes, nitro-nitroso dyes, acridine dyes, and acridinone dyes. These dyes may present yellow only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Magenta dyes are, for example, aryl or heterylazo dyes having, as the coupling component thereof, phenols, naphthols or anilines; azomethine dyes having, as the coupling component thereof, pyrazolones or pyrazolotriazoles; methine dyes such as arylidene dyes, styryl dyes, merocyanine dyes, oxonole dyes; carbonium dyes such as diphenylmethane dyes, triphenylmethane dyes, xanthene dyes; quinone dyes such as naphthoquinone dyes, anthraquinone dyes, anthrapyridone dyes; and condensed polycyclic dyes such as dioxazine dyes. These dyes may present magenta only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Cyan dyes are, for example, azomethine dyes such as indaniline dyes, indophenol dyes; polymethine dyes such as cyanine dyes, oxonole dyes, merocyanine dyes; carbonium dyes such as diphenylmethane dyes, triphenylmethane dyes, xanthene dyes; phthalocyanine dyes; anthraquinone dyes; aryl or heterylazo dyes having, as the coupling component thereof, phenols, naphthols or anilines; and indigo and thioindigo dyes. These dyes may present cyan only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Black dyes such as polyazo dyes are also usable herein.

In addition, water-soluble dyes such as direct dyes, acid dyes, edible dyes, basic dyes and reactive dyes may be also used as additional dyes. Above all, especially preferred are the following:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52:1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71;

C.I. Basic Black 8.

Pigments may also be used herein.

The pigments usable in the ink of the invention are commercially-available ones and any other known ones described in various references. The references are, for example, *Color Index* (by the Society of Dyers and Colorists); *Revised New Version, Pigment Handbook* (by Nippon Pigment Technology Association, 1989); *Latest Pigment Application Technology* (by CMC Publishing, 1986); *Printing Ink Technology* (by CMC Publishing, 1984); W. Herbst & K. Hunger, *Industrial Organic Pigments* (by VCH Verlagsgesellshaft, 1993). Concretely, organic pigments are azo pigments (azo-lake pigments, insoluble azo pigments, condensed azo pigments, chelate-azo pigments), polycyclic pigments (phthalocyanine pigments, anthraquinone pigments, perylene and perinone pigments, indigo pigments, quinacridone pigments, dioxazine pigments, isoindolinone pigments, quinophthalone pigments, diketopyrrolopyrrole pigments), dyeing lake pigments (lake pigments of acid or basic dyes), and azine pigments; and inorganic pigments are yellow pigments such as C.I. Pigment Yellow 34, 37, 42, 53; red pigments such as C.I. Pigment Red 101, 108; blue pigments such as C.I. Pigment Blue 27, 29, 17:1; Black pigments such as C.I. Pigment Black 7, magnetite; and white pigments such as C.I. Pigment White 4, 6, 18, 21.

Pigments preferred for color image formation are blue or cyan pigments such as phthalocyanine pigments, anthraquinone-based indanthrone pigments (e.g., C.I. Pigment Blue 60), and dyeing lake pigments such as triarylcarbonium pigments. Especially preferred are phthalocyanine pigments, and their preferred examples are copper phthalocyanines such as C.I. Pigment Blue 15:1, 15:2, 15:3, 15:4, 15:6; monochloro or low-chloro-copper phthalocyanines, aluminium phthalocyanines such as those in EP 860475; non-metal phthalocyanine, C.I. Pigment Blue 16;

and phthalocyanines with a center metal atom of Zn, Ni or Ti. Most preferred are C.I. Pigment Blue 15:3, 15:4, and aluminium phthalocyanines.

Red to violet pigments are azo dyes (preferably C.I. Pigment Red 3, 5, 11, 22, 38, 48:1, 48:2, 48:3, 48:4, 49:1, 52:1, 53:1, 57:1, 63:2, 144, 146, 184; more preferably C.I. Pigment Red 57:1, 146, 184); quinacridone pigments (preferably C.I. Pigment Red 122, 192, 202, 207, 209, C.I. Pigment Violet 19, 42; more preferably C.I. Pigment Red 122); dyeing lake pigments such as triarylcarbonium pigments (preferably xanthene-type C.I. Pigment Red 81:1, C.I. Pigment Violet 1, 2, 3, 27, 39); dioxazine pigments (e.g., C.I. Pigment Violet 23, 37); diketopyrrolopyrrole pigments (e.g., C.I. Pigment Red 254); perylene pigments (e.g., C.I. Pigment Violet 29); anthraquinone pigments (e.g., C.I. Pigment Violet 5:1, 31, 33); thioindigo pigments (e.g., C.I. Pigment Red 38, 88).

Yellow pigments are azo pigments (preferably monoazo pigments such asC.I. Pigment Yellow 1, 3, 74, 98; disazo pigments such as C.I. Pigment Yellow 12, 13, 14, 16, 17, 83; general azo pigments such as C.I. Pigment Yellow 93, 94, 95, 128, 155; benzimidazolone pigments such as C.I. Pigment Yellow 120, 151, 154, 156, 180; more preferably those not using benzidine compounds for their starting material); isoindoline or isoindolinone pigments (preferably C.I. Pigment Yellow 109, 110, 137, 139); quinophthalone pigments (preferably C.I. Pigment Yellow 138); flavanthrone pigments (e.g., C.I. Pigment Yellow 24).

Black pigments are inorganic pigments (preferably carbon black, magnetite) and aniline black.

In addition to the above, orange pigments (e.g., C.I. Pigment Orange 13, 16) and green pigments (e.g., C.I. Pigment Green 7) are also usable herein.

The pigments usable in the ink of the invention may be the above-mentioned nude pigments or may be surface-treated ones. For their surface treatment, the pigments may be coated with resin or wax, or surfactant may be applied to the pigments, or a reactive substance (e.g., radical from silane coupling agent, epoxy compound, polyisocyanate, diazonium salt) may be bound to the pigment surface. These are described, for example, in the following references and patents.

<1> *Properties and Applications of Metal Soap* (by Miyuki Publishing),

<2> *Printing Ink* (by CMC Publishing, 1984),

<3> *Latest Pigment Application Technology* (by CMC Publishing, 1986),

<4> U.S. Pat. Nos. 5,554,739, 5,571,311,

<5> JP-A 9-151342, 10-140065, 10-292143, 11-166145.

In particular, self-dispersible pigments prepared by reacting a diazonium salt with carbon black as in the US patents of above <4>, and capsulated pigments prepared according to the methods in the Japanese patents of above <5> are effective, since they are stably dispersed in ink not requiring any superfluous dispersant.

In the ink of the invention, the pigments may be dispersed by the use of a dispersant. Depending on the pigments to be used, various known dispersants may be used. For example, surfactant-type low-molecular dispersants or polymer-type dispersants may be used. Examples of the dispersants usable herein are described in, for example, JP-A3-69949, and EP549486. When the dispersant is used, a pigment derivative that is referred to as a synergist may be added thereto for promoting the dispersant adsorption by pigment.

The particle size of the pigment usable in the ink of the invention is preferably from 0.01 to 10 μm, more preferably from 0.05 to 1 μm, in terms of the size of the dispersed particles.

For pigment dispersion, employable is any known technology generally used in ink production or toner production. The dispersing machine may be any of horizontal or vertical agitatormills, attritors, colloidmills, ballmills, three-roll mills, pearlmills, supermills, impellers, dispersers, KDmills, dynatrons, pressure kneaders. They are described in detail in *Latest Pigment Application Technology* (by CMC Publishing, 1986).

Surfactant that may be in the inkjet ink of the invention is described below.

The inkjet ink of the invention may contain a surfactant, which is effective for controlling the liquid properties of the ink, for improving the jet-out stability of the ink, for improving the waterproofness of the images formed of the ink, and for preventing ink bleeding on prints.

The surfactant includes anionic surfactants such as sodium dodecylsulfate, sodium dodecyloxysulfonate, sodium alkylbenzenesulfonate; cationic surfactants such as cetylpyridinium chloride, trimethylammonium chloride, tetrabutylammonium chloride; and nonionic surfactants such as polyoxyethylene nonylphenyl ether, polyoxyethylene naphthyl ether, polyoxyethylene octylphenyl ether. Especially preferred are nonionic surfactants.

The surfactant content of the ink may be from 0.001 to 20% by mass, preferably from 0.005 to 10% by mass, more preferably from 0.01 to 5% by mass.

The inkjet ink of the invention may be produced by dissolving or dispersing the above-mentioned dye and preferably surfactant in an aqueous medium. The "aqueous medium" in the invention means to include water, and a mixture of water and a small amount of a water-miscible organic solvent, and it may optionally contain an additive such as moisturizer, stabilizer, preservative added thereto.

In case where the ink of the invention is a water-soluble ink, it is preferably prepared by first dissolving the dye component in water. Next, various solvent and additive are added to it, dissolved and mixed to give a uniform ink composition.

For dissolving the components, for example, various methods of stirring, ultrasonic irradiation or shaking may be employed. Especially preferred is a method of stirring the components. When the components are stirred, various methods known in the art are employable. For example, they may be stirred in a mode of fluidization, reversed agitation, shear force stirring with dissolver, etc. Also preferably employed herein is a magnetic stirring method in which a magnetic stirrer is used for utilizing the shear force to the container bottom.

Examples of the water-miscible organic solvent usable in the invention are alcohols (e.g., methanol, ethanol, propanol, isopropanol, butanol, isobutanol, sec-butanol, t-butanol, pentanol, hexanol, cyclohexanol, benzyl alcohol), polyalcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycolderivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylenimine, tetramethylpropylenediamine), and other polar solvents (e.g., formamide, N,N-dimethylformamide, N,N-dimethylacetamide, dimethylsulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of these water-miscible organic solvents may be used as combined.

In case where the above-mentioned dyes are oil-soluble dyes, then they may be dissolved in a high-boiling-point organic solvent, and then emulsified and dispersed in an aqueous medium to prepare the ink of the invention.

The boiling point of the high-boiling-point organic solvent for use in the invention is 150° C. or higher, but preferably 170° C. or higher.

For example, the solvent includes phthalate (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), phosphoric acid or phosphoneesters (e.g., diphenylphosphate, triphenylphosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoates (e.g., 2-ethylhexylbenzoate, 2,4-dichlorobenzoate, dodecylbenzoate, 2-ethylhexyl p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chloroparaffins (e.g., paraffins having a chlorine content of from 10% to 80%), trimesates (e.g., tributyl trimesate), dodecylbenzene, diisopropylnaphthalane, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxybutyric acid, 2-ethoxyoctane-decanoic acid), alkyl phosphates (e.g., di-2 (ethylhexyl) phosphate, diphenyl phosphate). The amount of the high-boiling-point organic solvent to be used may be from 0.01 to 3 times, preferably from 0.01 to 1.0 time the oil-soluble dye in terms of the ratio by mass of the two.

The high-boiling-point organic solvents may be used either singly or as combined (for example, tricresyl phosphate and dibutyl phthalate; trioctyl phosphate and di (2-ethylhexyl) sebacate; dibutyl phthalate and poly(N-t-butylacrylamide)).

Other examples than those mentioned hereinabove for the high-boiling-point organic solvent usable in the invention and/or methods for producing these high-boiling-point organic solvents are described, for example, in U.S. Pat. Nos. 2,322,027, 2,533,514, 2,772,163, 2,835,579, 3,594, 171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,837, 4,430,421, 4,430,422, 4,464,464, 4,483,918, 4,540,657, 4,684,606, 4,728,599, 4,745,049, 4,935,321, 5,013,639; EP276,319A, 286,253A, 289,820A, 309,158A, 309,159A, 309,160A, 509,311A, 510, 576A; East German Patents 147,009, 157,147, 159,573, 225,240A; British Patent 2,091,124A; JP-A 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-6454, 64-68745, 1-101543, 1-102454, 2-792, 2-4239, 2-43541, 4-29237, 4-30165, 4-232946, 4-346338.

The amount of the high-boiling-point organic solvent to be used may be from 0.01 to 3 times, preferably from 0.01 to 1.0 time the oil-soluble dye in terms of the ratio by mass of the two.

In the invention, the oil-soluble dye and the high-boiling-point organic solvent are emulsified and dispersed in an aqueous medium. For their better emulsification, a low-boiling-point organic solvent may be used. The low-boiling-point organic solvent has a boiling point at normal pressure of from about 30° C. to 150° C. Its preferred examples are esters (e.g., ethyl acetate, butyl acetate, ethyl propionate, β-ethoxyethyl acetate, methyl cellosolve acetate), alcohols (e.g., isopropyl alcohol, n-butyl alcohol, sec-butyl alcohol), ketones (e.g., methyl isobutyl ketone, methyl ethyl ketone, cyclohexanone), amides (e.g., dimethylformamide, N-methylpyrrolidone), ethers (e.g., tetrahydrofuran, dioxane), which, however, are not limitative.

The emulsifying dispersion is as follows: A dye is dissolved in a high-boiling-point organic solvent alone, or its mixture with a low-boiling-point organic solvent to prepare an oil phase, and this is dispersed in an aqueous phase essentially comprising water to thereby form fine oily droplets of the oily phase. In this process, additives such as surfactant, moisturizer, dye stabilizer, emulsion stabilizer, preservative and antifungal that will be mentioned hereinunder may be added to any one or both of the aqueous phase and the oily phase, if desired.

For the emulsification, in general, the oily phase is added to the aqueous phase. Contrary to this, however, the aqueous phase may be dropwise added to the oily phase in a mode of phase-conversion emulsification. This is also preferable in the invention. When the dye for use in the invention is a water-soluble one and the additives are oil-soluble ones, then the emulsification method may also be employed.

Various surfactants may be used in the emulsification. For example, preferred are anionic surfactants such as fatty acid salts, alkyl sulfate salts, alkylbenzenesulfonate salts, alkylnaphthalene sulfonate salts, dialkylsulfosuccinate salts, alkylphosphate salts, naphthalenesulfonate-formalin condensates, polyoxyethylene alkylsulfate salts; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block copolymers. Also preferred are acetylene-based polyoxyethylene oxide surfactant, Surfynols (by Air Products & Chemicals). Also preferred are amine oxide-type ampholytic surfactants such as N,N-dimethyl-N-alkylamine oxides. In addition, the surfactants described in JP-A59-157636, pp. 37–38; and *Research Disclosure* No. 308119 (1989) are also usable herein.

For stabilizing the emulsion immediately after its preparation, a water-soluble polymer may be added thereto along with the above-mentioned surfactant. Preferred examples of the water-soluble polymer are polyvinyl alcohol, polyvinylpyrrolidone, polyethylene oxide, polyacrylic acid, polyacrylamide and their copolymers. Also preferably used are natural water-soluble polymers such as polysaccharides, casein, gelatin. For stabilizing the dye dispersion, further usable are polymers not substantially dissolving in aqueous media, for example, polyvinyl compounds, polyurethanes, polyesters, polyamides, polyureas, polycarbonates and others that are obtained through polymerization of acrylates, methacrylates, vinyl esters, acrylamides, methacrylamides, olefins, styrenes, vinyl ethers, acrylonitriles, etc. Preferably, these polymers have —$SO_3^-$ or —$COO^-$. When such polymers not substantially dissolving in aqueous media are used herein, their amount is preferably at most 20% by mass, more preferably at most 10% by mass of the high-boiling-point organic solvent.

When the oil-soluble dye and the high-boiling-point organic solvent are emulsified and dispersed to prepare aqueous ink, it is a matter of great importance to control the particle size of the dye dispersion. In order to increase the color purity and the density of the image formed in a mode of inkjet, it is indispensable to reduce the mean particle size of the dye particles in the inkjet ink. Preferably, the volume-average particle size of the dye particles is at most 1 µm, more preferably from 5 to 100 nm.

The volume-average particle size and the particle size distribution of the dispersed dye particles may be readily determined in any known method. For it, for example, employable is a static light scattering method, a dynamic light scattering method, a centrifugal precipitation method, as well as the methods described in *Lecture of Experimental Chemistry*, 4th Ed., pp. 417–418. Concretely, an ink sample is diluted with distilled water to have a dye particle concentration of from 0.1 to 1% by mass, and then analyzed with a commercially-available, volume-average particle sizer (e.g., Microtrack UPA, by Nikkiso) to determine the particle size of the dye particles. A dynamic light scattering method based on a laser Doppler effect is especially preferred for the measurement, in which even small particles can be measured.

The volume-average particle size is a mean particle size that is weighted by the volume of the particles. This is obtained by dividing the sum total of the products that are obtained by multiplying the diameter of each aggregated particle by the volume thereof, by the overall volume of all the particles. The volume-average particle size is described, for example, in S. Muroi, *Chemistry of Polymer Latex* (by Polymer Publishing), page 119.

It has become obvious that coarse particles have a significant influence on the printability of ink. Concretely, coarse particles clog heads, or even though not clogging, they soil heads and, as a result, ink could not be jetted out at all or is jetted unevenly. To that effect, coarse particles have a significant influence on the printability of ink. To evade the trouble, it is important that 1 µl of ink contains at most 10 particles having a particle size of 5 µm or more and at most 1000 particles having a particle size of 1 µm or more.

To remove such coarse particles, for example, employable is any known centrifugation or precision filtration. The treatment for removing the coarse particles may be effected just after an emulsified dispersion for ink has been prepared, or after various additives such as moisturizer, surfactant and others have been added to the emulsified dispersion and just before the resulting ink is charged into an ink cartridge.

For effectively reducing the mean particle size and for removing coarse particles, employable is a mechanical emulsifier.

The emulsifier may be any known one, including, for example, simple stirrers, impeller-assisted stirrers, in-line stirrers, mills such as colloid mills, ultrasonic stirrers. Above all, high-pressure homogenizers are especially preferred.

The mechanism of high-pressure homogenizers is described in detail, for example, in U.S. Pat. No. 4,533,254 and JP-A6-47264. Gaulin Homogenizer (by A. P. V. Gaulin), Microfluidizer (by Microfluidex) and Ultimizer (by Sugino Machine) are commercially available.

Recently, high-pressure homogenizers as in U.S. Pat. No. 5,720,551 have been developed, which are equipped with a mechanism of finely pulverizing particles in an ultra-high pressure jet flow, and these are preferred for the treatment of emulsification and dispersion in the invention. One example of the emulsifier with such an ultra-high pressure jet flow mechanism is DeBEE2000 (by Bee International).

The pressure in emulsification in such a high-pressure emulsifying disperser is at least 50 MPa, preferably at least 60 MPa, more preferably at least 180 MPa.

Using at least two different types of emulsifiers is especially preferred in the invention. For example, the constituent components are first emulsified in a stirring emulsifier and then further emulsified in a high-pressure homogenizer. Also preferred is a method that comprises once emulsifying and dispersing the constituent components in the emulsifier as above, then adding additives such as moisturizer, surfactant and others to the resulting emulsion, and further emulsifying it in a high-pressure homogenizer before the resulting ink is charged into a cartridge.

In case where a low-boiling-point organic solvent is used along with the high-boiling-point organic solvent as above, it is desirable to remove the low-boiling-point solvent from the emulsion for ensuring the stability, the safety and the sanitation of the emulsion. For removing the low-boiling-point solvent, various methods may be employed depending on the type of the solvent to be removed. For example, employable is evaporation, vacuum evaporation or ultrafiltration. It is desirable that the low-boiling-point organic solvent is removed as soon as possible immediately after the preparation of the emulsion.

Methods of preparing inkjet ink are described in detail, for example, in JP-A 5-148436, 5-295312, 7-97541, 7-82515, 7-118584, and the description may apply to the preparation of the inkjet-recording ink of the invention.

In preparing the inkjet ink of the invention, ultrasonic waves may be given to the system where dyes and additives are dissolved in a medium.

The ultrasonic vibration in the ink preparation is for removing bubbles from the ink. This is because, when ink receives pressure in a recording head, it may produce bubbles. To prevent this, ultrasonic energy which is equal to or higher than the energy that the ink may receive in a recording head is previously applied to the ink so as to remove the bubbles.

The ultrasonic vibration is generally at a frequency of at least 20 kHz, preferably at least 40 kHz, more preferably at least 50 kHz. The energy to be applied to the ink by the ultrasonic vibration is generally at least $2 \times 10^7$ J/m$^3$, preferably at least $5 \times 10^7$ J/m$^3$, more preferably at least $1 \times 10^8$ J/m$^3$. The time for the ultrasonic vibration is generally from 10 minutes to 1 hour or so.

The ultrasonic vibration may be effectively attained at anytime after the dye has been put into a medium. After the finished ink has been stored, it may be exposed to ultrasonic waves, and this is also effective. However, it is more desirable that ultrasonic waves are applied to the dye while the dye is dissolved and/or dispersed in a medium, since their effect to remove bubbles is larger and since they promote the dissolution and/or dispersion of the dye in the medium.

Accordingly, the ultrasonic treatment may be effected in any stage while or after the dye is dissolved and/or dispersed in a medium. In other words, the ultrasonic treatment may be effected at least once at anytime after the ink has been prepared and before it is finished to be a commercial product.

In one preferred embodiment of the invention, the process of dissolving and/or dispersing the dye in a medium comprises a step of dissolving it in a part of a medium and a step of mixing the remaining medium with the resulting dye solution. Preferably, ultrasonic waves are applied to the system in at least any one of these steps. More preferably, ultrasonic waves are applied to the system in the former step of dissolving the dye in a part of a medium.

The latter step of mixing the remaining medium with the resulting dye solution may be effected in one stage or in plural stages.

In preparing the ink of the invention, it is desirable that the system is degassed under heat or under reduced pressure. This is preferable for more effectively removing bubbles from the ink. The step of degassing the system under heat or under reduced pressure is preferably effected simultaneously with or after the step of mixing the remaining medium with the previously-prepared dye solution.

Ultrasonic waves to be applied to the system of ink preparation may be generated by the use of any known ultrasonicator.

In preparing the inkjet ink of the invention, it is also important to filter the prepared ink composition so as to remove impurities from it. In this treatment, a filter is used. The filter has an effective pore size of at most 1 µm, preferably from 0.05 µm to 0.3 µm, more preferably from 0.25 µm to 0.3 µm. Various materials may be used for forming the filter. Especially for the ink of water-soluble dye, the filter is preferably one that is specifically designed for aqueous solvents. More preferably, the filer is formed of a polymer material that may well trap impurities. For the filtration, the ink composition may be passed through the filter in a mode of ordinary liquid feeding. Apart from it, any other mode of pressure filtration or reduced pressure filtration may also be employed herein.

After the filtration, the ink may often take air therein. Bubbles from the air may often cause disturbed images in inkjet recording. Therefore, it is desirable that the ink is further processed for additional degassing as in the above. For degassing it, for example, the ink may be kept static for a while after filtered, or it may be degassed ultrasonically or under reduced pressure by the use of commercially-available devices. Preferably, the ultrasonic degassing is effected for 30 seconds to 2 hours, more preferably for 5 minutes to 1 hour or so.

These treatments are preferably effected in a space of clean room or clean bench in order to prevent the ink from being contaminated with impurities during the treatments. In the invention, it is desirable that the treatments are effected in a space having a degree of cleanness of at most class 1000. The "degree of cleanness" indicates the value measured with a dust counter.

The inkjet ink of the invention may contain a suitable amount of various additives. For example, it may a drying inhibitor for preventing the ink from drying at the inkjet nozzle orifice and for preventing the nozzle from being clogged, and may contain a penetration promoter for promoting the penetration of the ink into paper, and may also contain any other additive selected from UV absorbent, antioxidant, viscosity improver, surface tension improver, dispersant, dispersion stabilizer, antifungal, rust-proofing agent, pH-controlling agent, defoaming agent, chelating agent.

For the drying inhibitor, preferred is a water-soluble organic solvent having a lower vapor pressure than water. Its concrete examples are polyalcohols such as typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane; polyalcohol lower alkyl ethers such as ethylene glycol monomethyl (or ethyl) ether, diethylene glycol monomethyl (or ethyl) ether, triethylene glycol monoethyl (or butyl) ether; heterocyclic compounds such as 2-pyrrolidone, N-methyl-2-pyrrolidone, 1,3-dimethyl-2-imidazolidinone, N-ethylmorpholine; sulfur-containing compounds such as sulforane, dimethyl sulfoxide, 3-sulforene; polyfunctional compounds such as diacetone alcohol, diethanolamine; and urea derivatives. Of those, more preferred are polyalcohols such as glycerin and diethylene glycol. One or more of these drying inhibitors may be used either singly or as combined. Preferably, the drying inhibitor content of the ink is from 10 to 50% by mass.

For the penetration promoter, for example, herein usable are alcohols such as ethanol, isopropanol, butanol, di(tri) ethylene glycol monobutyl ether, 1,2-hexanediol; and nonionic surfactants such as sodium laurylsulfate, sodiumoleate. In general, the penetration promoter is enough when its amount in the ink is from 10 to 30% by mass. However, its amount is preferably so controlled that the ink does not cause bleeding and print-through.

The UV absorbent is for improving the image stability. For the UV absorbent, herein usable are benzotriazole compounds as in JP-A 58-185677, 61-190537, 2-782, 5-197075, 9-34057; benzophenone compounds as in JP-A 46-2784, 5-194483, and U.S. Pat. No. 3,214,463; cinnamate compounds as in JP-B 48-30492, 56-21141, and JP-A 10-88106; triazine compounds as in JP-A 4-298503, 8-53427, 8-239368, 10-182621, and JP-T8-501291 (the term "JP-T" as used herein means a published Japanese translation of a PCT patent application); compounds as in *Research Disclosure* No. 24239; and other compounds capable of absorbing UV rays to emit fluorescence, or that is, fluorescent brighteners such as typically stilbene compounds and benzoxazole compounds.

The antioxidant is for improving the image stability. For it, herein usable are various organic or metal complex-type fading inhibitors. The organic fading inhibitors include hydroquinones, alkoxyphenols, dialkoxyphenols, phenols, anilines, amines, indanes, chromans, alkoxyanilines, and heterocyclic compounds; and the metal complexes include nickel complexes and zinc complexes. More concretely, herein usable are the compounds described in the patent publications that are referred to in *Research Disclosure* No. 17643, Items VII-I to J, No. 15162, No. 18716, page 650, left column, No. 36544, page 527, No. 307105, page 872, and No. 15162, as well as the compounds that fall within the range of the general formula to indicate the typical compounds and the examples of the compounds described in pp. 127–137 of JP-A 62-215272.

The antifungal agent includes sodium dehydroacetate, sodium benzoate, sodium pyridinethione-1-oxide, ethyl p-hydroxybenzoate, 1,2-benzisothiazolin-3-one and its salts. Preferably, its amount in the ink is from 0.02 to 5.00% by mass.

Its details are described in, for example, *Dictionary of Antibacterials and Antifungals* (by the Dictionary Section of the Antibacterial and Antifungal Society of Japan).

The rust-proofing agent includes, for example, acidic sulfites, sodium thiosulfate, ammonium thioglycolate, diisopropylammonium nitrite, pentaerythritol tetranitrate, dicyclohexylammonium nitrite, benzotriazole. Preferably, its amount in the ink is from 0.02 to 5.00% by mass.

The pH-controlling agent is preferably used for pH control and for dispersion stabilization. Preferably, the pH of the ink is controlled to fall between 8 and 11 at 25° C. If the pH is lower than 8, then the dye solubility will lower and the nozzle will be readily clogged. However, if the pH is higher than 11, the waterproofness of the ink will be poor. The pH-controlling agent may be a basic compound such as organic bases and inorganic alkalis, or an acidic compound such as organic acids and inorganic acids.

The basic compound includes, for example, sodium hydroxide, potassium hydroxide, sodium carbonate, potassium carbonate, sodium hydrogencarbonate, potassium hydrogencarbonate, sodium acetate, potassium acetate, sodium phosphate, sodium monohydrogen phosphate and other inorganic compounds, as well as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine, collidine and other organic bases.

The acidic compound includes, for example, inorganic compounds such as hydrochloric acid, sulfuric acid, phosphoric acid, boric acid, sodium hydrogensulfate, potassium hydrogensulfate, potassium dihydrogenphosphate, sodium dihydrogenphosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid, quinolinic acid.

The conductivity of the ink of the invention may fall between 0.01 and 10 S/m, preferably between 0.05 and 5 S/m.

The conductivity may be measured according to an electrode method using a commercially-available saturated potassium chloride.

The conductivity may be controlled essentially by the ion concentration of the aqueous solution. When the salt concentration thereof is high, the solution may be de-salted through ultrafiltration. When a salt or the like is added to control the conductivity of the solution, various organic salts or inorganic salts may be used for the purpose.

The inorganic and organic salts are, for example, inorganic compounds such as potassium halides, sodium halides, sodium sulfate, potassium sulfate, sodium hydrogensulfate, potassium hydrogensulfate, sodium nitrate, potassium nitrate, sodium hydrogencarbonate, potassiumhydrogencarbonate, sodium phosphate, sodium monohydrogenphosphate, borates, potassium dihydrogenphosphate, sodium dihydrogenphosphate; and organic compounds such as sodium acetate, potassium acetate, potassium tartrate, sodiumtartrate, sodiumbenzoate, potassiumbenzoate, sodium p-toluenesulfonate, potassium saccharinate, potassium phthalate, sodium picolinate.

Any other additive components may also be used for conductivity control.

The viscosity of the ink of the invention is preferably from 1 to 20 mPa·s at 25° C., more preferably from 2 to 15 mPa·s. If the viscosity is higher than 30 mPa·s, the fixation of the recorded image may be retarded and the ink jet-out potency may also lower. If the viscosity is lower than 1 mPa·s, the recorded image may be blurred and its quality is therefore lowered.

The viscosity may be controlled in any desired manner by controlling the amount of the ink solvent. The ink solvent includes, for example, glycerin, diethylene glycol, triethanolamine, 2-pyrrolidone, diethylene glycol monobutyl ether, triethylene glycol monobutyl ether.

If desired, a viscosity improver may be sued. The viscosity improver includes, for example, celluloses, water soluble polymers such as polyvinyl alcohol, and nonionic surfactants. Its details are described in, for example, *Viscosity Control Technology* (by the Technology Information Association, 1999), Chap. 9; *Chemicals for Inkjet Printers* (extra ed., '98)—Investigation of Trends and Views in Development of Materials (by CMC, 1997), pp. 162–174.

Methods of measuring the viscosity of liquid are described in detail in JIS Z8803. In the invention, the viscosity of the ink may be readily measured in a simple manner by the use of commercially-available viscometers. For example, there are known Tokyo Instrument's rotary viscometers, B-type Viscometer and E-type Viscometer. In the invention, Yamaichi Electric's shaking viscometer, VM-100A-L Model was used to measure the viscosity at 25° C. The viscosity unit is Pascal·second (Pa·s), but generally milli-Pascal·second (mPa·s).

Preferably, the surface tension of the ink of the invention is from 20 to 50 mN/m at 25° C., both in terms of the dynamic surface tension and the static surface tension. More preferably, it is from 20 to 40 mN/m. If the surface tension is higher than 50 mN/m, then the jet-out stability of the ink will be poor. If so, in addition, the print formed through multi-color superimposition will be blurred and whiskered and the print quality will be significantly lowered. On the other hand, if the surface tension thereof is lower than 20 mN/m, the ink may adhere to the surfaces of printer tools to worsen the print quality.

For controlling the surface tension of the ink, various cationic, anionic or nonionic surfactants such as those mentioned hereinabove may be added to the ink. Preferably, the amount of the surfactant to be added is from 0.01 to 20% by mass, more preferably from 0.1 to 10% by mass of the ink. If desired, two or more different types of surfactants may be combined for use in the ink.

For measuring the static surface tension of ink, known are a capillary ascending method, a dropping method, and a ring hanging method. In the invention, the static surface tension of the ink is measured according to a vertical plate method.

Briefly, when a thin plate of glass or platinum is hung vertically while a part of it is dipped in a liquid, then the surface tension of the liquid acts in the downward direction along the part at which the liquid is in contact with the plate. The force of surface tension is balanced with a force acting in the upward direction to thereby determine the surface tension of the liquid.

For measuring the dynamic surface tension of ink, known are a vibration jetting method, a meniscus dropping method, and a maximum bubble pressure method, for example, as in *Lecture of New Experimental Chemistry*, Vol. 18, "Interface and Colloid" (by Maruzen), pp. 69–90 (1977). Also known is a liquid membrane breaking method, for example, as in JP-A3-2064. In the invention, the dynamic surface tension of the ink is measured according to a bubble pressure differential method. The principle and the mechanism of the method are described below.

When an uniform solution prepared by stirring it is bubbled, then new vapor-liquid interfaces are formed, and surfactant molecules in the solution gather around the surface of water at a constant rate. In that condition, the bubble rate (bubble-forming rate) is varied. When the bubble rate is slow, then a larger number of surfactant molecules gather around the surfaces of the bubbles formed, and the maximum bubble pressure just before the bubbles crack is low.

The maximum bubble pressure (surface tension) to the bubble rate is detected. One preferred embodiment of measuring the dynamic surface tension of the ink is as follows: One large probe and one small probe, totaling two, are used, and bubbles are formed in the ink. In the maximum bubble pressure condition of the two probes, the differential pressure is measured, and the dynamic surface tension of the ink is calculated from it.

Preferably, the nonvolatile content of the ink of the invention is from 10 to 70% by mass of the ink for ensuring jet-out stability of the ink and ensuring good print quality thereof in point of the image fastness, the image blurring resistance and the non-stickiness of the printed matter. More preferably, it is from 20 to 60% by mass for more favorably ensuring the jet-out stability of the ink and ensuring the good print quality thereof especially in point of the image blurring resistance of the printed matter.

The nonvolatile content includes liquid and solid components and polymer component having a boiling point not lower than 150° C. under one atmosphere. The nonvolatile components of ink for inkjet recording are dye, high-boiling-point solvent, and other optional polymer latex, surfactant, dye stabilizer, antifungal and buffer. Most of these nonvolatile components except dye stabilizer lower the dispersion stability of ink, and remain on the printed paper to interfere with dye association and stabilization thereon, and, as a result, the image fastness is thereby worsened and the printed image is often blurred under high-humidity condition.

The ink of the invention may contain a polymer compound. The polymer compound is meant to indicate any and every polymer compound having a number-average molecular weight of at least 5000 in the ink. The polymer compound includes water-soluble polymer compounds that are substantially soluble in aqueous media, water-dispersible polymer compounds such as polymer latex and polymer emulsion, as well as alcohol-soluble polymer compounds that are soluble in polyalcohols serving as auxiliary solvent. So far as they substantially uniformly dissolve or disperse in ink, any polymer compounds may be in the ink of the invention.

Examples of the water-soluble polymer compounds are polyvinyl alcohol, silanol-modified polyvinyl alcohol, carboxymethyl cellulose, hydroxyethyl cellulose, polyvinylpyrrolidone, polyalkylene oxides such as polyethylene oxide, polypropylene oxide, polyalkylene oxide derivatives and other water-soluble polymers; as well as natural water-soluble polymers such as polysaccharides, starch, cationated starch, casein, gelatin; aqueous acrylic resins such as polyacrylic acid, polyacrylamide and their copolymers; aqueous alkyd resins, and other water-soluble polymer compounds having —$SO_3^-$ or —$COO^-$ in the molecule and substantially soluble in aqueous media.

The polymer latex includes, for example, styrene-butadiene latex, styrene-acryl latex, polyurethane latex. The polymer emulsion is acrylic emulsion, etc.

These water-soluble polymer compounds may be used either singly or as combined.

The water-soluble polymer compound is used as a viscosity improver, as so mentioned hereinabove, for controlling the ink viscosity to fall within a suitable viscosity region for ensuring good jet-out potency of the ink. However, if the ink contains the compound too much, then the ink viscosity may increase and the jet-out stability of the ink will be poor. If so, in addition, the ink may form precipitates when stored, and may therefore clog nozzles.

The amount of the polymer compound to be added to the ink for viscosity control may be from 0 to 5% by mass of the ink, though depending on the molecular weight of the compound (the amount of the compound having a higher molecular weight may be smaller). Preferably, it is from 0 to 3% by mass, more preferably from 0 to 1% by mass.

Apart from the above-mentioned surfactant, the ink of the invention may further contain a surface tension improver selected from nonionic, cationic and anionic surfactants. For example, the anionic surfactant includes fatty acid salts, alkyl sulfate salts, alkylbenzenesulfonate salts, alkylnaphthalene sulfonate salts, dialkylsulfosuccinate salts, alkylphosphate salts, naphthalenesulfonate-formalin condensates, polyoxyethylene alkylsulfate salts; and the nonionic surfactant includes polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block copolymers. Also preferred for the improver are acetylene-based polyoxyethylene oxide surfactant, Surfynols (by Air Products & Chemicals). Also preferred are amine oxide-type ampholytic surfactants such as N,N-dimethyl-N-alkylamine oxides. In addition, the surfactants described in JP-A59-157636, pp. 37–38; and *Research Disclosure* No. 308119 (1989) are also usable herein.

In the invention, various cationic, anionic and nonionic surfactants such as those mentioned hereinabove may be used as a dispersant and a dispersion stabilizer, and fluorine-containing compounds, silicone compounds and chelating agents such as EDTA may be used as a defoaming agent, if desired.

[Image-Receiving Material]

Reflection media such as recording paper and recording films described below are used as the image-receiving material in the invention.

The support for recording paper and recording films may be formed of chemical pulp such as LBKP, NBKP; mechanical pulp such as GP, PGW, RMP, TMP, CTMP, CMP, CGP; or recycled paper pulp such as DIP. If desired, any known additives such as pigment, binder, sizing agent, fixer, cationating agent and paper strength enhancer may be added thereto. Various paper-making machines such as Fourdrinier paper machine and cylinder paper machine may be used for producing the support. Apart from these supports, also usable herein are synthetic paper and plastic film sheets. Preferably, the thickness of the support is from 10 to 250 µm, and the weight thereof is from 10 to 250 g/m².

An ink-receiving layer and a back coat layer may be directly formed on the support to prepare the image-receiving material for the ink of the invention. If desired, size pressing or anchor coating with starch, polyvinyl alcohol or the like may be applied to the support, and then the support is coated with an ink-receiving layer and a back coat layer to be the image-receiving material for use in the invention. Further if desired, the support may be leveled through machine calendering, TG calendering, soft calendering or the like.

For the support for use in the invention, more preferred are paper and plastic films, both surfaces of which are laminated with polyolefin (e.g., polyethylene, polystyrene, polybutene or their copolymer) or polyethylene terephthalate. Also preferably, white pigment (e.g., titanium oxide, zinc oxide) or tinting dye (e.g., cobalt blue, ultramarine, neodymium oxide) is added to polyolefin.

The ink-receiving layer formed on the support contains a porous material and an aqueous binder. Preferably, the ink-receiving layer contains a pigment. For the pigment, preferred is white pigment. The white pigment includes inorganic white pigment such as calcium carbonate, kaolin, talc, clay, diatomaceous earth, synthetic amorphous silica, aluminium silicate, magnesium silicate, calcium silicate, aluminium hydroxide, alumina, lithopone, zeolite, barium sulfate, calcium sulfate, titanium dioxide, zinc sulfide, lead carbonate; and organic white pigment such as styrenic pigment, acrylic pigment, urea resin, melamine resin. Porous, inorganic white pigment is especially preferred, and synthetic amorphous silica having a large pore area is more preferred. Synthetic amorphous silica may be any of anhydrous silica obtained in a dry process (vapor phase process) or a hydrous silica obtained in a wet process.

Examples of the recording paper that contains the above-mentioned pigment in its ink-receiving layer are concretely disclosed in JP-A 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, 2001-301314, and any of these may be used herein.

The aqueous binder to be in the ink-receiving layer includes water-soluble polymers such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxide, polyalkylene oxide derivatives; and water-dispersive polymers such as styrene-butadiene latex, acrylic emulsion. One or more of these aqueous binders may be used herein either singly or as combined. Of those, especially preferred are polyvinyl alcohol and silanol-modified polyvinyl alcohol in point of their adhesiveness to pigment and of the peeling resistance of the ink-receiving layer.

In addition to the pigment and the aqueous binder therein, the ink-receiving layer may contain any other additives such as mordant, water-proofing agent, lightfastness improver, vapor resistance improver, surfactant and hardener.

Preferably, the mordant to be in the ink-receiving layer is passivated. Concretely, a polymer mordant is preferred.

The polymer mordant is described, for example, in JP-A 48-23825, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236; U.S. Pat. Nos. 2,484,430, 2,548,564, 3,148,061, 3,309,690, 4,115,124, 4,124,386, 4,193,800, 4,273,853, 4,282,305, 4,450,224. The polymer mordant described in JP-A 1-161236, pp. 212–215 is especially preferred for use in the image-receiving material in the invention. It gives images of good quality and good lightfastness.

The water-proofing agent is effective for making images resistant to water. For the water-proofing agent, especially preferred are cationic resins. The cationic resins are, for example, polyamide-polyamine-epichlorohydrin, polyethylene-imine, polyamine-sulfone, dimethyldiallylammonium chloride polymer, cationic polyacrylamide. The cationic resin content of the ink-receiving layer is preferably from 1 to 15% by mass, more preferably from 3 to 10% by mass of the overall solid content of the layer.

The lightfastness improver and the vapor resistance improver include, for example, phenol compounds, hindered phenol compounds, thioether compounds, thiourea compounds, thiocyanate compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinate compounds, saccharides, water-soluble reducible compounds, organic acids, inorganic acids, hydroxyl-containing organic acids, benzotriazole compounds, benzophenone compounds, triazine compounds, heterocyclic compounds, water-soluble metal salts, organic metal compounds, metal complexes.

Specific examples of these compounds are described in JP-A10-182621, 2001-260519, 2000-260519; JP-B4-34953, 4-34513, 4-34512; JP-A 11-170686, 60-67190, 7-276808, 2000-94829; JP-T 8-512258; JP-A 11-321090.

The surfactant serves as a coating aid, a release improver, a slide improver or an antistatic agent. It is described in, for example, JP-A 62-173463, 62-183457.

In place of surfactant, organic fluorine-containing compounds may be used. Preferably, the organic fluorine-containing compounds for use herein are hydrophobic. Examples of the organic fluorine-containing compounds are fluorine-containing surfactants, oily fluorine-containing compounds (e.g., fluorine oil), and solid fluorine-containing compound resins (e.g., tetrafluoroethylene resin). The organic fluorine-containing compounds are described in JP-B 57-9053 (columns 8–17); JP-A 61-20994, 62-135826.

For the hardener, herein usable are those described in JP-A 1-161236 (page 222), 9-263036, 10-119423, 2001-310547.

Other additives that may be in the ink-receiving layer are pigment dispersant, tackifier, defoaming agent, dye, fluorescent brightener, preservative, pH-controlling agent, mat agent, and hardener. The image-receiving material may have one or more ink-receiving layers.

The recording paper and the recording films may have a back coat layer. The layer may contain white pigment, aqueous binder and other components.

The white pigment that may be in the back coat layer includes, for example, inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminium silicate, diatomaceous earth, calcium silicate, magnesium silicate, synthetic amorphous silica, colloidal silica, colloidal alumina, pseudo-boehmite, aluminium hydroxide, alumina, lithopone, zeolite, hydrated halloysite, magnesium carbonate, magnesium hydroxide; and organic white pigments such as styrenic plastic pigment, acrylic plastic pigment, polyethylene microcapsules, urea resin, melamine resin.

The aqueous binder that may be in the back coat layer includes, for example, water-soluble polymers such as styrene/maleic acid salt copolymer, styrene/acrylic acid salt copolymer, polyvinyl alcohol, silanol-modified polyvinyl alcohol, starch, cationated starch, casein, gelatin, carboxymethyl cellulose, hydroxyethyl cellulose, polyvinylpyrrolidone; and water-dispersive polymers such as styrene-butadiene latex, acrylic emulsion. The other components that may be in the back coat layer are defoaming agent, antifoaming agent, dye, fluorescent brightener, preservative, waterproofing agent, etc.

A dispersion of polymer particles may be added to the constitutive layers (including back layer) of the inkjet recording sheet in the invention. The dispersion of polymer particles is for improving the physical properties of the coating film, for example, for improving the dimensional stability of the film and for preventing the film from curling, blocking and cracking. The dispersion of polymer particles is described in, for example, JP-A 62-245258, 62-1316648, 62-110066. When a dispersion of polymer particles having a low glass transition temperature (not higher than 40° C.)

is added to the mordant-containing layer, then it is effective for preventing the layer from cracking and curling. When a dispersion of polymer particles having a high glass transition point is added to the back layer, it is also effective for preventing the layer from curling.

[Inkjet Recording]

The dot volume on the recording material in the invention is preferably from 0.1 pl to 100 pl, more preferably from 0.5 pl to 50 pl, even more preferably from 2 pl to 50 pl.

The system for the inkjet recording method in the invention is not specifically defined, for which any known system is employable. For example, employable is any of a charge control system of jetting out ink through electrostatic attractive force; a drop-on-demand system (pressure pulse system) of using the oscillation pressure of a piezoelectric device; an acoustic inkjet system of converting an electric signal into an acoustic beam, applying it to ink, and jetting out the ink under radiation pressure; or a thermal inkjet (bubble jet) system of heating ink to form bubbles and utilizing the resulting pressure.

The inkjet recording system includes a system of jetting a large number of small-volume drops of photoink of low concentration, a system of using multiple inks of substantially the same color which, however, differ in concentration to improve the image quality, and a system of using colorless transparent ink. The dot volume on the recording material is controlled mainly by print head.

For example, in a thermal inkjet system, the dot volume may be controlled depending on the structure of the print head. Concretely,- the ink chamber, the heating zone and the nozzle size are varied, and the dot volume may be thereby varied in any desired manner. When multiple print heads that differ in point of the heating zone and the nozzle size are used in a thermal inkjet system, then ink drops of different sizes may be realized.

In a drop-on-demand system using a piezoelectric device, the dot volume may also be varied depending on the structure of the print head, like in the thermal inkjet system as above. In this, however, the waveform of the driving signals of the piezoelectric device may be controlled, as will be mentioned hereinunder, and ink drops of different sizes may be thereby realized through the print head of one and the same structure.

When the ink of the invention is dropwise jetted onto a recording material, the jet-out frequency is preferably at least 1 kHz.

For obtaining high-quality images like photographs, small ink drops must be used for reproducing sharp and high-quality images. For it, the dot density must be at least 600 dpi (dot per inch).

On the other hand, in a recording system where ink is jetted out through heads each having multiple nozzles and where the recording paper moves vertically to the heads, the number of the heads that may be driven at the same time therein may be from tens to 200 or so. Even in a line-head system where plural heads are fixed, the number of the heads that may be driven at the same time therein is limited to hundreds. This is because the driving power is limited, and the heat of the heads may have some influences on the images formed, and therefore a larger number of head nozzles could not be driven at the same time. Accordingly, in order to increase the dot density in recording, the recording time may be longer. However, if the inkjet frequency could be increased, then the recording speed may be increased.

For controlling the inkjet frequency in a thermal inkjet system, the frequency of the head-driving signal to heat the head is controlled.

In a piezoelectric system, the frequency of the signal to drive the piezoelectric device is controlled.

The driving mechanism of piezoelectric head is described. The image signal for printing is controlled in a printer control zone in point of the dot size, the dot speed, and the dot frequency, and a signal to drive the print head is formed. Thus formed, the driving signal is led to the print head. The piezo-driving signal controls the dot size, the dot speed and the dot frequency. The dot size and the dot speed may be determined by the form and the amplitude of the driving waves, and the frequency is determined by the signal repetitive cycle.

When the dot frequency is set as 10 kHz, then the head is driven in every 100 microseconds, and one line recording will finish for 400 microseconds. When the recording paper traveling speed is so set that the recording paper may travel by 1/600 inches, or that is, by about 42 microns per 400 microseconds, then one sheet may be printed in every 1.2 seconds.

Regarding the constitution of the printing device and the constitution of the printer for which the inkjet ink of the invention is sued, for example, the embodiments as in JP-A 11-170527 are preferably referred to. For the ink cartridge, for example, preferred are those illustrated in JP-A 5-229133. Regarding the constitution of the suction mechanism in printing and the constitution of the cap to cover the printing head 28, for example, preferably referred to are those illustrated in JP-A 7-276671. Also preferably, a filter for bubble removal is provided near the head, for example, as in JP-A 9-277552.

Also preferably, the nozzle surface is processed for water repellency, for example, as in Japanese Patent Application No. 2001-16738. Regarding its applications, the ink of the invention may be used in printers that are to be connected with computers, or may be used in printers that are specifically designed exclusively for photographs.

It is desirable that the inkjet ink of the invention is jetted out onto a recording material at a mean dot rate of at least 2 m/sec, more preferably at least 5 m/sec.

For controlling the dot speed, the form and the amplitude of the head-driving waves may be controlled.

When plural driving waves of different forms are selectively used in one printer, then ink dots of different sizes may be jetted out through one and the same head in the printer.

[Inkjet Applications]

The inkjet ink of the invention may also be used for any other applications than those for inkjet recording. For example, it may be used for display image formation, indoor decorative image formation, and outdoor decorative image formation.

The applications for display image formation are meant to indicate images formed on posters, wallpapers, decorative small articles (e.g., ornaments, figures), advertising leaflets, wrapping paper, wrapping materials, paper bags, polyvinyl bags, packaging materials, signboards, transport facilities (e.g., cars, buses, trains), as well as logotype-having clothes, etc. When the dye of the invention is used to form such display images, then the images include not only those in the narrow sense of the word but also all color patterns that may be recognized by people such as abstract designs, letters, geometric patterns, etc.

The indoor decorative material for image formation thereon is meant to include various articles such as wallpapers, decorative small articles (e.g., ornaments, figures), lighting instruments, furniture parts, design parts of floors and ceilings, etc. When the dye of the invention is used to form images on such materials, then the images include not only those in the narrow sense of the word but also all color patterns that may be recognized by people such as abstract designs, letters, geometric patterns, etc.

The outdoor decorative material for image formation thereon is meant to include various articles such as wall materials, roofing materials, signboards, gardening materials, outdoor decorative small articles (e.g., ornaments, figures), parts of outdoor lighting instruments, etc. When the dye of the invention is used to form images on such materials, then the images include not only those in the narrow sense of the word but also all color patterns that may be recognized by people such as abstract designs, letters, geometric patterns, etc.

In the above-mentioned applications, the media on which patterns are formed include paper, fibers, cloths (including nonwoven cloths), plastics, metals, ceramics and other various matters. Regarding the dyeing mode on them, the dye may be applied and fixed thereon in any mode of mordanting, printing or chemical reaction for reactive dye with reactive group introduced thereinto. Above all, especially preferred is the mordanting mode of fixing the dye on the media.

EXAMPLES

The invention is described with reference to the following Examples, to which, however, the invention should not be limited.

Examples (First Aspect)

Ultrapure water (resistance, at least 18 MΩ) was added to the components shown in the following Table to make one liter, and then stirred under heat at 30 to 40° C. for 1 hour. Next, the resulting mixture was filtered under reduced pressure through a micro-filter having a mean pore size of 0.25 μm. Thus prepared, the inks were combined to be an ink set 101.

TABLE 1

(Constitution of Ink Set 101)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

BTZ: benzotriazole

UR: urea

DGB: diethylene glycol monobutyl ether

TGB: triethylene glycol monobutyl ether

DEG: diethylene glycol

TEG: triethylene glycol

GR: glycerin

PRD: 2-pyrrolidone

TEA: triethanolamine (TEA)

PRX: Proxel SL2(S) by Avecia

SW: Surfynol STG

TABLE 1-continued
(Constitution of Ink Set 101)
| | C | LC | M | LM | Y | DY<br>Y-1 30 g<br>C-1 3 g | Bk<br>Bk-1 55 g |
|---|---|---|---|---|---|---|---|
| Dye | C-1 45 g | C-1 15 g | M-1 30 g | M-1 10 g | Y-1 30 g | M-1 5 g | Bk-2 15 g |
C-1
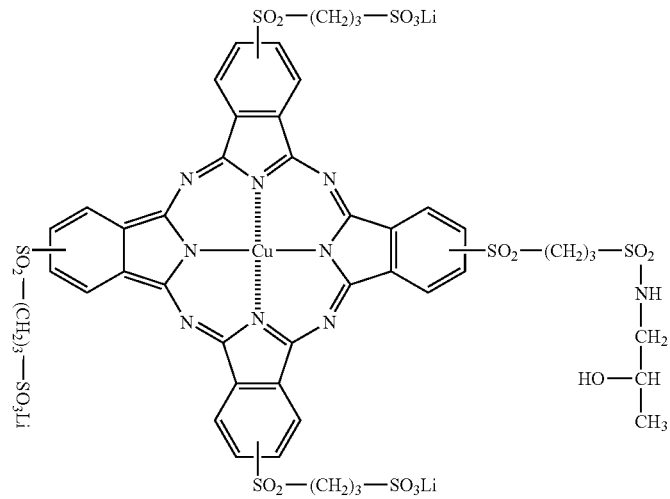
M-1
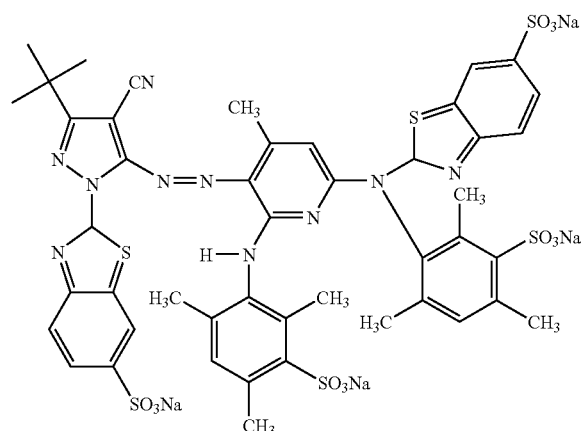
Y-1
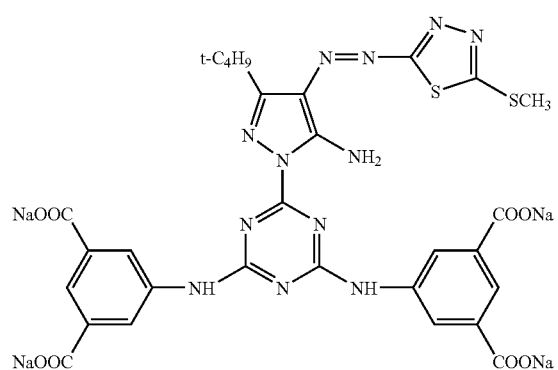

TABLE 1-continued (Constitution of Ink Set 101)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |

Bk-1

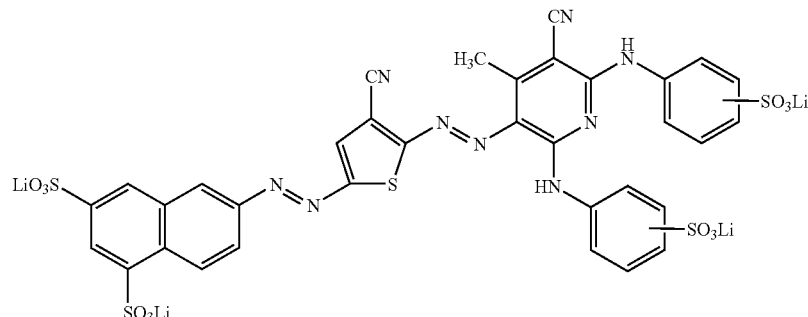

Bk-2

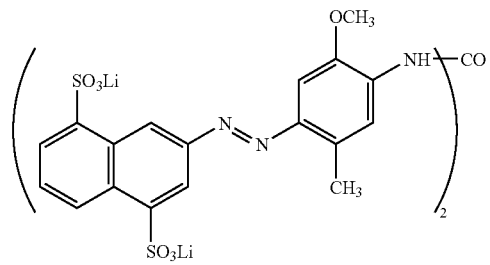

In the same manner as that for the ink set 101, other ink sets 102 to 110 were produced, for which, however, the solvents were varied as in the following:

TABLE 2

(Constitution of Ink Set 102)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| MFG | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

MGF: 1-methoxy-2-propanol

TABLE 3

(Constitution of Ink Set 103)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| IPA | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

IPA: isopropyl alcohol

TABLE 4

(Constitution of Ink Set 104)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| TGA | 50 g | 45 g | 40 g | 40 g | 45 g | 40 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

TGA: tetraethylene glycol monoacetate

TABLE 5

(Constitution of Ink Set 105)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| SOL-1 | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

TABLE 6

(Constitution of Ink Set 106)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| SOL-2 | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

TABLE 7

(Constitution of Ink Set 107)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| SOL-5 | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

TABLE 8

(Constitution of Ink Set 108)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| SOL-10 | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

TABLE 9

(Constitution of Ink Set 109)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| SOL-16 | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

TABLE 10

(Constitution of Ink Set 110)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| SOL-23 | 50 g | 50 g | 40 g | 40 g | 40 g | 35 g | 35 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

These inks were charged in ink cartridges for Epson's inkjet printer PM-950C, and an image was printed on Fuji Photo Film's inkjet paper, photo-glossy paper "Gasai". The inks were evaluated in point of the image quality, the ink jet-out stability and the image storability (fastness). Using a black ink exclusively prepared for use in PM-950C, an image was printed and evaluated in the same manner.

(Evaluation Tests)

1) The Jet-out Stability Test is as Follows:

The cartridges are set in the printer, and inks are jetted out through the respective nozzles. After this, the printer is stopped, and left in an atmosphere at 15° C. and 30% RH for 240 hours and then in an atmosphere at 35° C. and 90% RH for 240 hours. Next, 100 sheets of A4-size paper are printed, and evaluated according to the following criteria:

A: No print disorder is found from the start to the end of the printing operation.

B: Some print disorder is found.

C: Print disorder is found throughout the printing operation.

2) The Image Quality is Evaluated as Follows:

Four different portraits, and a standard chart with color patches corresponding to Macbeth chart for color evaluation are taken, and the printed skin color condition in the portraits and all the colors of the color patches in the chart are visually observed to evaluate their quality.

A: Uniform and good images are formed as a whole.

B: When carefully checked, the images are seen to be partly beaded or bronzed.

C: The images are clearly beaded or bronzed.

3) The Image Storability is Evaluated as Follows:

<1> Lightfastness:

The printed image is exposed to xenon light (85,000 lux) from Atlas' weather meter for 7 days, and then evaluated.

A: The image density reduction is within an acceptable range.

B: The image density reduction is small but the image has lost color balance.

C: The image density reduction is great, not within an acceptable range.

<2> Heat Resistance:

The printed image is stored in an atmosphere at 80° C. and 70% RH for 10 days, and then evaluated in the same manner as above.

<3> Ozone Resistance:

The printed image is stored in a box having a controlled ozone gas concentration of 0.5 ppm, for 7 days, and then evaluated in the same manner as above.

The results are shown in the following Table.

TABLE 11

| | Jet-out Stability | Image Quality | Light-fastness | Heat Resistance | $O_3$ Resistance |
|---|---|---|---|---|---|
| PM-950C (Bk) (comparative example) | A | A | B | B | C |
| 101 (comparative example) | A | C | A | A | A |
| 102 (comparative example) | A | C | A | A | A |
| 103 (comparative example) | A | B | A | A | A |
| 104 (comparative example) | A | C | A | A | A |
| 105 (the invention) | A | A | A | A | A |
| 106 (the invention) | A | A | A | A | A |
| 107 (the invention) | A | A | A | A | A |
| 108 (the invention) | A | A | A | A | A |
| 109 (the invention) | A | A | A | A | A |
| 110 (the invention) | A | A | A | A | A |

From the results shown in the Table, it is understood that the systems with the inks of the invention all gave good images that are superior to the images given by the comparative systems.

The inks and the ink sets of the invention were used in thermal inkjet printers, and the same results as above were also obtained.

According to the first aspect of the invention, there are provided inkjet inks having good jet-out stability and capable of forming images of good quality and good storability.

Examples (Second Aspect)

Ultrapure water (resistance, at least 18 MΩ) was added to the components shown in the following Table to make one liter, and then stirred under heat at 30 to 40° C. for 1 hour. Next, the resulting mixture was filtered under reduced pressure through a micro-filter having a mean pore size of 0.25 μm. Thus prepared, the inks were combined to be an ink set 201.

TABLE 12

(Constitution of Ink Set 201)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 130 g | 125 g | 120 g |
| TGB | 150 g | 140 g | 120 g | 120 g | — | — | — |
| DEG | 100 g | 100 g | 90 g | 80 g | — | — | — |
| TEG | — | — | — | — | 110 g | 125 g | 100 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

BTZ: benzotriazole

UR: urea

DGB: diethylene glycol monobutyl ether

TGB: triethylene glycol monobutyl ether

DEG: diethylene glycol

TEG: triethylene glycol

GR: glycerin

PRD: 2-pyrrolidone

TEA: triethanolamine (TEA)

PRX: Proxel SL2(S) by Avecia

SW: Surfynol STG

TABLE 12-continued
(Constitution of Ink Set 201)
| | C | LC | M | LM | Y | DY Y-1 30 g C-1 3 g M-1 5 g | Bk Bk-1 55 g Bk-2 15 g |
|---|---|---|---|---|---|---|---|
| Dye | C-1 45 g | C-1 15 g | M-1 30 g | M-1 10 g | Y-1 30 g | | |
C-1
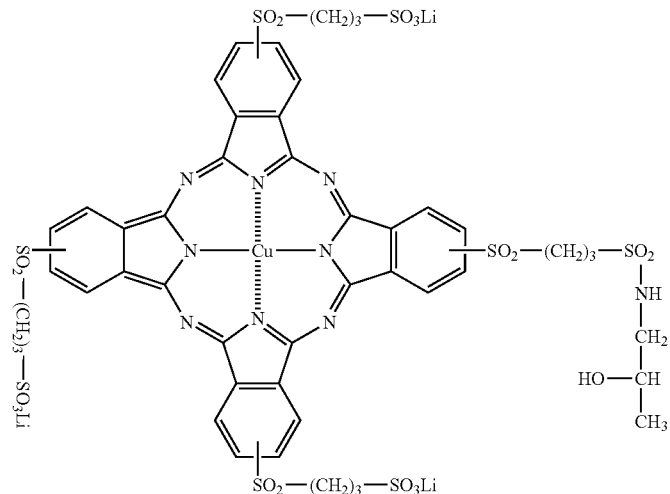
M-1
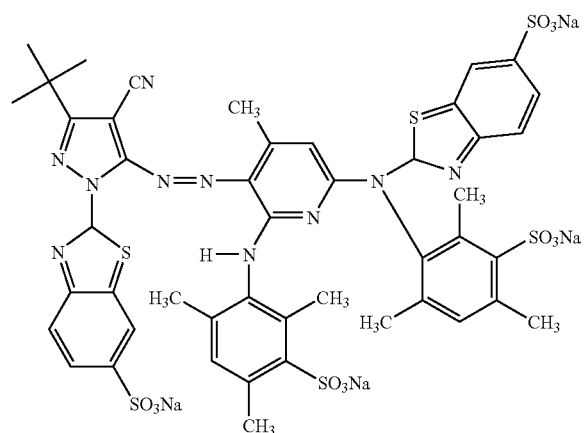
Y-1
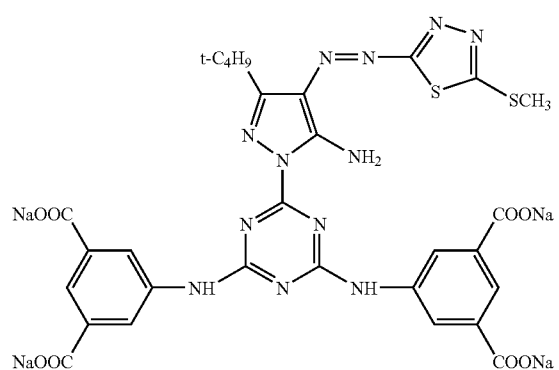

TABLE 12-continued (Constitution of Ink Set 201)

| Dye | C<br>C-1 45 g | LC<br>C-1 15 g | M<br>M-1 30 g | LM<br>M-12 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|

Bk-1

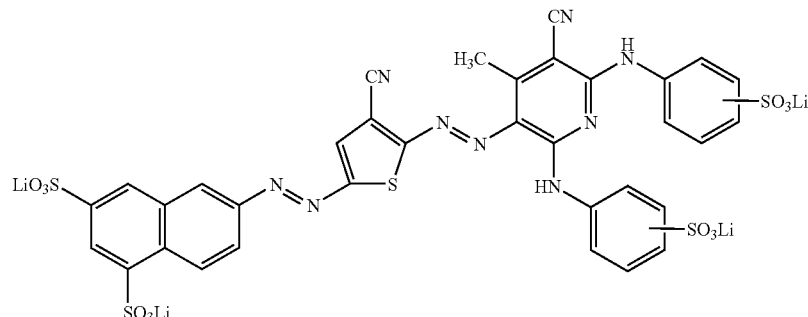

Bk-2

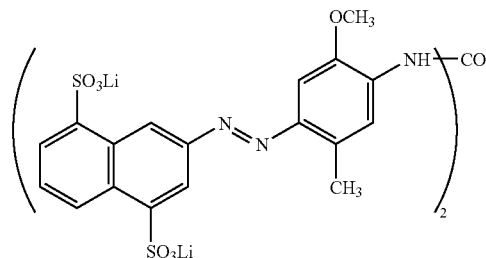

In the same manner as that for the ink set 201, other ink sets 202 to 210 were produced, to which, however, the following additive was added.

TABLE 13

| Ink Set | Additive |
|---|---|
| 201 (comparative example) | — |
| 202 (comparative example) | 1 mass % of imidazole to each ink |
| 203 (comparative example) | 1 mass % of N-methylpyrrolidone to each ink |
| 204 (comparative example) | 1 mass % of tetraethylene glycol to each ink |
| 205 (the invention) | 1 mass % of P-1 to each ink |
| 206 (the invention) | 1 mass % of P-3 to each ink |
| 207 (the invention) | 1 mass % of P-5 to each ink |
| 208 (the invention) | 1 mass % of P-8 to each ink |
| 209 (the invention) | 1 mass % of P-10 to each ink |
| 210 (the invention) | 1 mass % of P-12 to each ink |

These ink sets 201 to 210 were separately charged in ink cartridges for Epson's inkjet printer PM-950C, and an image was printed on Fuji Photo Film's inkjet paper, photo-glossy paper "Gasai". The inks were evaluated in point of the ink jet-out stability and the image storability (fastness, bleeding resistance). Using inks exclusively prepared for use in PM-50C, an image was printed and evaluated in the same manner.

(Evaluation Tests)

1) The Jet-out Stability Test is as Follows:

The cartridges are set in the printer, and inks are jetted out through the respective nozzles. After this, the printer is stopped, and left in an atmosphere at 15° C. and 30% RH for 240 hours and then in an atmosphere at 35° C. and 90% RH for 240 hours. Next, 100 sheets of A4-size paper are printed, and evaluated according to the following criteria:

A: No print disorder is found from the start to the end of the printing operation.
B: Some print disorder is found.
C: Print disorder is found throughout the printing operation.

2) The Image Storability is Evaluated as Follows:

<1> Lightfastness:

The printed image is exposed to xenon light (85,000 lux) from Atlas' weather meter for 7 days, and then evaluated.
A: The image density reduction is within an acceptable range.
B: The image density reduction is small but the image has lost color balance.
C: The image density reduction is great, not within an acceptable range.

<2> Heat Resistance:

The printed image is stored in an atmosphere at 80° C. and 70% RH for 10 days, and then evaluated in the same manner as above.

<3> $O_3$ Resistance (Ozone Resistance):

The printed image is stored in a box having a controlled ozone gas concentration of 0.5 ppm, for 7 days, and then evaluated in the same manner as above.

<4> Bleeding Resistance:

The printed image is stored in an atmosphere at 25° C. and 90% RH for one week, and then evaluated.
A: No bleeding found.
B: Some bleeding found.

C: Much bleeding and image breakdown found.
The results are shown in the following Table.

TABLE 14

|  | Jet-out Stability | Light-fastness | Heat Resistance | O$_3$ Resistance | bleeding resistance |
|---|---|---|---|---|---|
| PM-950C (comparative example) | A | C | B | C | B |
| 201 (comparative example) | A | A | A | A | C |
| 202 (comparative example) | B | A | A | A | C |
| 203 (comparative example) | B | A | A | A | C |
| 204 (comparative example) | B | A | A | A | C |
| 205 (the invention) | A | A | A | A | A |
| 206 (the invention) | A | A | A | A | A |
| 207 (the invention) | A | A | A | A | A |
| 208 (the invention) | A | A | A | A | A |
| 209 (the invention) | A | A | A | A | A |
| 210 (the invention) | A | A | A | A | A |

From the results shown in the Table, it is understood that the systems with the inks of the invention all gave good images that are superior to the images given by the comparative systems.

The inks and the ink sets of the invention were used in thermal inkjet printers, and the same results as above were also obtained.

According to the second aspect of the invention, there are provided inkjet inks and ink sets having good jet-out stability and capable of forming images of good quality and good storability. The images formed of the inks do not bleed even when stored in high-humidity condition.

Examples (Third Aspect)

Ultrapure water (resistance, at least 18 MΩ) was added to the components shown in the following Table to make one liter, and then stirred under heat at 30 to 40° C. for 1 hour. Next, the resulting mixture was filtered under reduced pressure through a micro-filter having a mean pore size of 0.25 μm. Thus prepared, the inks were combined to be an ink set 301.

TABLE 15

(Constitution of Ink Set 301)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|
| BTZ | 3 g | 3 g | 3 g | 3 g | 3 g | 3 g | 3 g |
| UR | 12 g | 5 g | 10 g | 5 g | 10 g | 15 g | 17 g |
| DGB | — | — | — | — | 130 g | 125 g | 120 g |
| TGB | 150 g | 140 g | 120 g | 120 g | — | — | — |
| DEG | 100 g | 100 g | 90 g | 80 g | — | — | — |
| TEG | — | — | — | — | 110 g | 125 g | 100 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

BTZ: benzotriazole
UR: urea
DGB: diethylene glycol monobutyl ether
TGB: triethylene glycol monobutyl ether
DEG: diethylene glycol
TEG: triethylene glycol
GR: glycerin
PRD: 2-pyrrolidone
TEA: triethanolamine (TEA)
PRX: Proxel SL2(S) by Avecia
SW: Surfynol STG TABLE 15-continued
(Constitution of Ink Set 301)
|     | C       | LC      | M       | LM      | Y       | DY<br>Y-1 30 g<br>C-1 3 g<br>M-1 5 g | Bk<br>Bk-1 55 g<br>Bk-2 15 g |
|-----|---------|---------|---------|---------|---------|---------|---------|
| Dye | C-1 45 g | C-1 15 g | M-1 30 g | M-1 10 g | Y-1 30 g |         |         |
C-1
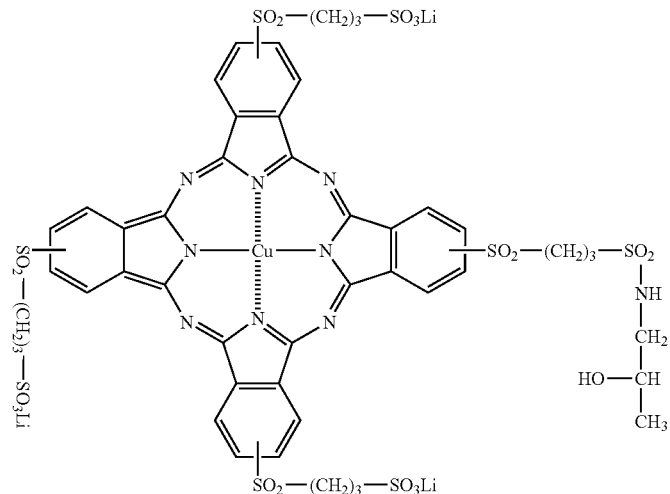
M-1
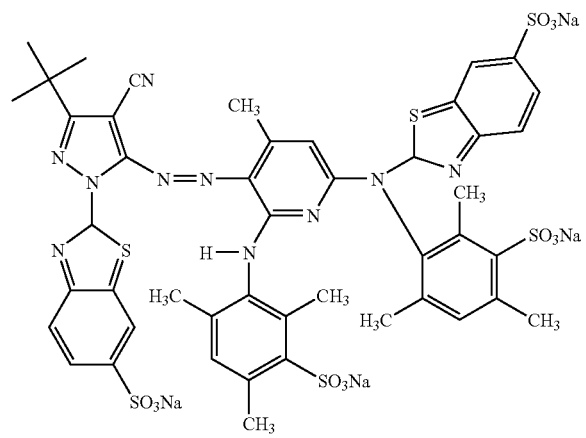
Y-1
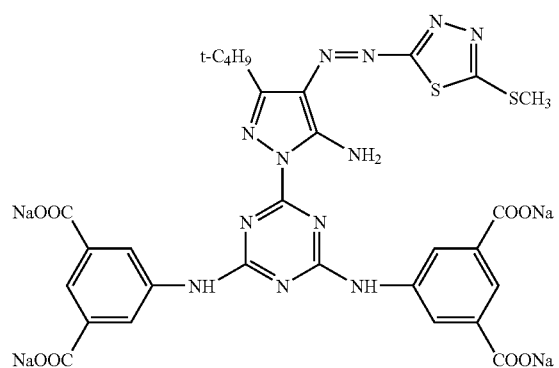

TABLE 15-continued (Constitution of Ink Set 301)

| Dye | C<br>C-1 45 g | LC<br>C-1 15 g | M<br>M-1 30 g | LM<br>M-1 10 g | Y<br>Y-1 30 g | DY<br>Y-1 30 g<br>C-1 3 g<br>M-1 5 g | Bk<br>Bk-1 55 g<br>Bk-2 15 g |
|---|---|---|---|---|---|---|---|

Bk-1

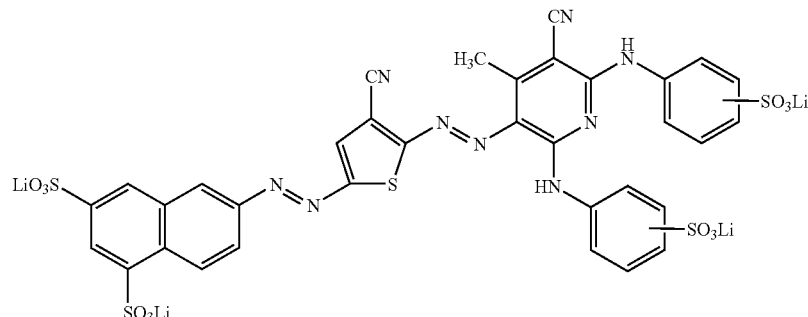

Bk-2

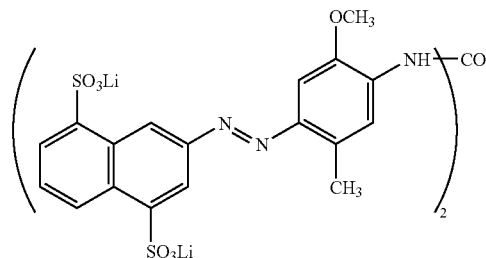

Apart from the inks for the ink set 301, other inks 401 to 410 were prepared. The inks 401 to 410 correspond to the above Bk ink, not containing the dyes (Bk-1, Bk-2) but containing the additive as in Table 16 in place of the dyes. The additive to the inks 402 to 404 differs from the specific compound of the invention that interacts with dyes.

TABLE 16

| Ink | Additive |
|---|---|
| 401 (comparative example) | no |
| 402 (comparative example) | ethylene glycol 50 g/liter |
| 403 (comparative example) | dextran 50 g/liter |
| 404 (comparative example) | taurine 50 g/liter |
| 405 (the invention) | PP-1 50 g/liter |
| 406 (the invention) | PP-4 50 g/liter |
| 407 (the invention) | PP-8 50 g/liter |
| 408 (the invention) | PP-10 50 g/liter |
| 409 (the invention) | PP-11 50 g/liter |
| 410 (the invention) | PP-15 50 g/liter |

The ink set 301 was charged in ink cartridges for Epson's inkjet printer PM-950C, and a color chart of stepwise varying cyan to gray patterns was printed on Fuji Photo Film's inkjet paper, photo-glossy paper "Gasai".

Next, the black ink cartridge was well washed, and the ink 401 was charged in it. Using a PC (personal computer) connected to the printer, the ink 401 was uniformly and imagewise applied onto the paper to form a controlled solid image having a density (Dvis) of 1.0. Thus formed, this is a sample image 501.

In the same manner, the inks 402 to 410 were processed to give samples images 502 to 510, respectively.

Thus formed, the images were evaluated in point of the quality and the durability (lightfastness, heat resistance, ozone resistance) in the manner mentioned below.

1) The image storability is evaluated as follows. The printed samples were analyzed for the stepwise-varying cyan and gray pattern density, through the status A filter of an X-rite densitometer, and the pattern therein having a density of 1.0±0.1 is defined as the density standard in the fading test for the samples.

<1> Lightfastness:

The printed sample is exposed to xenon light (85,000 lux) from Atlas' weather meter for 7 days, and then evaluated.

<2> Heat Resistance:

The printed sample is stored in an atmosphere at 80° C. and 70% RH for 10 days, and then evaluated.

<3> Ozone Resistance:

The printed sample is stored in a box having a controlled ozone gas concentration of 0.5 ppm, for 7 days, and then evaluated.

A: The cyan and gray image density is at least 85% of the initial density.

B: The cyan and gray image density is from 70 to 85% of the initial density.

C: The cyan and gray image density is less than 70% of the initial density.

<4> Bleeding Resistance:

The printed sample is stored in an atmosphere at 25° C. and 90% RH for one week, and then evaluated.

A: No bleeding found.
B: Some bleeding found.
C: Much bleeding and image breakdown found.

The results are shown in the following Table.

TABLE 17

| | bleeding resistance | Light-fastness | Heat Resistance | $O_3$ Resistance |
|---|---|---|---|---|
| ink set for exclusive use in PM-950C (comparative example) | B | B | B | C |
| 501 (comparative example) | B | A | A | A |
| 502 (comparative example) | C | A | A | A |
| 503 (comparative example) | C | A | A | A |
| 504 (comparative example) | B | A | A | A |
| 505 (the invention) | A | A | A | A |
| 506 (the invention) | A | A | A | A |
| 507 (the invention) | A | A | A | A |
| 508 (the invention) | A | A | A | A |
| 509 (the invention) | A | A | A | A |
| 510 (the invention) | A | A | A | A |

From the above results, it is understood that the systems with the inks of the invention all gave good images that are superior to the images given by the comparative systems.

According to the third aspect of the invention, there are provided inkjet ink sets that contains an ink with at least one specific dye and an ink with at least one specific compound capable of interacting with the specific dye, and the ink sets give good images of good durability. The images formed of the ink sets do not bleed even when stored in high-humidity condition, and have good quality.

This application is based on Japanese Patent Application JP 2003-088360, JP 2003-089145 filed Mar. 27, 2003, and JP 2003-089978 filed Mar. 28, 2003, the entire content of which is hereby incorporated by references, the same as if set forth at length.

What is claimed is:

1. An ink for inkjet comprising an aqueous medium, at least one of dyes represented by the following formulae (1) to (4) dissolved or dispersed in the aqueous medium, and at least one of alkylene diols where one alkylene group has at least 3 carbon atoms or their homologues dissolved or dispersed in the aqueous medium:

(1)

wherein $A_{11}$ and $B_{11}$ each independently represent an optionally-substituted heterocyclic group; n is an integer selected from 1 and 2; L represents a substituent bonding to $A_{11}$ or $B_{11}$ at any desired position; when n is 1, L represents a hydrogen atom or a monovalent substituent; and when n is 2, L represents a single bond or a divalent linking group;

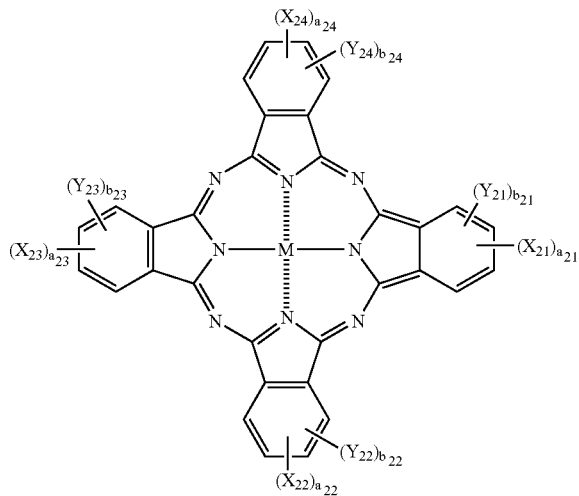

(2)

wherein $X_{21}$, $X_{22}$, $X_{23}$, and $X_{24}$ each independently represent —SO-$Z_2$, —SO$_2$-$Z_2$, SO$_2$NR$_{21}$R$_{22}$, a sulfo group, —CONR$_{21}$R$_{22}$, or —CO$_2$R$_{21}$; $Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_{21}$ and $R_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{21}$, $Y_{22}$, $Y_{23}$, and $Y_{24}$ each independently represent a monovalent substituent;

$a_{21}$ to $a_{24}$, and $b_{21}$ to $b_{24}$ indicate the number of the substituents of $X_{21}$ to $X_{24}$ and $Y_{21}$ to $Y_{24}$, respectively; $a_{21}$ to $a_{24}$ each independently represent a number of from 0 to 4, but all of these are not 0 at the same time; $b_{21}$ to $b_{24}$ each independently represent a number of from 0 to 4;

and when $a_{21}$ to $a_{24}$, and $b_{21}$ to $b_{24}$ are a number of 2 or more, then plural $X_{21}$'s to $X_{24}$'s and $Y_{21}$'s to $Y_{24}$'s may be the same or different;

M represents a hydrogen atom, a metal atom or its oxide, hydroxide or halide;

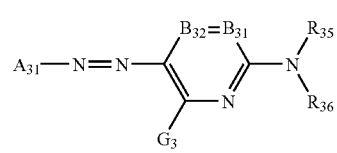

(3)

wherein $A_{31}$ represents a 5-membered hetero ring; $B_{31}$ and $B_{32}$ each represent =CR$_{31}$— or —CR$_{32}$=, or either one of them is a nitrogen atom and the other is =CR$_{31}$— or —CR$_{32}$=; $R_{35}$ and $R_{36}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted; $G_3$, $R_{31}$ and $R_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsul fonyl group, a heterocyclic sulfonyl group, an alkyl or arylsulfinyl group, a heterocyclic sulfinyl group, a sulfamoyl group, a sulfo group, or a heterocyclic-thio group, and each group may be substituted;

$R_{31}$ and $R_{35}$, or $R_{35}$ and $R_{36}$ may bond to each other to form a 5- or 6-membered ring;

(4)

wherein $A_{41}$, $A_{42}$ and $A_{43}$ each independently represent an optionally-substituted aromatic or heterocyclic group; $A_{41}$ and $A_{43}$ are monovalent group, and $A_{42}$ is a divalent group.

2. An ink set for inkjet comprising at least one ink of claim 1.

3. An ink for inkjet comprising an aqueous medium, at least one of dyes represented by the following formulae (1) to (4) dissolved or dispersed in the aqueous medium, and at least one polymer compound dissolved in the aqueous medium:

(1)

wherein $A_{11}$ and $B_{11}$ each independently represent an optionally-substituted heterocyclic group; n is an integer selected from 1 and 2; L represents a substituent bonding to $A_{11}$ or $B_{11}$ at any desired position; when n is 1, L represents a hydrogen atom or a monovalent substituent; and when n is 2, L represents a single bond or a divalent linking group;

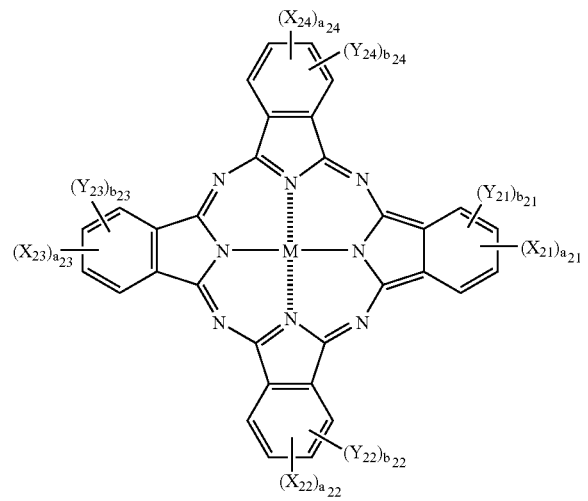
(2)

wherein $X_{21}$, $X_{22}$, $X_{23}$, and $X_{24}$ each independently represent $-SO-Z_2$, $-SO_2-Z_2$, $SO_2NR_{21}R_{22}$, a sulfo group, $-CONR_{21}R_{22}$, or $-CO_2R_{21}$; $Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_{21}$ and $R_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{21}$, $Y_{22}$, $Y_{23}$, and $Y_{24}$ each independently represent a monovalent substituent;

$a_{21}$ to $a_{24}$, and $b_{21}$ to $b_{24}$ indicate the number of the substituents of $X_{21}$ to $X_{24}$ and $Y_{21}$ to $Y_{24}$, respectively; $a_{21}$ to $a_{24}$ each independently represent a number of from 0 to 4, but all of these are not 0 at the same time; $b_{21}$ to $b_{24}$ each independently represent a number of from 0 to 4;

and when $a_{21}$ to $a_{24}$, and $b_{21}$ to $b_{24}$ are a number of 2 or more, then plural $X_{21}$'s to $X_{24}$'s and $Y_{21}$'s to $Y_{24}$'s may be the same or different;

M represents a hydrogen atom, a metal atom or its oxide, hydroxide or halide;

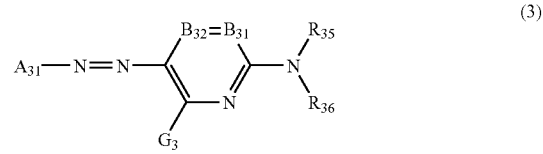
(3)

wherein $A_{31}$ represents a 5-membered hetero ring; $B_{31}$ and $B_{32}$ each represent $=CR_{31}-$ or $-CR_{32}=$, or either one of them is a nitrogen atom and the other is $=CR_{31}-$ or $-CR_{32}=$; $R_{35}$ and $R_{36}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted; $G_3$, $R_{31}$ and $R_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsul fonyl group, a heterocyclic sulfonyl group, an alkyl or arylsulfinyl group, a heterocyclic sulfinyl group, a sulfamoyl group, a sulfo group, or a heterocyclic-thio group, and each group may be substituted;

$R_{31}$ and $R_{35}$, or $R_{35}$ and $R_{36}$ may bond to each other to form a 5- or 6-membered ring;

(4)

wherein $A_{41}$, $A_{42}$ and $A_{43}$ each independently represent an optionally-substituted aromatic or heterocyclic group; $A_{41}$ and $A_{43}$ are monovalent group, and $A_{42}$ is a divalent group.

4. The ink for inkjet as claimed in claim 3, wherein the at least one polymer compound is a water-soluble polymer.

5. The ink for inkjet as claimed in claim 3, wherein the at least one polymer compound has a cationic group.

6. An ink set for inkjet comprising at least one ink of any of claims 3, 4 or 5.

7. An ink set for inkjet comprising at least a first ink and a second ink, wherein the first ink contains an aqueous medium and at least one of dyes represented by the following formulae (1) to (4) dissolved or dispersed in the aqueous medium, and the second ink contains at least one compound capable of interacting with the at least one of dyes represented by the following formulae (1) to (4) dissolved or dispersed in the aqueous medium, provides that the at least one compound capable of interacting with the at least one of dyes represented by formulae (1) to (4) is selected from the group consisting of a polycationic compound having cationic groups of amines, a polycationic compound having cationic groups of guanidines, a polycationic compound having cationic groups of amidines, a polycationic compound having cationic groups of pyridine hetero groups, a polymer having an amino group in a backbone chain or side chain, a polymer having a guanidino group in a backbone chain or side chain, and a polymer having an amidino group in a backbone chain or side chain:

$$(A_{11}\text{-}N\!\!=\!\!N\text{—}B_{11})_n\text{-}L \quad (1)$$

wherein $A_{11}$ and $B_{11}$ each independently represent an optionally-substituted heterocyclic group; n is an integer selected from 1 and 2; L represents a substituent bonding to $A_{11}$ or $B_{11}$ at any desired position; when n is 1, L represents a hydrogen atom or a monovalent substituent; and when n is 2, L represents a single bond or a divalent linking group;

(2)

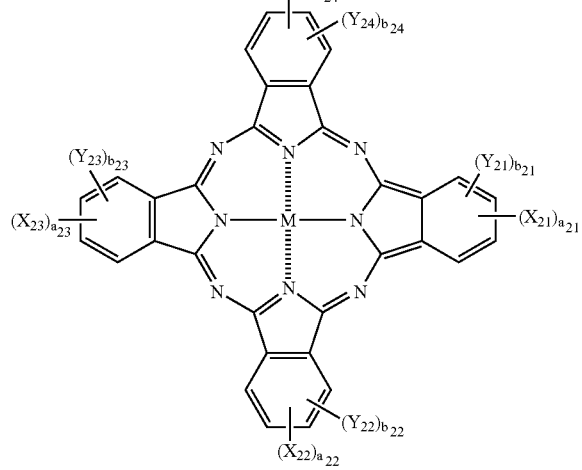

wherein $X_{21}$, $X_{22}$, $X_{23}$, and $X_{24}$ each independently represent —SO-$Z_2$, —SO$_2$-$Z_2$, SO$_2$NR$_{21}$R$_{22}$, a sulfo group, —CONR$_{21}$R$_{22}$, or —CO$_2$R$_{21}$; $Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_{21}$ and $R_{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{21}$, $Y_{22}$, $Y_{23}$, and $Y_{24}$ each independently represent a monovalent substituent;

$a_{21}$ to $a_{24}$, and $b_{21}$ to $b_{24}$ indicate the number of the substituents of $X_{21}$ to $X_{24}$ and $Y_{21}$ to $Y_{24}$, respectively; $a_{21}$ to $a_{24}$ each independently represent a number of from 0 to 4, but all of these are not 0 at the same time; $b_{21}$ to $b_{24}$ each independently represent a number of from 0 to 4;

and when $a_{21}$ to $a_{24}$, and $b_{21}$ to $b_{24}$ are a number of 2 or more, then plural $X_{21}$'s to $X_{24}$'s and $Y_{21}$'s to $Y_{24}$'s may be the same or different;

M represents a hydrogen atom, a metal atom or its oxide, hydroxide or halide;

(3)

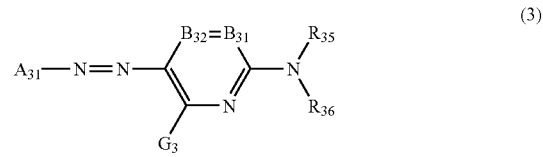

wherein $A_{31}$ represents a 5-membered hetero ring; $B_{31}$ and $B_{32}$ each represent =CR$_{31}$— or —CR$_{32}$=, or either one of them is a nitrogen atom and the other is =CR$_{31}$— or —CR$_{32}$=; $R_{35}$ and $R_{36}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group, and each group may be substituted; $G_3$, $R_{31}$ and $R_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, an alkyl or arylsul fonyl group, a heterocyclic sulfonyl group, an alkyl or arylsulfinyl group, a heterocyclic sulfinyl group, a sulfamoyl group, a sulfo group, or a heterocyclic-thio group, and each group may be substituted; $R_{31}$ and $R_{35}$, or $R_{35}$ and $R_{36}$ may bond to each other to form a 5- or 6-membered ring;

$$A_{41}\text{-}N\!\!=\!\!N\text{-}A_{42}\text{-}N\!\!=\!\!N\text{-}A_{43} \quad (4)$$

wherein $A_{41}$, $A_{42}$ and $A_{43}$ each independently represent an optionally-substituted aromatic or heterocyclic group; $A_{41}$ and $A_{43}$ are monovalent group, and $A_{42}$ is a divalent group.

8. An inkjet recording method with an ink set as claimed in claim 7, comprising a step of forming an image with the first ink and a step of applying the second ink onto the image.

9. The ink set for inkjet as claimed in claim 7, wherein at least two of $A_{41}$, $A_{42}$ and $A_{43}$ in formula (4) are heterocyclic groups.

10. The ink set for inkjet as claimed in claim 7, wherein the dye of formula (2) is represented by formula (5):

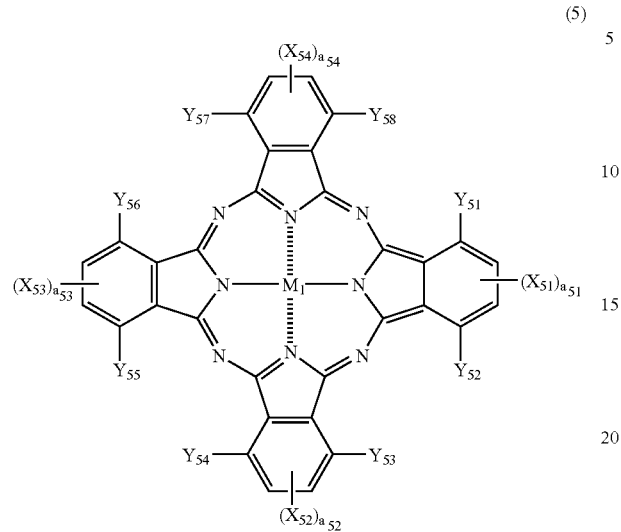

(5)

wherein $X_{51}$, $X_{52}$, $X_{53}$ and $X_{54}$ each independently represent —SO-$Z_2$, —SO$_2$-$Z_2$, —SO$_2$NR$_{21}$R$_{22}$, a sulfo group, —CONR$_{21}$R$_{22}$, or —CO$_2$R$_{21}$; $Z_2$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; R$_{21}$ and R$_{22}$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_{51}$ to $Y_{58}$ each independently represents a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group;

$M_1$ represents a hydrogen atom, a metal atom or its oxide, hydroxide or halide; and $a_{51}$ to $a_{54}$ each independently represents an integer of 1 or 2.

* * * * *